US012619546B2

(12) United States Patent
Cooper et al.

(10) Patent No.: US 12,619,546 B2
(45) Date of Patent: May 5, 2026

(54) SYSTEM AND METHOD FOR DATA STORAGE, TRANSFER, SYNCHRONIZATION, AND SECURITY USING AUTOMATED MODEL MONITORING AND TRAINING WITH A LOAD-ADAPTIVE CACHE

(71) Applicant: AtomBeam Technologies Inc., Moraga, CA (US)

(72) Inventors: Joshua Cooper, Columbia, SC (US); Grant Fickes, Columbia, SC (US); Charles Yeomans, Orinda, CA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/088,950

(22) Filed: Mar. 24, 2025

(65) Prior Publication Data

US 2025/0252056 A1     Aug. 7, 2025

Related U.S. Application Data

(63) Continuation-in-part of application No. 18/939,537, filed on Nov. 7, 2024, now Pat. No. 12,261,632, which is a continuation-in-part of application No. 18/161,080, filed on Jan. 29, 2023, now Pat. No. 12,218,695.

(51) Int. Cl.
*G06F 12/0862* (2016.01)
(52) U.S. Cl.
CPC .. *G06F 12/0862* (2013.01); *G06F 2212/6028* (2013.01)

(58) Field of Classification Search
None
See application file for complete search history.

(56) References Cited

U.S. PATENT DOCUMENTS

| | | | |
|---|---|---|---|
| 9,384,204 | B2 | 7/2016 | Gupta |
| 9,524,392 | B2 | 12/2016 | Naehrig et al. |
| 10,346,043 | B2 | 7/2019 | Golden et al. |
| 11,139,827 | B2 | 10/2021 | Ki et al. |
| 11,209,984 | B2 | 12/2021 | Yang et al. |
| 11,762,557 | B2 | 9/2023 | Cooper et al. |
| 2018/0196609 | A1 | 7/2018 | Niesen |
| 2020/0128307 | A1 | 4/2020 | Li |
| 2020/0395955 | A1 | 12/2020 | Choi et al. |

*Primary Examiner* — Michael Alsip
(74) *Attorney, Agent, or Firm* — GALVIN PATENT LAW LLC; Brian R. Galvin; Alec L. Perry

(57) ABSTRACT

A system and method for efficient data storage, transfer, synchronization, and security using automated model monitoring and training. The system analyzes test datasets to detect data drift, retraining encoding and decoding algorithms as needed. New data sourceblocks are created and assigned codewords, compiling an updated codebook for distribution to connected devices. A novel dyadic distribution subsystem simultaneously compresses and encrypts data by transforming input streams into a dyadic distribution. This process generates a compressed main data stream and a secondary stream of transformation information, which are combined into a secure output. The system includes a network device manager for optimizing codebook distribution based on device resource usage. Operating in both lossless and lossy modes, the system offers flexible, efficient, and secure data handling across various network configurations.

10 Claims, 45 Drawing Sheets

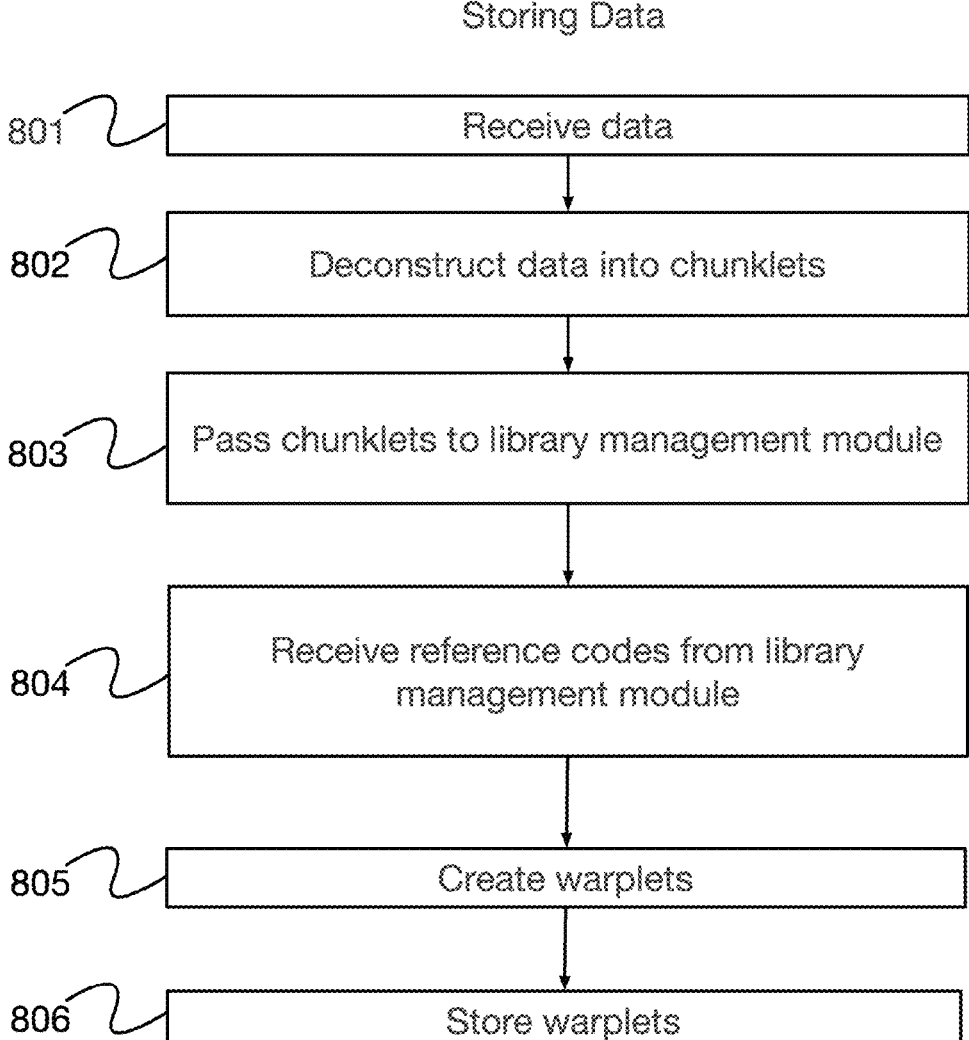
Storing Data
801　Receive data
802　Deconstruct data into chunklets
803　Pass chunklets to library management module
804　Receive reference codes from library management module
805　Create warplets
806　Store warplets
Fig. 8
800

Retrieving Data

901 — Receive request for data

902 — Retrieve warplets

903 — Pass reference codes to library management module

904 — Receive chunklets from library management module

905 — Assemble chunklets into original data

906 — Send data out to requestor

Fig. 9          900

Encoding Data

1001 — Receive chunklets from deconstruction engine

1002 — Check library for existing chunklets

Chunklet does not exist

Chunklet exists

1003 — Create new reference code for chunklet

1004 — store chunklet and reference code

1005 — Return reference code to deconstruction engine

1000

Decoding Data

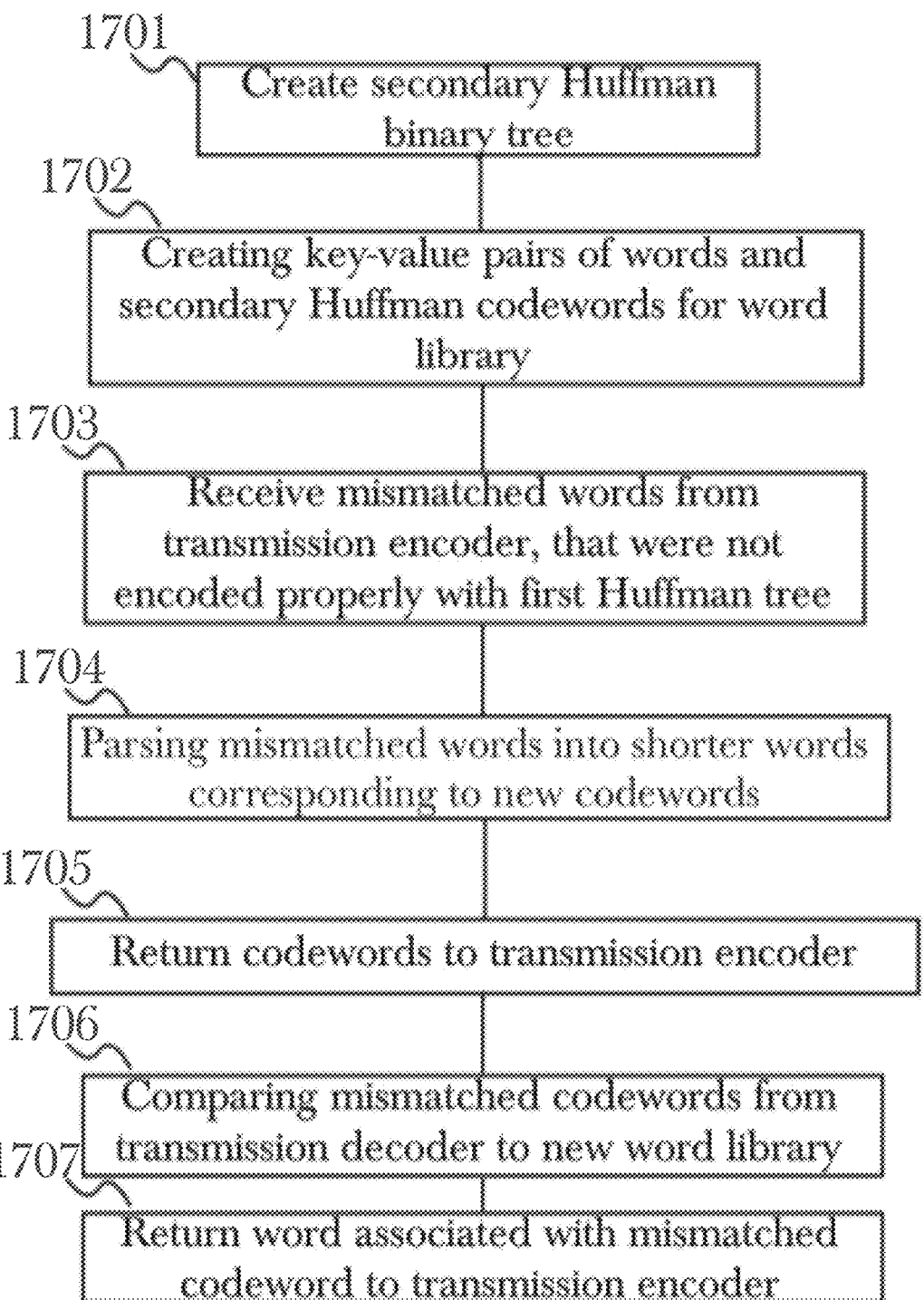

1701 Create secondary Huffman binary tree

1702 Creating key-value pairs of words and secondary Huffman codewords for word library 1703 Receive mismatched words from transmission encoder, that were not encoded properly with first Huffman tree 1704 Parsing mismatched words into shorter words corresponding to new codewords 1705 Return codewords to transmission encoder 1706 Comparing mismatched codewords from transmission decoder to new word library 1707 Return word associated with mismatched codeword to transmission encoder

Fig. 17

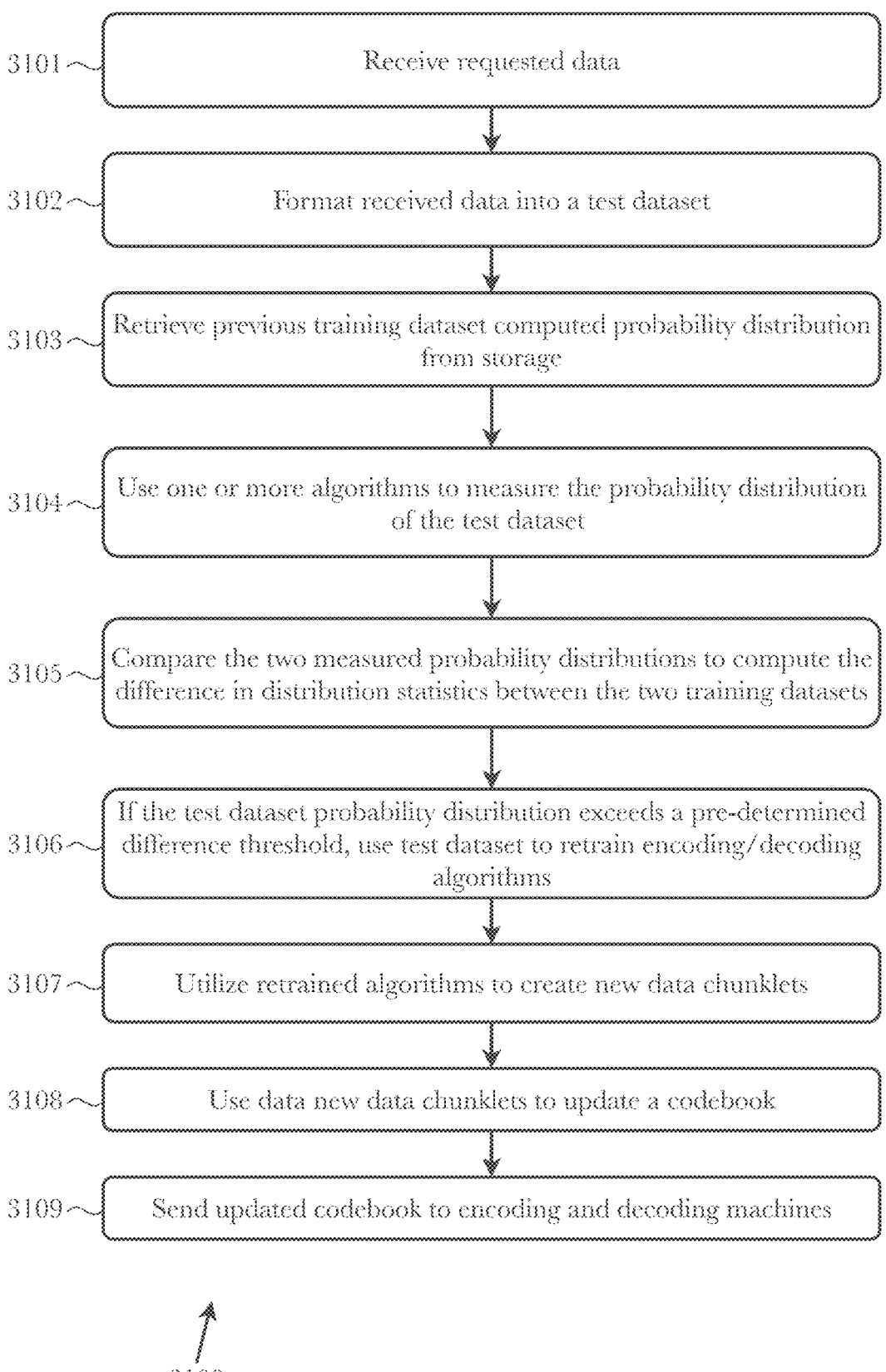

3101 — Receive requested data

3102 — Format received data into a test dataset

3103 — Retrieve previous training dataset computed probability distribution from storage 3104 — Use one or more algorithms to measure the probability distribution of the test dataset 3105 — Compare the two measured probability distributions to compute the difference in distribution statistics between the two training datasets 3106 — If the test dataset probability distribution exceeds a pre-determined difference threshold, use test dataset to retrain encoding/decoding algorithms 3107 — Utilize retrained algorithms to create new data chunklets 3108 — Use data new data chunklets to update a codebook 3109 — Send updated codebook to encoding and decoding machines

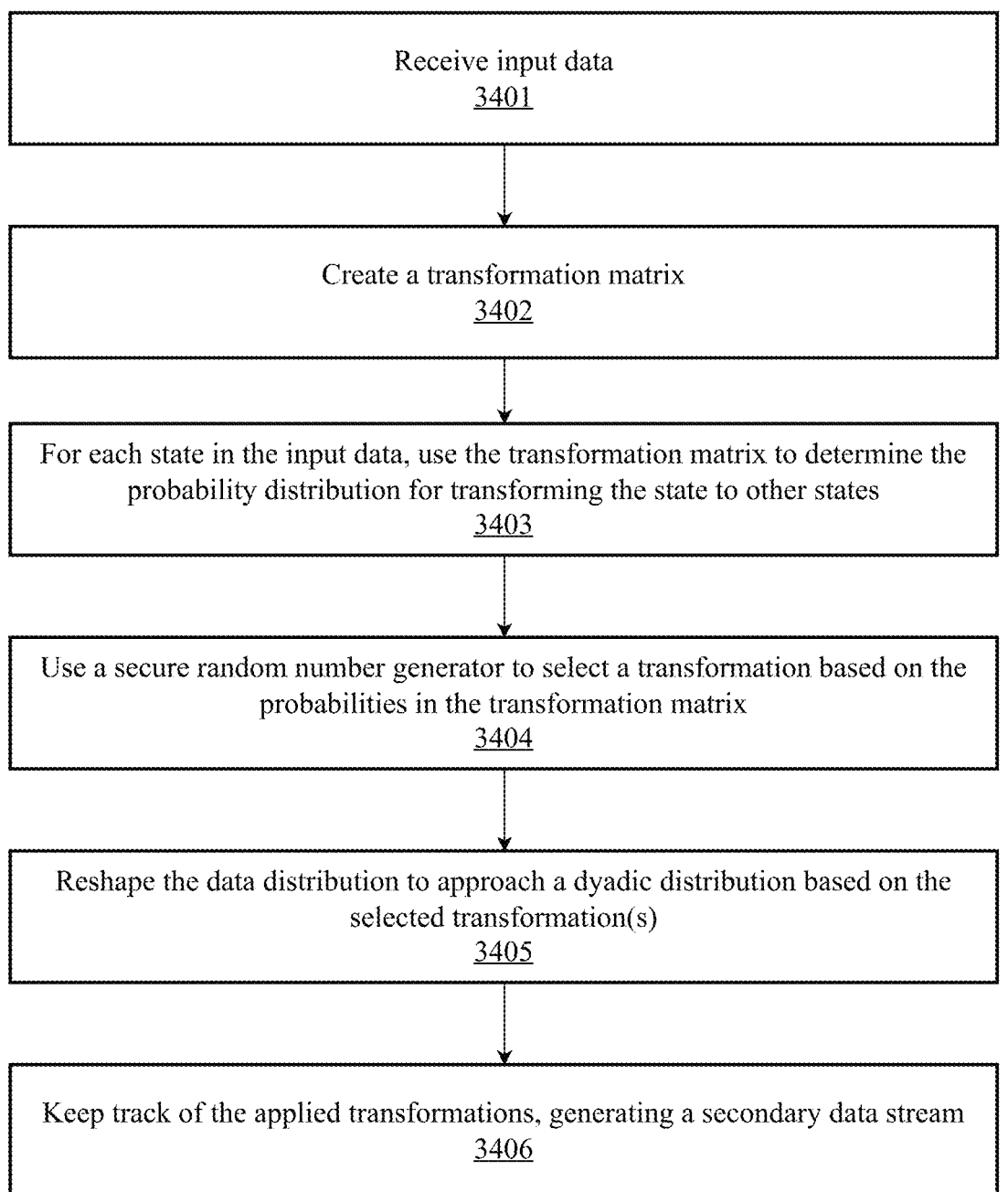

Receive input data
3401

Create a transformation matrix
3402

For each state in the input data, use the transformation matrix to determine the probability distribution for transforming the state to other states
3403

Use a secure random number generator to select a transformation based on the probabilities in the transformation matrix
3404

Reshape the data distribution to approach a dyadic distribution based on the selected transformation(s)
3405

Keep track of the applied transformations, generating a secondary data stream
3406

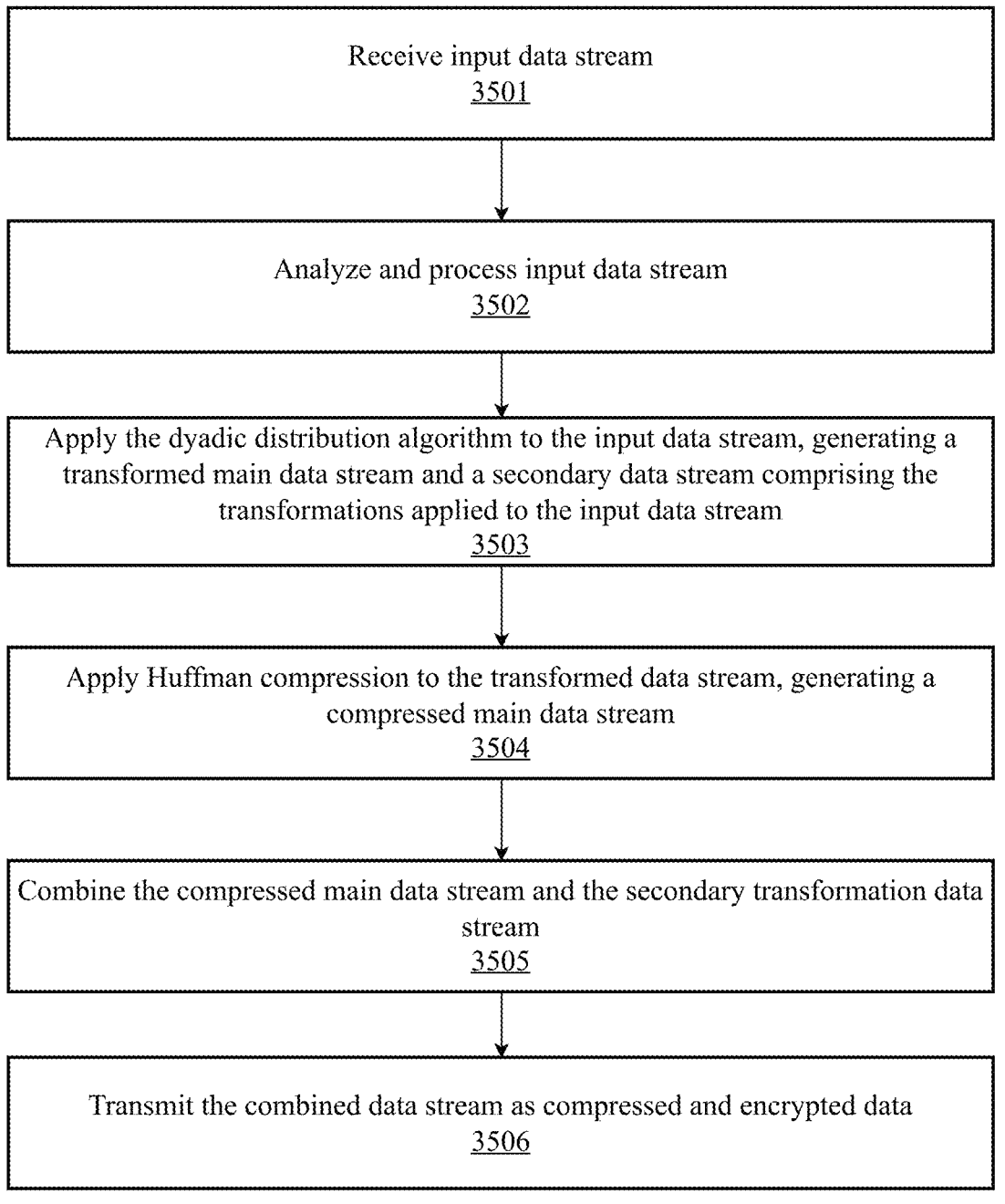

Receive input data stream
3501

Analyze and process input data stream
3502

Apply the dyadic distribution algorithm to the input data stream, generating a transformed main data stream and a secondary data stream comprising the transformations applied to the input data stream
3503

Apply Huffman compression to the transformed data stream, generating a compressed main data stream
3504

Combine the compressed main data stream and the secondary transformation data stream
3505

Transmit the combined data stream as compressed and encrypted data
3506

Receive input data stream
3601

Analyze and process input data stream
3602

Apply the dyadic distribution algorithm to the input data stream, generating a transformed main data stream and a secondary data stream comprising the transformations applied to the input data stream
3603

Apply Huffman compression to the transformed data stream, generating a compressed main data stream
3604

Transmit only the compressed main data stream as compressed and encrypted data
3605

FIG. 36

3600

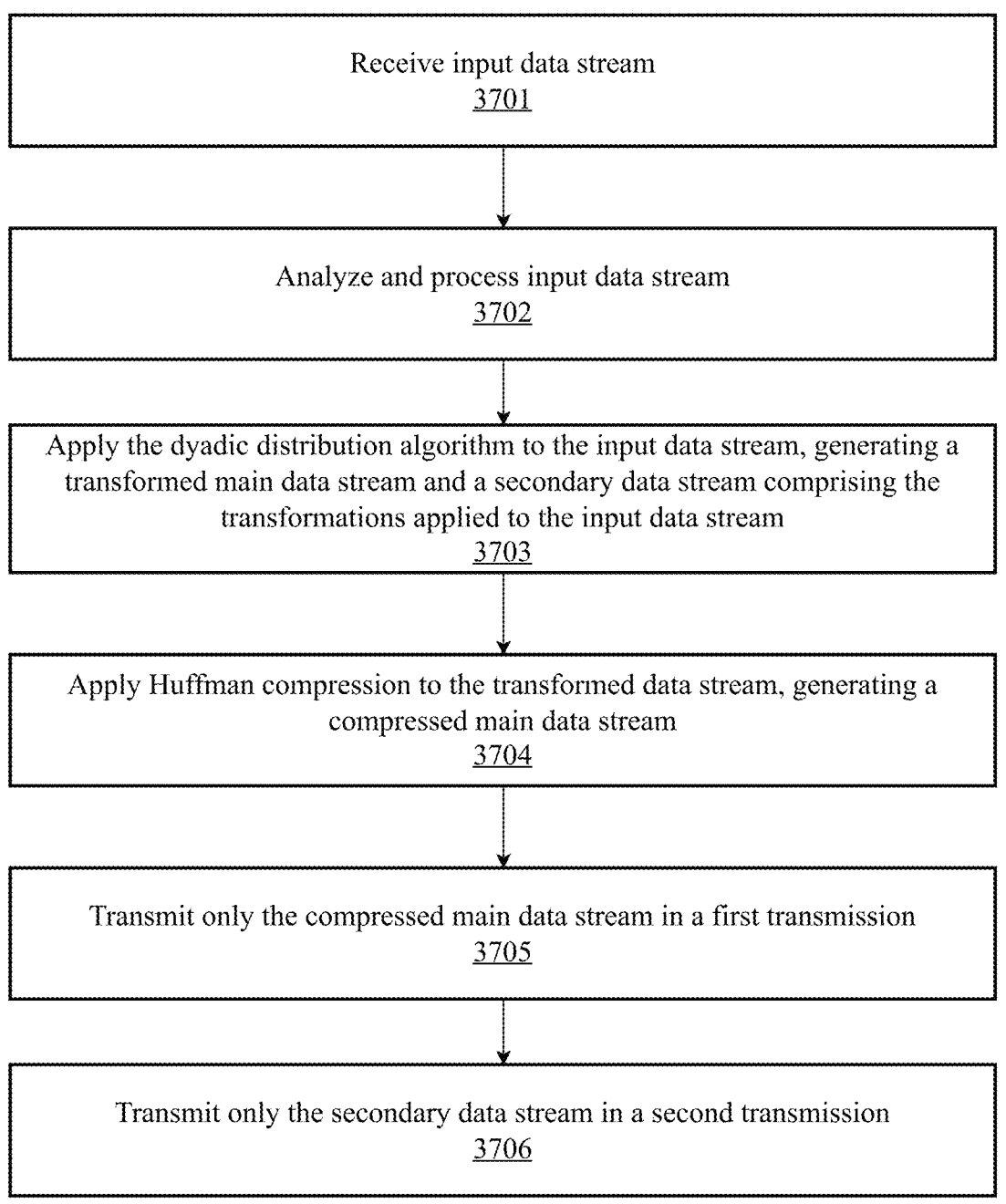

Receive input data stream
3701

Analyze and process input data stream
3702

Apply the dyadic distribution algorithm to the input data stream, generating a transformed main data stream and a secondary data stream comprising the transformations applied to the input data stream
3703

Apply Huffman compression to the transformed data stream, generating a compressed main data stream
3704

Transmit only the compressed main data stream in a first transmission
3705

Transmit only the secondary data stream in a second transmission
3706

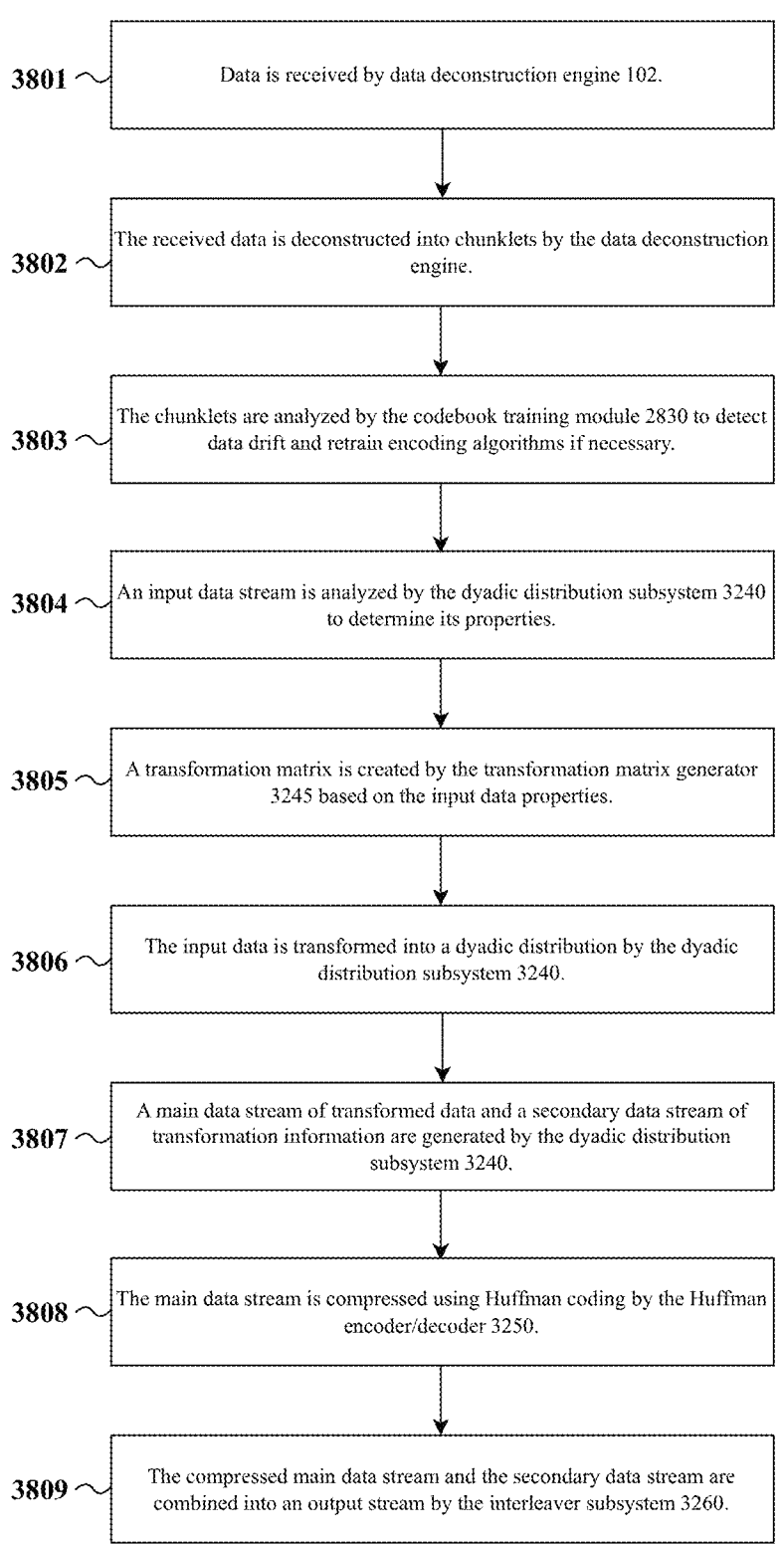

3801 — Data is received by data deconstruction engine 102.

3802 — The received data is deconstructed into chunklets by the data deconstruction engine.

3803 — The chunklets are analyzed by the codebook training module 2830 to detect data drift and retrain encoding algorithms if necessary.

3804 — An input data stream is analyzed by the dyadic distribution subsystem 3240 to determine its properties.

3805 — A transformation matrix is created by the transformation matrix generator 3245 based on the input data properties.

3806 — The input data is transformed into a dyadic distribution by the dyadic distribution subsystem 3240.

3807 — A main data stream of transformed data and a secondary data stream of transformation information are generated by the dyadic distribution subsystem 3240.

3808 — The main data stream is compressed using Huffman coding by the Huffman encoder/decoder 3250.

3809 — The compressed main data stream and the secondary data stream are combined into an output stream by the interleaver subsystem 3260.

FIG. 38

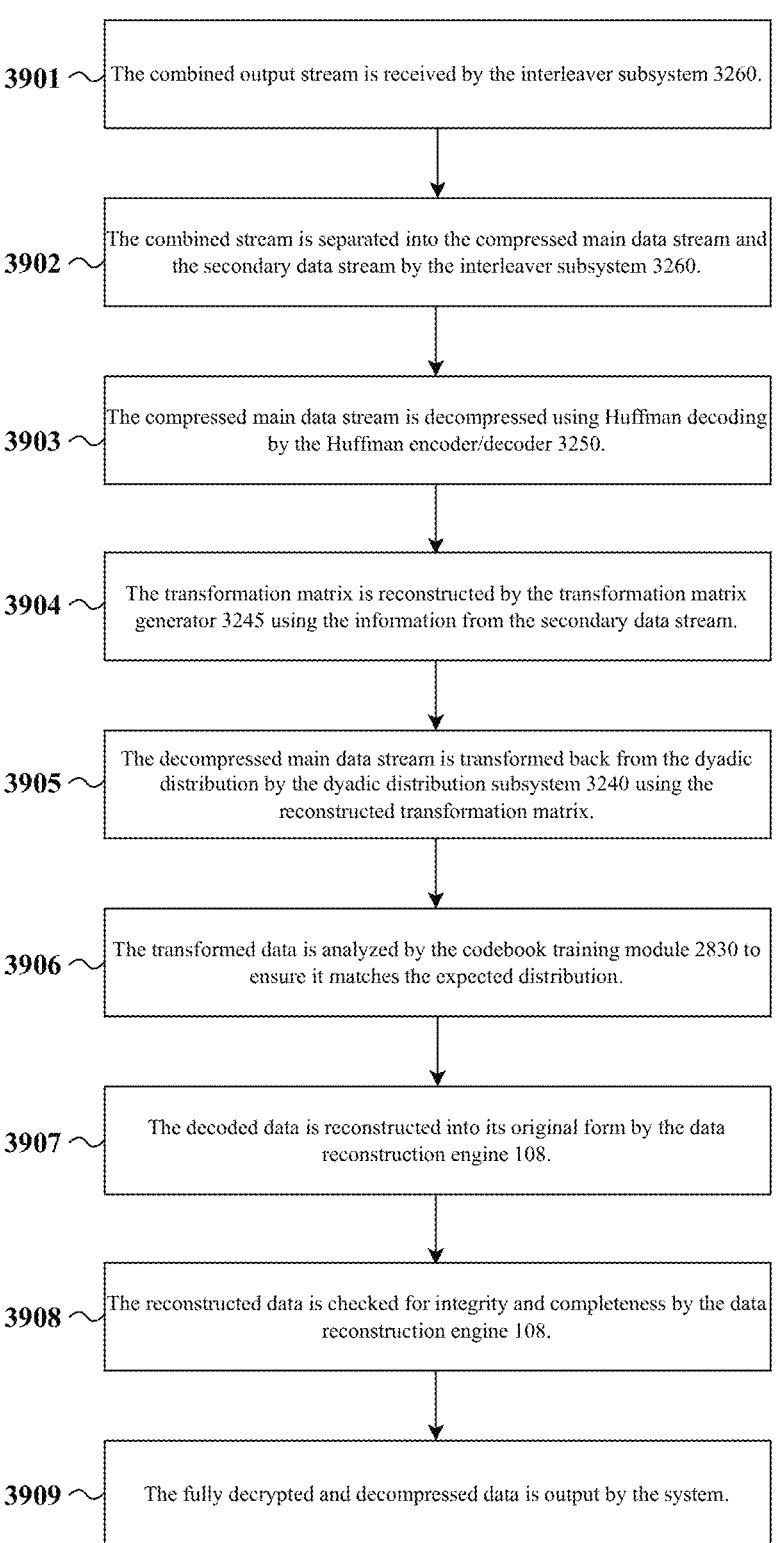

3901 — The combined output stream is received by the interleaver subsystem 3260.

3902 — The combined stream is separated into the compressed main data stream and the secondary data stream by the interleaver subsystem 3260.

3903 — The compressed main data stream is decompressed using Huffman decoding by the Huffman encoder/decoder 3250.

3904 — The transformation matrix is reconstructed by the transformation matrix generator 3245 using the information from the secondary data stream.

3905 — The decompressed main data stream is transformed back from the dyadic distribution by the dyadic distribution subsystem 3240 using the reconstructed transformation matrix.

3906 — The transformed data is analyzed by the codebook training module 2830 to ensure it matches the expected distribution.

3907 — The decoded data is reconstructed into its original form by the data reconstruction engine 108.

3908 — The reconstructed data is checked for integrity and completeness by the data reconstruction engine 108.

3909 — The fully decrypted and decompressed data is output by the system.

FIG. 39

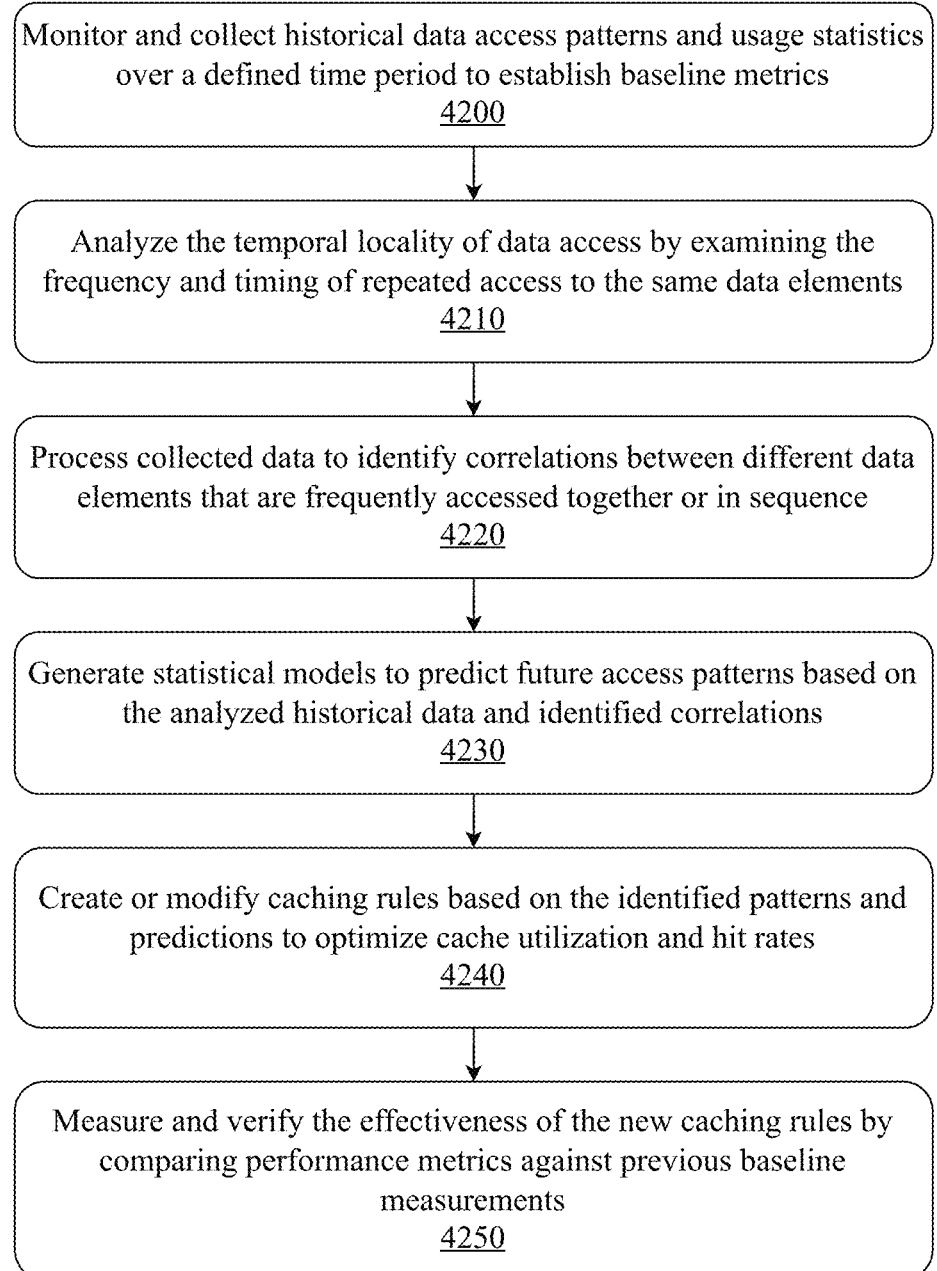

Monitor and collect historical data access patterns and usage statistics over a defined time period to establish baseline metrics
4200

Analyze the temporal locality of data access by examining the frequency and timing of repeated access to the same data elements
4210

Process collected data to identify correlations between different data elements that are frequently accessed together or in sequence
4220

Generate statistical models to predict future access patterns based on the analyzed historical data and identified correlations
4230

Create or modify caching rules based on the identified patterns and predictions to optimize cache utilization and hit rates
4240

Measure and verify the effectiveness of the new caching rules by comparing performance metrics against previous baseline measurements
4250

FIG. 42

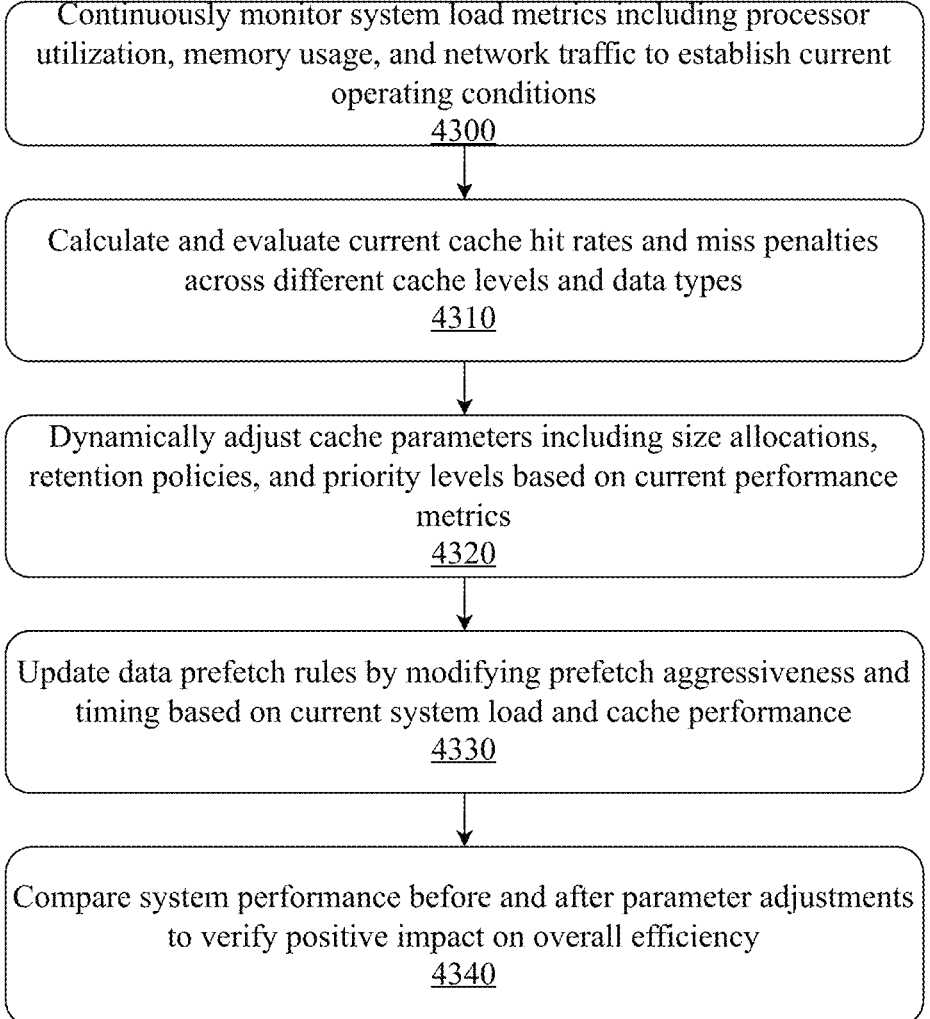

Continuously monitor system load metrics including processor utilization, memory usage, and network traffic to establish current operating conditions
4300

Calculate and evaluate current cache hit rates and miss penalties across different cache levels and data types
4310

Dynamically adjust cache parameters including size allocations, retention policies, and priority levels based on current performance metrics
4320

Update data prefetch rules by modifying prefetch aggressiveness and timing based on current system load and cache performance
4330

Compare system performance before and after parameter adjustments to verify positive impact on overall efficiency
4340

FIG. 43

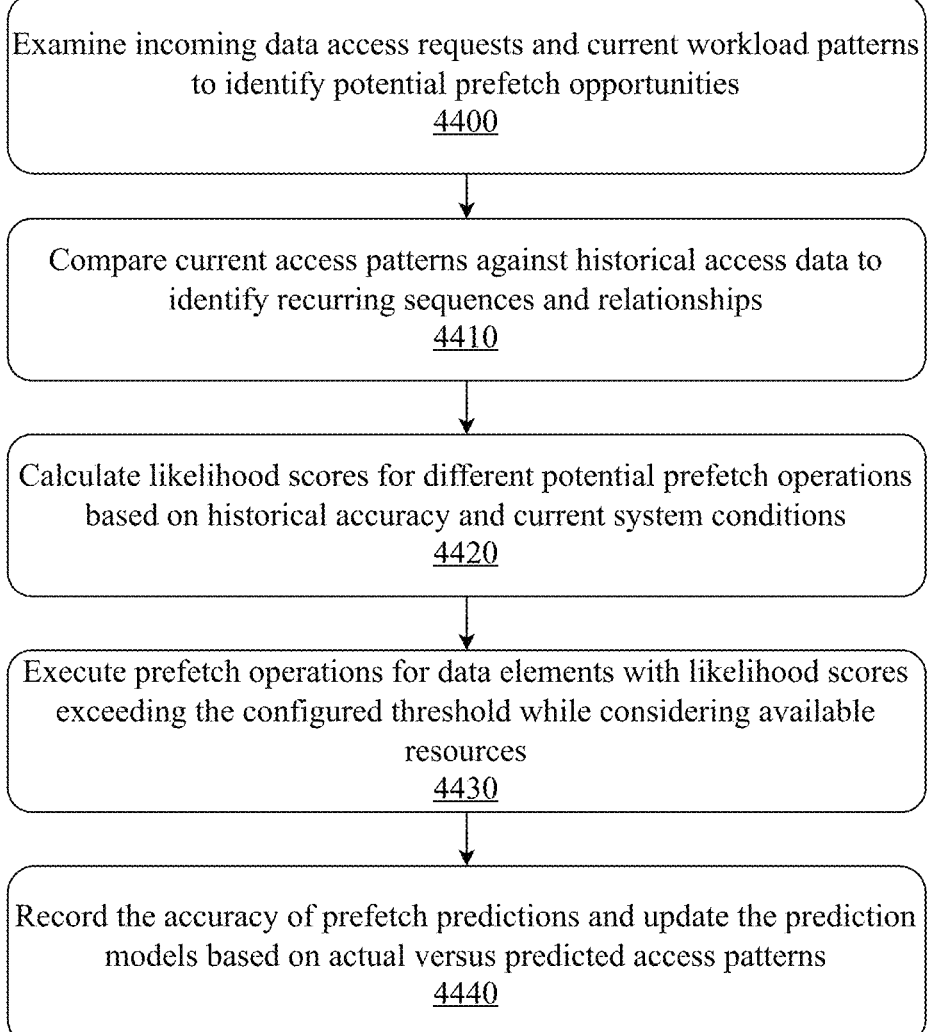

Examine incoming data access requests and current workload patterns
to identify potential prefetch opportunities
4400

Compare current access patterns against historical access data to
identify recurring sequences and relationships
4410

Calculate likelihood scores for different potential prefetch operations
based on historical accuracy and current system conditions
4420

Execute prefetch operations for data elements with likelihood scores
exceeding the configured threshold while considering available
resources
4430

Record the accuracy of prefetch predictions and update the prediction
models based on actual versus predicted access patterns
4440

FIG. 44

SYSTEM AND METHOD FOR DATA STORAGE, TRANSFER, SYNCHRONIZATION, AND SECURITY USING AUTOMATED MODEL MONITORING AND TRAINING WITH A LOAD-ADAPTIVE CACHE

CROSS-REFERENCE TO RELATED APPLICATIONS

Priority is claimed in the application data sheet to the following patents or patent applications, each of which is expressly incorporated herein by reference in its entirety:
Ser. No. 18/939,537
Ser. No. 18/161,080

BACKGROUND OF THE INVENTION

Field of the Invention

The present invention is in the field of computer data storage and transmission, and in particular to statistical analysis of datasets for automated algorithm training.

Discussion of the State of the Art

As computers become an ever-greater part of our lives, and especially in the past few years, data storage has become a limiting factor worldwide. Prior to about 2010, the growth of data storage far exceeded the growth in storage demand. In fact, it was commonly considered at that time that storage was not an issue, and perhaps never would be, again. In 2010, however, with the growth of social media, cloud data centers, high tech and biotech industries, global digital data storage accelerated exponentially, and demand hit the zetta-byte (1 trillion gigabytes) level. Current estimates are that data storage demand will reach 175 zettabytes by 2025. By contrast, digital storage device manufacturers produced roughly 1 zettabyte of physical storage capacity globally in 2016. We are producing data at a much faster rate than we are producing the capacity to store it. In short, we are running out of room to store data, and need a breakthrough in data storage technology to keep up with demand.

The primary solutions available at the moment are the addition of additional physical storage capacity and data compression. As noted above, the addition of physical storage will not solve the problem, as storage demand has already outstripped global manufacturing capacity. Data compression is also not a solution. A rough average com-pression ratio for mixed data types is 2:1, representing a doubling of storage capacity. However, as the mix of global data storage trends toward multi-media data (audio, video, and images), the space savings yielded by compression either decreases substantially, as is the case with lossless compression which allows for retention of all original data in the set, or results in degradation of data, as is the case with lossy compression which selectively discards data in order to increase compression. Even assuming a doubling of storage capacity, data compression cannot solve the global data storage problem. The method disclosed herein, on the other hand, works the same way with any type of data.

Transmission bandwidth is also increasingly becoming a bottleneck. Large data sets require tremendous bandwidth, and we are transmitting more and more data every year between large data centers. On the small end of the scale, we are adding billions of low bandwidth devices to the global network, and data transmission limitations impose constraints on the development of networked computing appli-cations, such as the "Internet of Things".

Furthermore, as quantum computing becomes more and more imminent, the security of data, both stored data and data streaming from one point to another via networks, becomes a critical concern as existing encryption technolo-gies are placed at risk.

What is needed is a fundamentally new approach to data storage and transmission, that allows for dramatically more storage versus existing methods on the same physical stor-age device, and that supports automated system efficacy monitoring and model training.

SUMMARY OF THE INVENTION

The inventor has developed a system and method for system and method for data storage, transfer, synchroniza-tion, and security using automated model monitoring and training with a load-adaptive cache. New data sourceblocks may be processed and assigned new codewords which are compiled into an updated codebook which may be distrib-uted back to encoding and decoding systems and devices. Additionally, the inventor has developed a novel approach for simultaneous compression and encryption of data using a dyadic distribution-based algorithm, which can be inte-grated with the existing system to provide enhanced effi-ciency and security.

According to a first preferred embodiment, a system for data storage, transfer, synchronization, and security using automated model monitoring and training with a load-adaptive cache, comprising: a computing device comprising a processor and a memory; a codebook training module comprising a first plurality of programming instructions that, when operating on the processor, cause the processor to: receive data; process the data to generate a test dataset; retrieve at least one probability distribution associated with a previous training dataset; analyze the test dataset to determine at least one new probability distribution; retrain encoding and decoding algorithms using the test dataset; apply the retrained algorithms to generate one or more data units from the test dataset; associate each of the one or more data units with a corresponding identifier; and store the one or more data units and their corresponding identifiers in an updated data structure; a load-adaptive cache subsystem comprising a second plurality of programming instructions that, when operating on the processor, cause the processor to: monitor system performance metrics and resource utili-zation across system components; analyze temporal and spatial relationships in data access patterns; calculate like-lihood scores for potential prefetch operations based on historical accuracy; dynamically adjust cache parameters based on current performance metrics; maintain multiple cache levels with different performance characteristics for different data types; and execute prefetch operations based on prediction models while considering available resources, is disclosed.

The system may further comprise a network device man-ager and a codebook update engine to manage device data and distribute updated codebooks to network-connected devices. The dyadic distribution subsystem may implement security measures, use Huffman coding for compression, and operate in either lossless or lossy modes.

According to another preferred embodiment, a method for data storage, transfer, synchronization, and security using automated model monitoring and training with a load-adaptive cache, comprising the steps of: receiving input data; processing the input data to generate a test dataset;

retrieving at least one probability distribution associated with a previous training dataset; analyzing the test dataset to determine at least one new probability distribution; retraining encoding and decoding algorithms using the test dataset; applying the retrained algorithms to generate one or more data units from the test dataset; associating each of the one or more data units with a corresponding identifier; and storing the one or more data units and their corresponding identifiers in an updated data structure; monitoring system performance metrics and resource utilization across system components; analyzing temporal and spatial relationships in data access patterns; calculating likelihood scores for potential prefetch operations based on historical accuracy; dynamically adjusting cache parameters based on current performance metrics; maintaining multiple cache levels with different performance characteristics for different data types; and executing prefetch operations based on prediction models while considering available resources.

The method may further include steps for managing device data, updating codebooks, implementing security measures, and operating in either lossless or lossy modes. The method can be performed on a cloud-based computing device and may use Huffman coding for compression.

The system further comprises a dyadic distribution subsystem that analyzes an input data stream to determine its properties, creates a transformation matrix based on these properties, and transforms the input data into a dyadic distribution. This subsystem generates a main data stream of transformed data and a secondary data stream of transformation information, compresses the main data stream, and combines the compressed main data stream and the secondary data stream into an output stream. The dyadic distribution subsystem performs compression and encryption in a single pass over the input data, significantly improving efficiency.

The dyadic distribution subsystem can operate in multiple modes, including a lossless mode where both the main data stream and the secondary data stream are included in the output stream, ensuring perfect reconstruction of the original data, and a lossy mode where only the main data stream is included in the output stream, providing higher compression ratios at the cost of some data loss. The subsystem also implements security measures to protect the output stream, enhancing the overall security of the compressed and encrypted data.

The system's network device manager is capable of monitoring network connected device resource consumption and periods of device downtime, allowing for optimized codebook distribution and updates. The entire system and method can be implemented on cloud-based computing devices, enabling scalable and distributed processing.

According to another preferred embodiment, the method for storing, retrieving, transmitting, and simultaneously compressing and encrypting data in a highly compact format includes the steps of analyzing an input data stream to determine its properties, creating a transformation matrix based on the properties of the input data, transforming the input data into a dyadic distribution, generating a main data stream of transformed data and a secondary data stream of transformation information, compressing the main data stream, and combining the compressed main data stream and the secondary data stream into an output stream. This method can be performed independently of the codebook training process, allowing for flexible deployment in various scenarios.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 8 is a method diagram showing the steps involved in using an embodiment to store data.

FIG. 17 is a method diagram illustrating possible use of a hybrid encoder/decoder to improve the compression ratio.

FIG. 31 is a method diagram illustrating the steps involved in using an embodiment of the codebook training system to update a codebook.

FIG. 34 is a method diagram illustrating an exemplary method for implementing a dyadic distribution algorithm.

FIG. 35 is a method diagram illustrating an exemplary method for providing lossless, dyadic distribution-based compression and encryption.

FIG. 36 is a flow diagram illustrating an exemplary method for providing lossy, dyadic distribution-based compression and encryption.

FIG. 37 is a flow diagram illustrating an exemplary method for providing modified lossless, dyadic distribution-based compression and encryption.

FIG. 38 is a method diagram illustrating integrated data processing with dyadic distribution-based compression and encryption.

FIG. 39 is a method diagram illustrating integrated data processing with dyadic distribution-based decryption and decompression.

FIG. 42 is a flow diagram illustrating an exemplary method for analyzing caching patterns using a system for data storage, transfer, synchronization, and security using automated model monitoring and training with a load-adaptive cache, a load-adaptive cache.

FIG. 43 is a flow diagram illustrating an exemplary method for dynamic cache management using a system for data storage, transfer, synchronization, and security using automated model monitoring and training with a load-adaptive cache, a load-adaptive cache.

FIG. 44 is a flow diagram illustrating an exemplary method for predictive prefetching using a system for data storage, transfer, synchronization, and security using automated model monitoring and training with a load-adaptive cache, a load-adaptive cache.

DETAILED DESCRIPTION OF THE INVENTION

Figure 1:
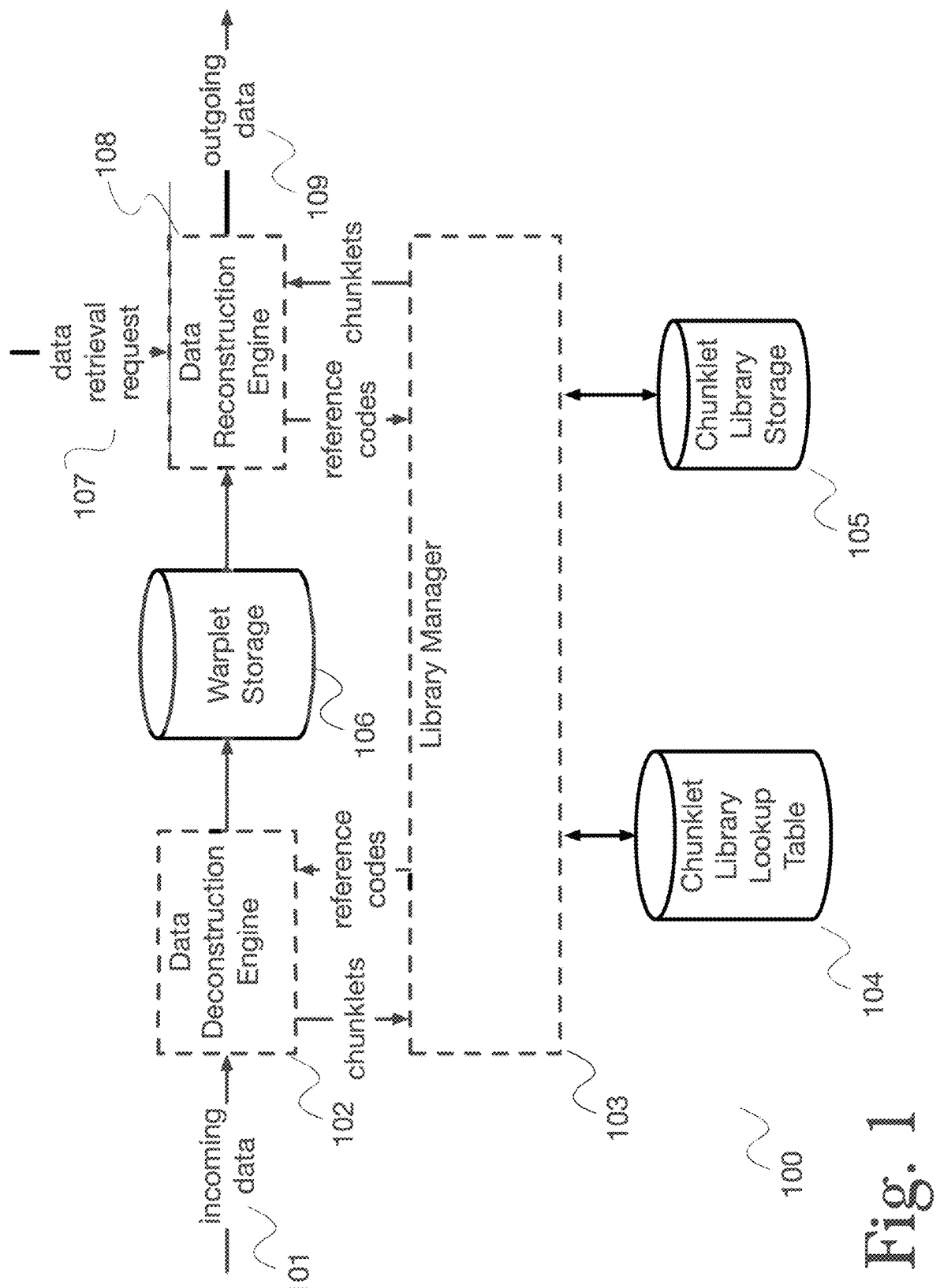
FIG. 1 is a diagram showing an embodiment of the system in which all components of the system are operated locally.

A system and method for data storage, transfer, synchronization, and security using automated system efficacy monitoring and model training is disclosed. The system utilizes statistical analyses of test datasets to determine if the probability distribution of two datasets are within a predetermined range. Responsive to that determination, new encoding and decoding algorithms may be retrained to produce new data sourceblocks. The new data sourceblocks may then be processed and assigned new codewords which are compiled into an updated codebook. This updated codebook may be distributed back to encoding and decoding systems and devices. Additionally, the system incorporates a novel dyadic distribution subsystem for simultaneous compression and encryption of data, offering significant improvements in efficiency and security over traditional methods.

A key factor in machine learned algorithm and model degradation is over time is related to data drift. Data drift is a change in the distribution of data such as a change between real-time production data and a baseline (training) dataset. Indeed, most real-world datasets suffer from this problem and can cause models and their underlying algorithms to produce sub-optimal outputs the longer they are in use. In the context of the disclosed encoding and decoding systems, this may result in errors occurring during the deconstruction and reconstruction of transmitted data. To make the systems robust against data drift and other model behavioral changes, a codebook training system is disclosed which facilitates periodic sampling of incoming, real-world data, which may be gathered and analyzed to determine if data drift has occurred. Furthermore, if data drift is discovered, then the codebook training system may automatically retrain existing encoding/decoding algorithms to account for the changes in the incoming data.

At the core of the dyadic platform is the observation that both lossless compression and encryption share a common goal: transforming data reversibly and efficiently into an approximately uniformly random string. In compression, this uniformity indicates that the data cannot be further compressed, while in encryption, it ensures that no information can be extracted from the encrypted sequence. By leveraging this shared objective, the platform achieves both compression and encryption simultaneously, offering significant improvements in efficiency and security over traditional methods that treat these processes separately.

The dyadic system operates on the principle of transforming input data into a dyadic distribution whose Huffman encoding is close to uniform. This is achieved through the use of a transformation matrix B, which maps the original data distribution to the desired dyadic distribution. The transformations applied to the data are then stored in a compressed secondary stream, which is interwoven with the main data stream.

The dyadic platform is built upon solid theoretical foundations from information theory, cryptography, and data compression. These foundations provide the mathematical basis for the system's ability to simultaneously compress and encrypt data efficiently.

The system leverages the concept of entropy from information theory. For a discrete probability distribution P, the entropy H(P) is defined as: $H(P) = -\Sigma(p(x) * \log_2(p(x)))$ where $p(x)$ is the probability of symbol x. Entropy represents the theoretical limit of lossless data compression. The dyadic distribution algorithm aims to transform the data distribution to approach this limit.

A key aspect of the dyadic system is the transformation of data into a dyadic distribution. A distribution is dyadic if all probabilities are of the form $\frac{1}{2}^k$ for some integer k. Dyadic distributions are optimal for Huffman coding, as they result in integer-length codewords. The system utilizes Huffman coding, which is provably optimal for symbol-by-symbol encoding with known probabilities. The system constructs a Huffman tree T(C) for the encoding C, where the depth d(v) of a vertex v in T(C) relates to the probability of the symbol it represents.

The transformation matrix B is important to the platform's operation. It is designed to satisfy: $\Sigma(\sigma(\omega') * b\_\omega\omega') = \pi(\omega)$ for all $\omega \in \Omega$ where $\sigma$ is the original distribution, $\pi$ is the Huffman-implied distribution, and $\Omega$ is the set of states. This ensures that applying B to data sampled from $\sigma$ results in data distributed according to $\pi$.

The dyadic algorithm models the input data as samples from a Markov chain. This allows for the use of mixing time $\tau$ in security analysis. The mixing time is defined as: $\tau = \min\{t : \Delta(t) \leq 1/(2e)\}$ where $\Delta(t)$ is the maximum total variation distance between the chain's distribution at time t and its stationary distribution.

The security of the dyadic system is analyzed using a modified version of Yao's next-bit test. For a bit string C(x) produced by the dyadic algorithm, it is proved that: $|Pr[C(x)\_j = 0] - \frac{1}{2}| \leq 2 * (e^{\wedge}(-\lfloor j/(2M-m) \rfloor/\tau))/(1 - e^{\wedge}(-1/\tau))$ where M and m are the maximum and minimum codeword lengths, and $\tau$ is the mixing time of the Markov chain.

The system's performance may be analyzed using the Kullback-Leibler (KL) divergence, which measures the difference between two probability distributions P and Q: $KL(P\|Q) = \Sigma(P(x) * \log(P(x)/Q(x)))$. This is used to bound the difference between the original and transformed distributions.

The platform's compression efficiency is related to the cross-entropy $H(\sigma, \pi)$ between the original distribution $\sigma$ and the Huffman-implied distribution $\tau$. It is proved that: $|H(\sigma, \pi) - H(\pi)| \leq (M\sqrt{2})/\ln(2)$ where M is the maximum codeword length. This bounds the extra bits needed to encode $\sigma$ beyond its entropy rate.

The security of the interleaved streams is analyzed using probability bounds on predicting bits in the combined stream. For the interleaved stream Z, it can be shown that: $|Pr[Z\_j = 0] - \frac{1}{2}| \leq \max(2 * (e^{\wedge}(-\lfloor j'/(2M-m) \rfloor/(\tau\mu\|B\|_1)))/(1 - e^{\wedge}(-1/(\tau\|B\|_1))), b\_{(j-j')})$ where j' is the number of bits from the main stream, $\|B\|_1$ is the 1-norm of B, and b_k bounds the predictability of the transformation stream.

One key feature of the dyadic system is its ability to pass a modified version of Yao's "next-bit test", a standard measure of cryptographic security. This means that nearby bits in the output stream cannot be predicted with substantial accuracy, even given all previous data. Importantly, the dyadic system achieves this level of security while requiring significantly fewer bits of entropy than standard encryption methods.

The dyadic system can operate in various modes: a lossless mode where both the main data stream and the transformation data are transmitted, allowing perfect reconstruction of the original data, a modified lossless mode, and a lossy mode where only the transformed data is transmitted, providing even stronger encryption at the cost of perfect reconstruction.

In its operation, dyadic platform first analyzes the input data to estimate its probability distribution. It then constructs a Huffman encoding based on this distribution, which defines another distribution $\pi$ over the data space. The system partitions the data space into overrepresented states (where the original probability is greater than or equal to the Huffman-implied probability) and underrepresented states (where the original probability is less than the Huffman-implied probability).

The transformation matrix B is then constructed to map the original distribution to the Huffman-implied distribution. This matrix has several important properties: 1. It is row-stochastic, meaning the sum of each row is 1. 2. When applied to data sampled from the original distribution, it produces the Huffman-implied distribution. 3. Underrepresented states only transform to themselves. 4. Overrepresented states only transform to themselves or to underrepresented states.

The dyadic distribution algorithm applies these transformations to the input data, producing a main data stream that follows the Huffman-implied distribution (and is thus highly compressible) and a secondary stream containing the transformation information. These streams may be interleaved to produce the final output.

The security of this system stems from several factors. First, the transformation process introduces controlled randomness into the data. Second, the interleaving of the two streams makes it difficult to separate the transformed data from the transformation information. Finally, the system passes a modified next-bit test, ensuring that future bits cannot be predicted with significant accuracy even given all previous bits. Importantly, the dyadic distribution algorithm requires significantly less entropy (random bits) than traditional encryption methods. This is because the randomness is introduced in a controlled manner through the transformation process, rather than being applied to the entire data stream. The system may also include protections against various side-channel attacks, implemented by a security subsystem. These include measures to prevent timing attacks, power analysis, cache attacks, and other potential vulnerabilities.

The system further comprises a network device manager that monitors network-connected device resource consumption and periods of device downtime. This allows for optimized codebook distribution and updates across the network. The network device manager receives device data from a plurality of network-connected devices, stores this data, analyzes it to monitor resource consumption and downtime, and forwards relevant information to a codebook update engine.

A codebook update engine works in conjunction with the network device manager to efficiently distribute updated codebooks. It receives the newly updated codebooks, stores them temporarily in a cache, and then publishes them to the appropriate network-connected devices based on the device data received from the network device manager. This ensures that codebook updates are distributed at optimal times, minimizing disruption to device operations.

The dyadic distribution subsystem can operate in multiple modes to suit different use cases. In a lossless mode, both the main data stream and the secondary data stream (containing transformation information) are included in the output stream, ensuring perfect reconstruction of the original data. In a lossy mode, only the main data stream is included in the output stream, providing higher compression ratios and stronger encryption at the cost of some data loss. This flexibility allows users to balance their needs for data fidelity, compression efficiency, and security.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "byte" refers to a series of bits exactly eight bits in length.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression factor" and "deflation factor" as used herein mean the net reduction in size of the compressed data relative to the original data (e.g., if the new data is 70% of the size of the original, then the deflation/compression factor is 30% or 0.3.)

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "data" means information in any computer-readable form.

The term "chunklet" refers to a series of bits of a specified length. The number of bits in a chunklet may be dynamically optimized by the system during operation. In one aspect, a chunklet may be of the same length as the block size used by a particular file system, typically 512 bytes or 4,096 bytes.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

The term "effective compression" or "effective compression ratio" refers to the additional amount data that can be stored using the method herein described versus conventional data storage methods. Although the method herein described is not data compression, per se, expressing the additional capacity in terms of compression is a useful comparison.

The term "data set" refers to a grouping of data for a particular purpose. One example of a data set might be a word processing file containing text and formatting information.

The term "library" refers to a database containing chunklets each with a pattern of bits and reference code unique within that library. The term "codebook" is synonymous with the term library.

The term "warplet" refers to the reference code form in which data is stored or transmitted in an aspect of the system. A warplet consists of a reference code or "codeword" to a chunklet in the library plus an indication of that chunklet's location in a particular data set.

The term "sourcepacket" as used herein means a packet of data received for encoding or decoding. A sourcepacket may be a portion of a data set.

The term "sourceblock" as used herein means a defined number of bits or bytes used as the block size for encoding or decoding. A sourcepacket may be divisible into a number of sourceblocks. As one non-limiting example, a 1 megabyte sourcepacket of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes. Souceblock should be understood to carry the same meaning as the term "chunklet".

The term "codeword" refers to the reference code form in which data is stored or transmitted in an aspect of the system. A codeword consists of a reference code to a sourceblock in the library plus an indication of that sourceblock's location in a particular data set. Codeword should be understood to carry the same meaning as the term "warplet".

Conceptual Architecture

Figure 40:
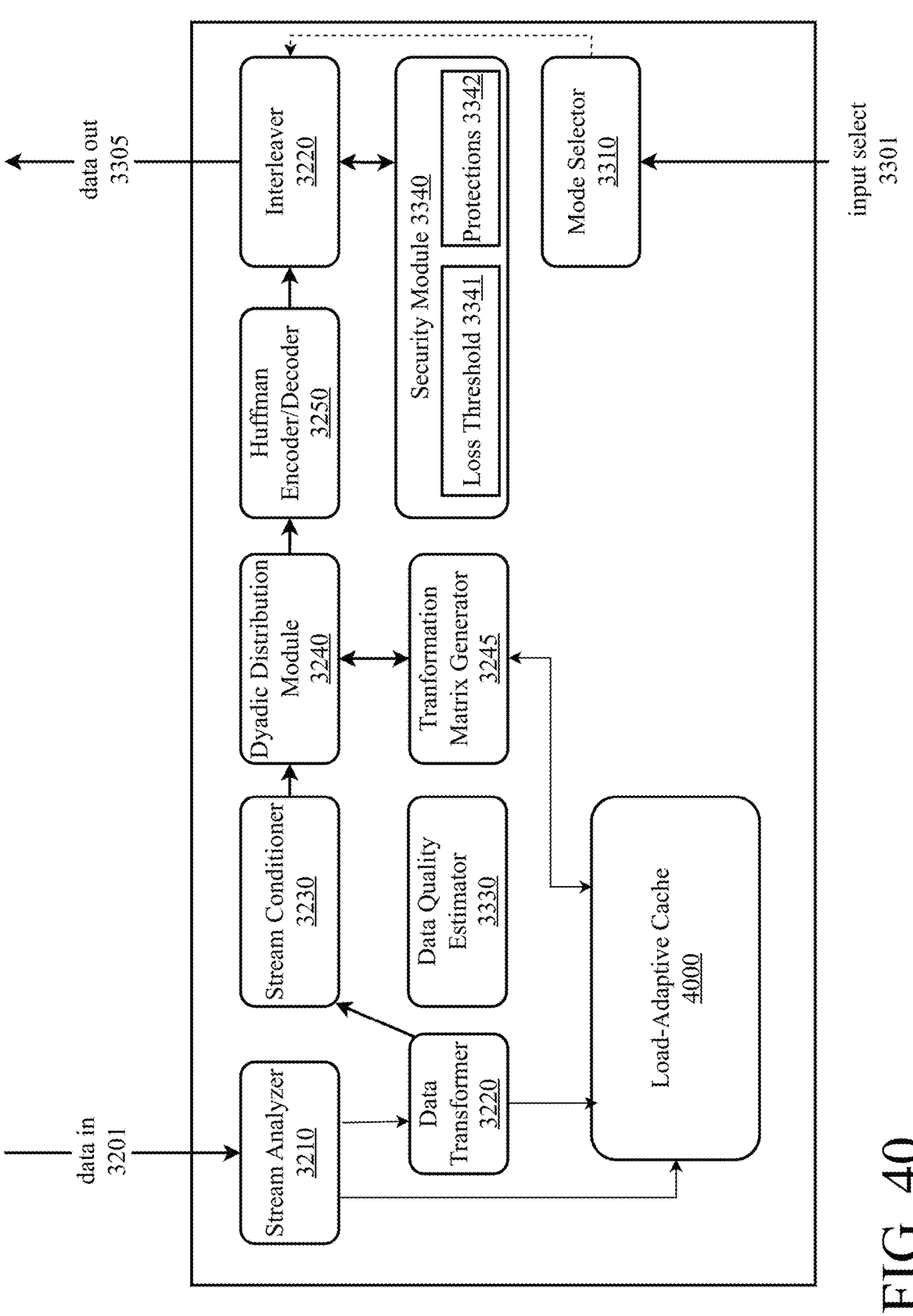
FIG. 40 is a block diagram illustrating an exemplary system architecture for a system for data storage, transfer, synchronization, and security using automated model monitoring and training with a load-adaptive cache.

FIG. 40 is a block diagram illustrating an exemplary system architecture for a system for data storage, transfer, synchronization, and security using automated model monitoring and training with a load-adaptive cache. A load-adaptive cache 4000 interfaces with multiple components of the system to optimize performance and reduce processing overhead. Input data 3201 enters the system through the stream analyzer 3210, which analyzes the data stream to determine its statistical properties. The load-adaptive cache 4000 monitors the stream analyzer's output to identify recurring patterns and preemptively cache frequently accessed data elements.

A data transformer 3220 processes the analyzed data stream through a series of complex transformations designed to optimize data for compression and encryption. Load-adaptive cache 4000 enhances this process by maintaining a sophisticated cache of commonly used transformation results based on observed data patterns. When processing new data streams, the system can identify similar input patterns and retrieve pre-computed transformation results, eliminating the need for redundant calculations. For example, when processing similar types of data blocks, the cache can provide immediate access to previously computed transformation values rather than recalculating them. A stream conditioner 3230 further refines the data stream through additional processing steps, with load-adaptive cache 4000 maintaining detailed historical records of conditioning operations and their outcomes. This historical data enables the system to predict which conditioning operations will be needed for incoming data streams and preemptively prepare the necessary resources, significantly reducing processing latency and computational overhead.

A dyadic distribution module 3240 operates in coordination with a transformation matrix generator 3245 to execute the data processing operations that enable simultaneous compression and encryption. Load-adaptive cache 4000 serves as an intelligent buffer between these components, maintaining a dynamically updated store of frequently used transformation matrices and their intermediate computational results. This caching strategy is particularly effective for matrix operations, which typically require substantial computational resources to generate and apply. By identifying patterns in matrix usage and maintaining commonly used matrices in cache, the system can avoid the expensive recomputation of similar transformations. For instance, when processing data streams with similar statistical properties, the cached matrices can be reused or slightly modified rather than generated from scratch. This optimization extends beyond simple matrix storage, as load adaptive cache 4000 may also maintain intermediate results from partial matrix computations, allowing the system to accelerate even complex transformation sequences that share common computational elements. The result is a significant reduction in matrix generation and computation overhead, leading to improved throughput and reduced latency across the entire processing pipeline.

The system incorporates quality control through the data quality estimator 3330, which works in coordination with load-adaptive cache 4000 to maintain strict data fidelity standards throughout all caching operations. Data quality estimator 3330 continuously monitors the accuracy and integrity of cached data, comparing original and cached versions to ensure that optimization efforts do not introduce unacceptable degradation. When potential quality issues are detected, data quality estimator 3330 may trigger cache invalidation or adjustment of caching parameters to maintain quality thresholds. A mode selector 3310 provides granular control over system behavior by enabling different operational modes, such as maximum compression, highest security, or balanced operation. Load-adaptive cache 4000 responds to these mode selections by dynamically modifying its caching strategies—for example, in maximum security mode, it might implement stricter cache entry validation and more frequent cache clearing, while in high-performance mode it might retain cached data longer and implement more aggressive prefetching. A security module 3340 adds protection through its loss threshold 3341, which establishes boundaries for acceptable data loss during caching operations, and its protections 3342, which implements various security measures such as cache encryption, access control, and timing attack prevention. These security features ensure that the caching system cannot be exploited as a vector for data leakage or system compromise.

A data processing pipeline culminates as the processed stream passes through a huffman encoder/decoder 3250 for final compression before interleaver 3220 assembles the final output 3305. Load-adaptive cache 4000 maintains comprehensive awareness of the entire system's state through its sophisticated monitoring network connected to each major component. This awareness enables real-time optimization decisions—for example, during periods of high encoder load, the cache might prioritize storing frequently used Huffman tables and intermediate encoding results to reduce processing overhead. Load adaptive cache 4000 continuously adjusts its strategies based on multiple factors including current processing loads, memory availability, network conditions, and component-specific metrics such as encoder queue depths or interleaver buffer states. This holistic approach to system monitoring enables load adaptive cache 4000 to make intelligent decisions about resource allocation and data retention. For instance, if interleaver 3220 is experiencing high load, load adaptive cache 4000 might temporarily increase its allocation for storing pre-interleaved data blocks, or if the encoder is showing signs of stress, the cache might prioritize storing commonly occurring patterns that can be encoded as single units. Throughout all these adaptations, load adaptive cache 4000 maintains strict adherence to the security and quality parameters established by the control components, ensuring that performance optimizations never compromise the system's fundamental requirements for data protection and fidelity.

Figure 41:
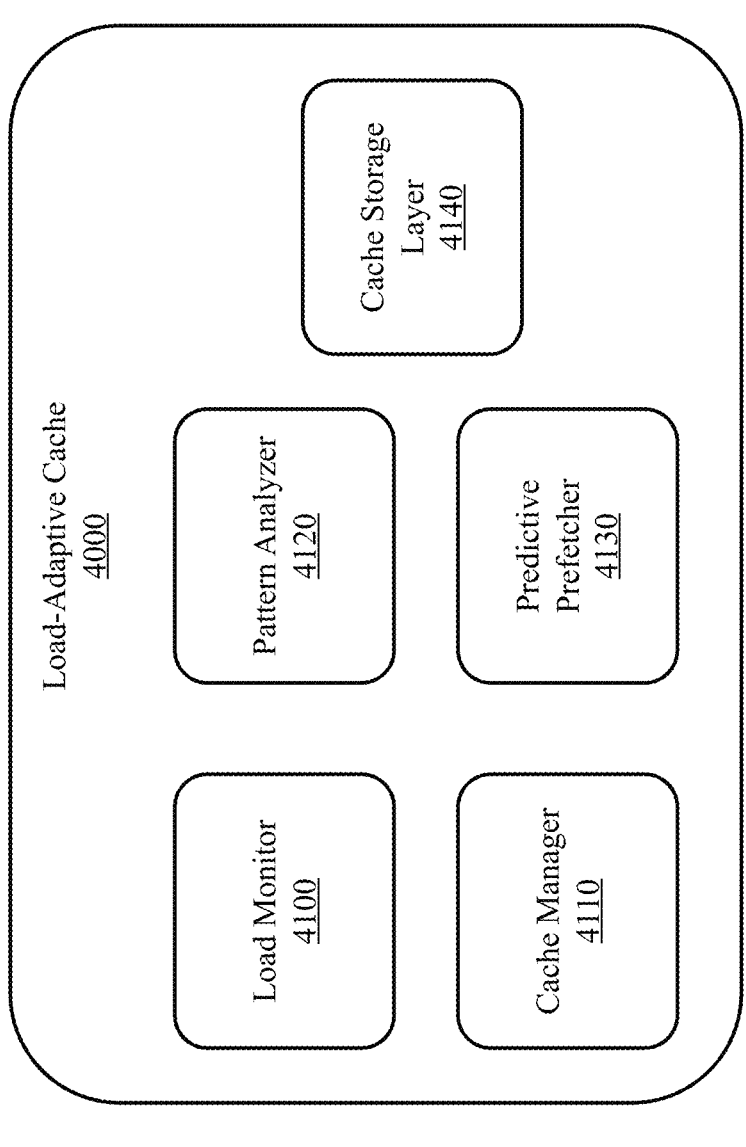
FIG. 41 is a block diagram illustrating an exemplary component for a system for data storage, transfer, synchronization, and security using automated model monitoring and training with a load-adaptive cache, a load-adaptive cache.

FIG. 41 is a block diagram illustrating an exemplary component for a system for data storage, transfer, synchronization, and security using automated model monitoring and training with a load-adaptive cache, a load-adaptive cache. A load monitor 4100 implements a comprehensive performance monitoring framework that continuously tracks and analyzes system behavior across multiple dimensions. Load monitor 4100 collects metrics including but not limited to processor utilization rates, memory consumption patterns, I/O queue depths, network bandwidth usage, and component-specific performance indicators across all connected elements of the dyadic distribution platform. Load monitor

4100 employs sampling techniques to gather high-resolution performance data while minimizing monitoring overhead. For example, it might adjust its sampling frequency based on system activity levels, increasing the sampling rate during periods of rapid change while reducing it during stable operations. Through statistical analysis of these metrics, load monitor 4100 generates real-time load profiles that characterize current system behavior and identify potential performance bottlenecks, enabling other components to make informed decisions about resource allocation and caching strategies.

Cache manager 4110 functions as the system's central orchestration unit, implementing a decision-making framework that coordinates all caching operations based on current system conditions and performance requirements. Working in coordination with load monitor 4100, cache manager 4000 may employ adaptive algorithms to optimize cache utilization across multiple dimensions. It one embodiment, cache manager 4110 implements dynamic cache partitioning, automatically adjusting the allocation of cache space between different data types based on their observed usage patterns and importance to system performance. Cache manager 4110 also maintains hierarchical eviction policies that consider multiple factors when determining which cached items to retain or remove. These factors may include but are not limited to access frequency, data size, computational cost of regeneration, and relationship to other cached items. For example, if certain transformation matrices are computationally expensive to generate but frequently used, they might be given higher retention priority even if their access frequency temporarily decreases. Cache manager 4110 also implements priority assignment mechanisms that can dynamically adjust the importance of different cache entries based on current system requirements and processing patterns.

A pattern analyzer 4120 implements advanced analytics capabilities to discover and characterize complex relationships in data access patterns. This component maintains detailed historical access logs and employs data mining algorithms to identify both temporal and spatial access patterns across different timescales. Pattern analyzer 4120 can identify various types of relationships, such as sequential access patterns where certain data elements are typically accessed in specific sequences, temporal correlations where access to certain data types follows predictable time-based patterns, and spatial relationships where groups of related data elements tend to be accessed together. These patterns are continuously refined and updated as new access data becomes available, allowing the system to adapt to changing usage patterns over time. Pattern analyzer 4120 maintains an integration with a predictive prefetcher 4130, providing it with detailed pattern information that enables prefetch decision-making. Predictive prefetcher 4130 uses this pattern data along with current system state information to make intelligent decisions about when and what to prefetch. It employs probabilistic models to evaluate the likelihood of future data needs, balancing the potential benefits of prefetching against current resource availability and system load conditions. For example, during periods of low system load, prefetcher 4130 might aggressively prefetch data elements that have even a moderate probability of future use, while during high-load periods, it might become more selective, only prefetching data with very high probability of imminent use.

Predictive prefetcher 4130 may implement a sophisticated multi-tiered prefetching system that combines historical pattern analysis with real-time system state evaluation to optimize cache population. This component employs adaptive prefetch algorithms that continuously adjust their behavior based on observed prediction accuracy and system conditions. Prefetcher 4130 maintains multiple prediction models optimized for different types of data and access patterns—for example, one model might specialize in predicting transformation matrix requirements based on input data characteristics, while another focuses on predicting sequence-dependent data needs in the encryption pipeline. Each prediction model incorporates feedback mechanisms that track prediction accuracy and adjust confidence thresholds accordingly. Prefetcher 4130 also implements resource-aware scheduling algorithms that carefully time prefetch operations to minimize their impact on system performance. For instance, during periods of high system load, prefetcher 4130 might delay non-critical prefetch operations or spread them out over time to avoid resource contention. The component maintains sophisticated cost-benefit analysis mechanisms that evaluate each potential prefetch operation based on multiple factors including the computational cost of generating the data, the probability of its future use, the current availability of cache space, and the system's overall load state. This comprehensive approach enables the prefetcher to make intelligent decisions that balance the benefits of having data readily available in cache against the resources required to prefetch and store it.

A cache storage layer 4140 implements a hierarchical storage architecture that provides flexible and efficient data caching capabilities across multiple performance tiers. Cache storage layer 4140 utilizes a multi-level caching structure where each level is optimized for specific types of data and access patterns. For example, the highest performance tier might use high-speed memory to cache frequently accessed transformation matrices and critical lookup tables, while lower tiers employ different storage technologies optimized for larger data blocks or less frequently accessed items. Cache storage layer 4140 maintains comprehensive metadata about each cached item, including access history, relationship to other cached data, computational cost of regeneration, and dependencies on system state. This metadata enables sophisticated cache management strategies such as predictive data migration between cache tiers based on changing access patterns or system conditions. Cache storage layer 4140 implements advanced data organization techniques such as spatial clustering of related data elements and optimized storage layouts for different data types. For instance, transformation matrices might be stored in a format optimized for rapid mathematical operations, while encoded data blocks might use a layout optimized for sequential access. Cache storage layer 4140 works in coordination with a cache manager 4110 to implement complex eviction policies that consider multiple factors when selecting items for removal. These policies can be dynamically adjusted based on current system requirements—for example, during periods of intense transformation operations, the system might modify its eviction strategy to preferentially retain transformation-related data even at the expense of other cached items. Cache storage layer 4140 may also implement data integrity mechanisms that ensure cached data remains valid and consistent, including versioning systems that track data dependencies and ensure cache coherence across all system components.

FIG. 1 is a diagram showing an embodiment 100 of the system in which all components of the system are operated locally. As incoming data 101 is received by data deconstruction engine 102. Data deconstruction engine 102 breaks the incoming data into sourceblocks, which are then sent to library manager 103. Using the information contained in sourceblock library lookup table 104 and sourceblock library storage 105, library manager 103 returns reference codes to data deconstruction engine 102 for processing into codewords, which are stored in codeword storage 106. When a data retrieval request 107 is received, data reconstruction engine 108 obtains the codewords associated with the data from codeword storage 106, and sends them to library manager 103. Library manager 103 returns the appropriate sourceblocks to data reconstruction engine 108, which assembles them into the proper order and sends out the data in its original form 109.

Figure 2:
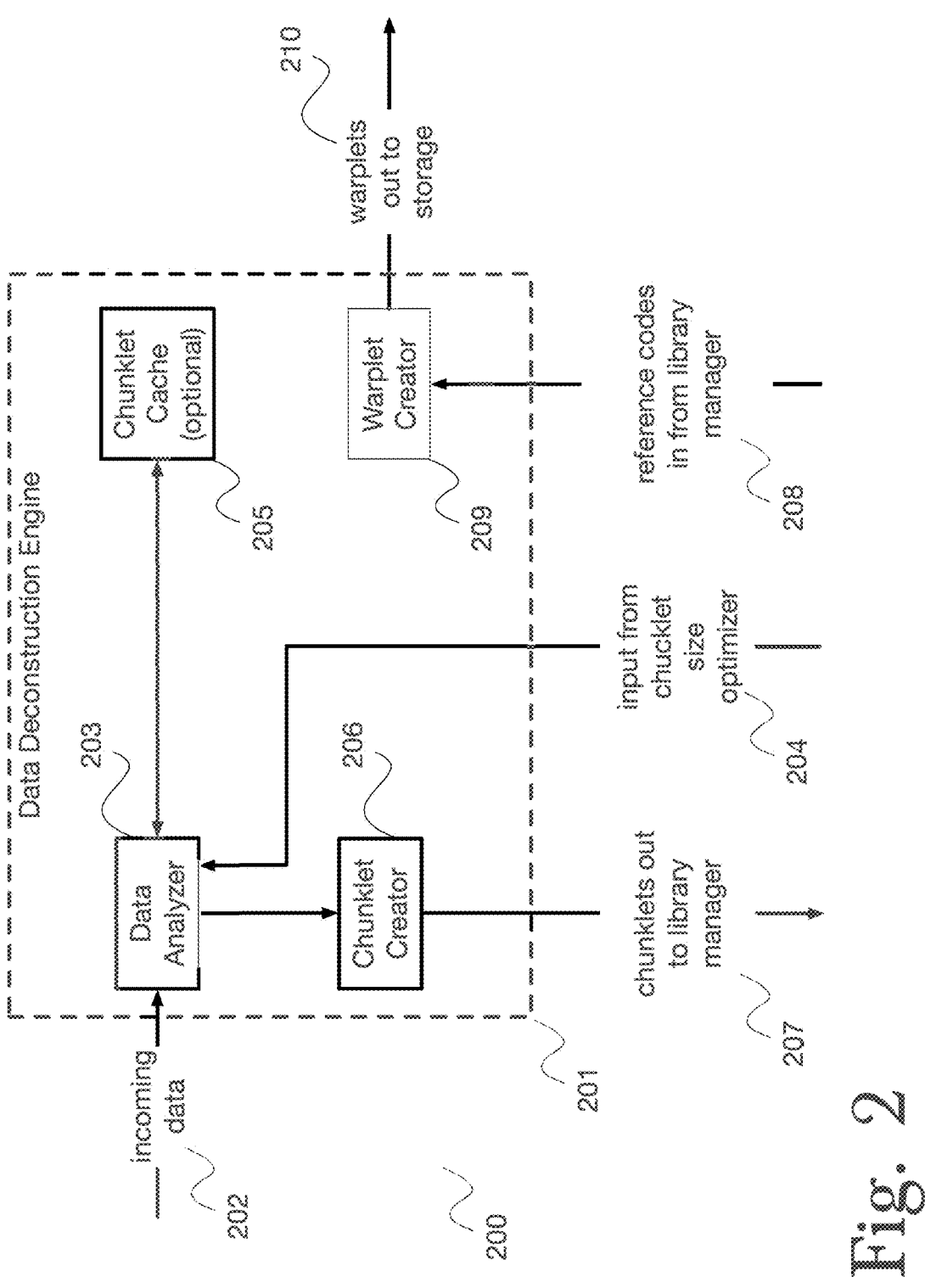
FIG. 2 is a diagram showing an embodiment of one aspect of the system, the data deconstruction engine.

FIG. 2 is a diagram showing an embodiment of one aspect 200 of the system, specifically data deconstruction engine 201. Incoming data 202 is received by data analyzer 203, which optimally analyzes the data based on machine learning algorithms and input 204 from a sourceblock size optimizer, which is disclosed below. Data analyzer may optionally have access to a sourceblock cache 205 of recently-processed sourceblocks, which can increase the speed of the system by avoiding processing in library manager 103. Based on information from data analyzer 203, the data is broken into sourceblocks by sourceblock creator 206, which sends sourceblocks 207 to library manager 203 for additional processing. Data deconstruction engine 201 receives reference codes 208 from library manager 103, corresponding to the sourceblocks in the library that match the sourceblocks sent by sourceblock creator 206, and codeword creator 209 processes the reference codes into codewords comprising a reference code to a sourceblock and a location of that sourceblock within the data set. The original data may be discarded, and the codewords representing the data are sent out to storage 210.

Figure 3:
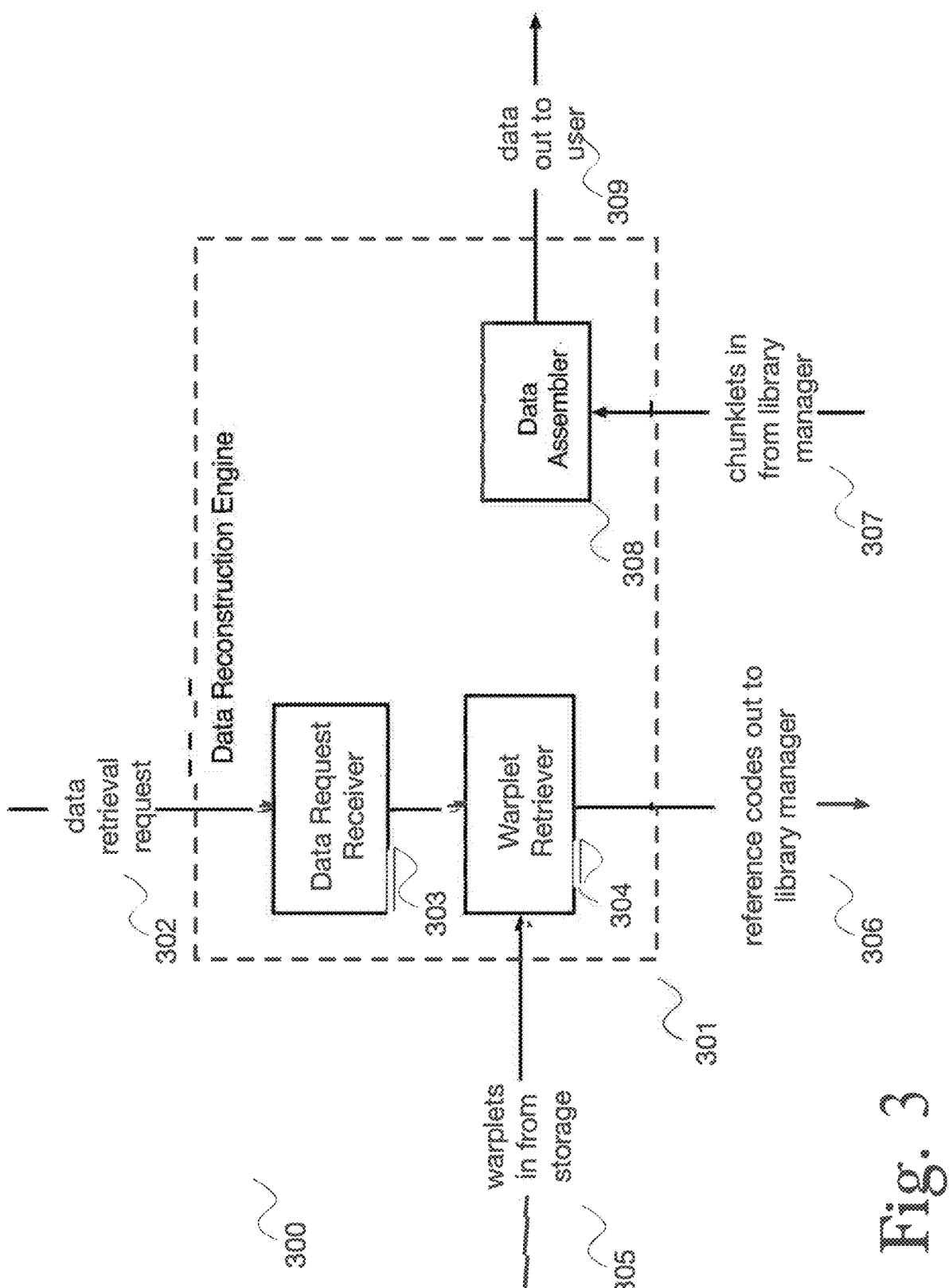
FIG. 3 is a diagram showing an embodiment of one aspect of the system, the data reconstruction engine.

FIG. 3 is a diagram showing an embodiment of another aspect of system 300, specifically data reconstruction engine 301. When a data retrieval request 302 is received by data request receiver 303 (in the form of a plurality of codewords corresponding to a desired final data set), it passes the information to data retriever 304, which obtains the requested data 305 from storage. Data retriever 304 sends, for each codeword received, a reference codes from the codeword 306 to library manager 103 for retrieval of the specific sourceblock associated with the reference code. Data assembler 308 receives the sourceblock 307 from library manager 103 and, after receiving a plurality of sourceblocks corresponding to a plurality of codewords, assembles them into the proper order based on the location information contained in each codeword (recall each codeword comprises a sourceblock reference code and a location identifier that specifies where in the resulting data set the specific sourceblock should be restored to. The requested data is then sent to user 309 in its original form.

Figure 4:
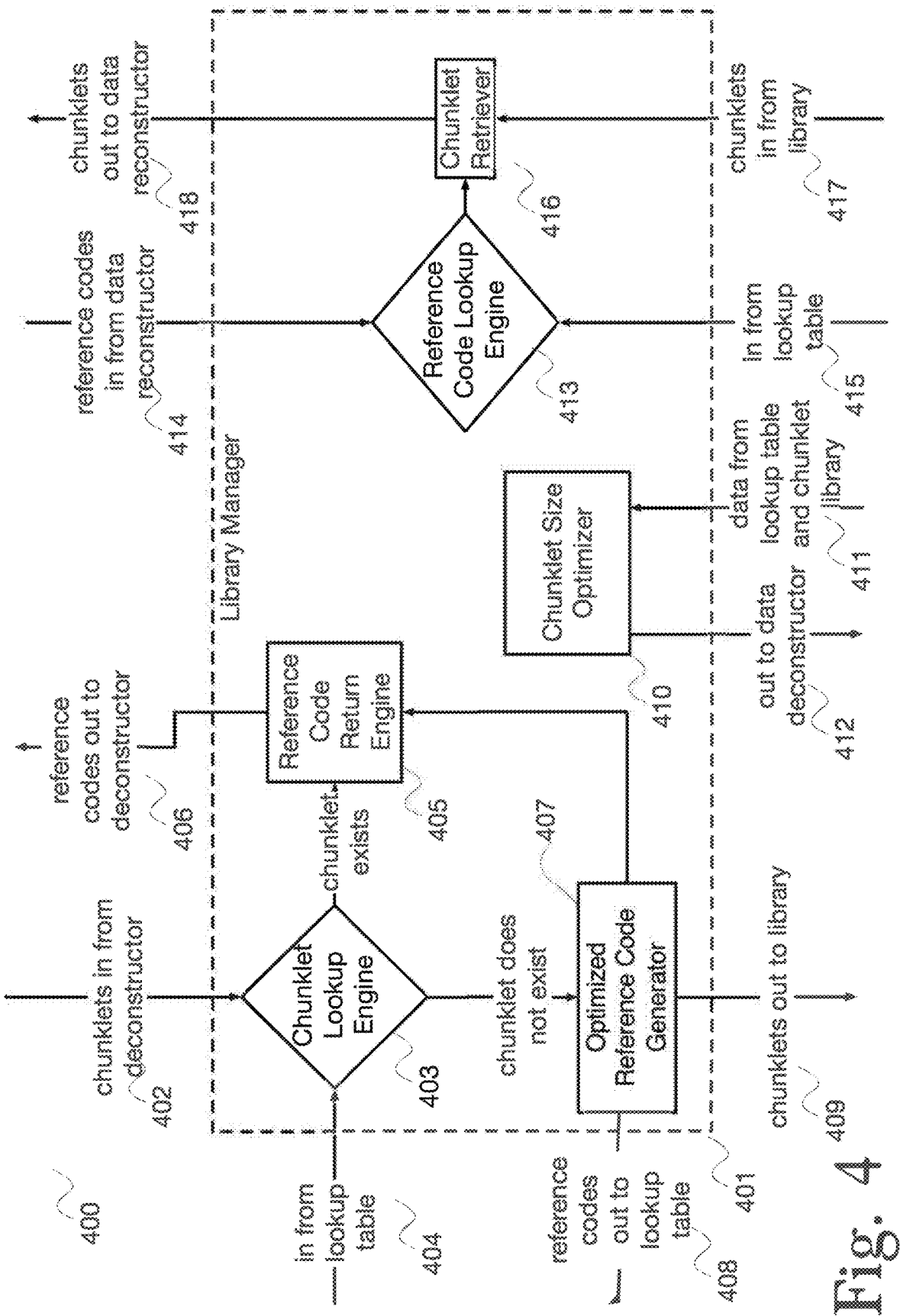
FIG. 4 is a diagram showing an embodiment of one aspect of the system, the library management module.

FIG. 4 is a diagram showing an embodiment of another aspect of the system 400, specifically library manager 401. One function of library manager 401 is to generate reference codes from sourceblocks received from data deconstruction engine 301. As sourceblocks are received 402 from data deconstruction engine 301, sourceblock lookup engine 403 checks sourceblock library lookup table 404 to determine whether those sourceblocks already exist in sourceblock library storage 105. If a particular sourceblock exists in sourceblock library storage 105, reference code return engine 405 sends the appropriate reference code 406 to data deconstruction engine 301. If the sourceblock does not exist in sourceblock library storage 105, optimized reference code generator 407 generates a new, optimized reference code based on machine learning algorithms. Optimized reference code generator 407 then saves the reference code 408 to sourceblock library lookup table 104; saves the associated sourceblock 409 to sourceblock library storage 105; and passes the reference code to reference code return engine 405 for sending 406 to data deconstruction engine 301. Another function of library manager 401 is to optimize the size of sourceblocks in the system. Based on information 411 contained in sourceblock library lookup table 104, sourceblock size optimizer 410 dynamically adjusts the size of sourceblocks in the system based on machine learning algorithms and outputs that information 412 to data analyzer 203. Another function of library manager 401 is to return sourceblocks associated with reference codes received from data reconstruction engine 301. As reference codes are received 414 from data reconstruction engine 301, reference code lookup engine 413 checks sourceblock library lookup table 415 to identify the associated sourceblocks; passes that information to sourceblock retriever 416, which obtains the sourceblocks 417 from sourceblock library storage 105; and passes them 418 to data reconstruction engine 301.

Figure 5:
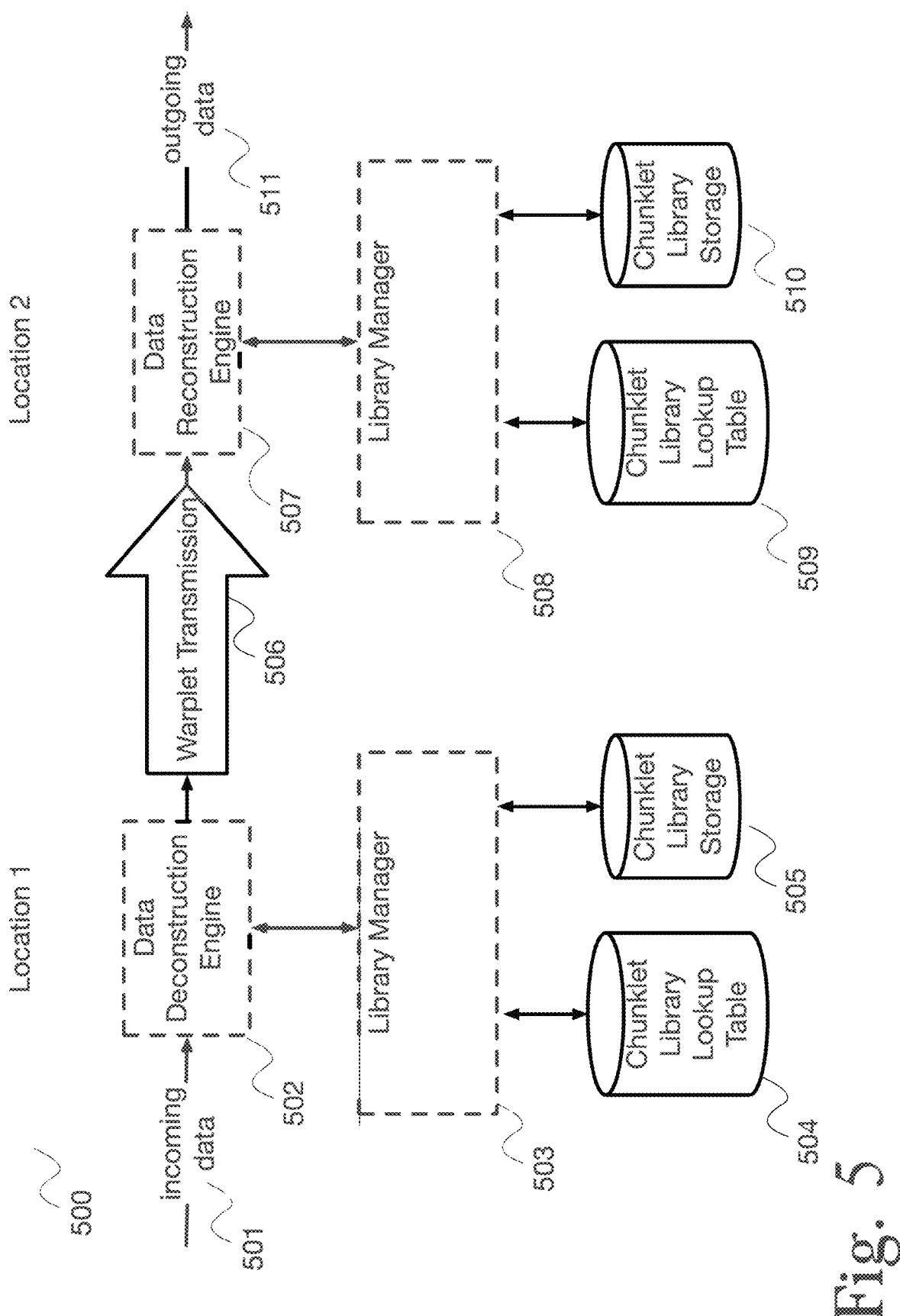
FIG. 5 is a diagram showing another embodiment of the system in which data is transferred between remote locations.

FIG. 5 is a diagram showing another embodiment of system 500, in which data is transferred between remote locations. As incoming data 501 is received by data deconstruction engine 502 at Location 1, data deconstruction engine 301 breaks the incoming data into sourceblocks, which are then sent to library manager 503 at Location 1. Using the information contained in sourceblock library lookup table 504 at Location 1 and sourceblock library storage 505 at Location 1, library manager 503 returns reference codes to data deconstruction engine 301 for processing into codewords, which are transmitted 506 to data reconstruction engine 507 at Location 2. In the case where the reference codes contained in a particular codeword have been newly generated by library manager 503 at Location 1, the codeword is transmitted along with a copy of the associated sourceblock. As data reconstruction engine 507 at Location 2 receives the codewords, it passes them to library manager module 508 at Location 2, which looks up the sourceblock in sourceblock library lookup table 509 at Location 2, and retrieves the associated from sourceblock library storage 510. Where a sourceblock has been transmitted along with a codeword, the sourceblock is stored in sourceblock library storage 510 and sourceblock library lookup table 504 is updated. Library manager 503 returns the appropriate sourceblocks to data reconstruction engine 507, which assembles them into the proper order and sends the data in its original form 511.

Figure 6:
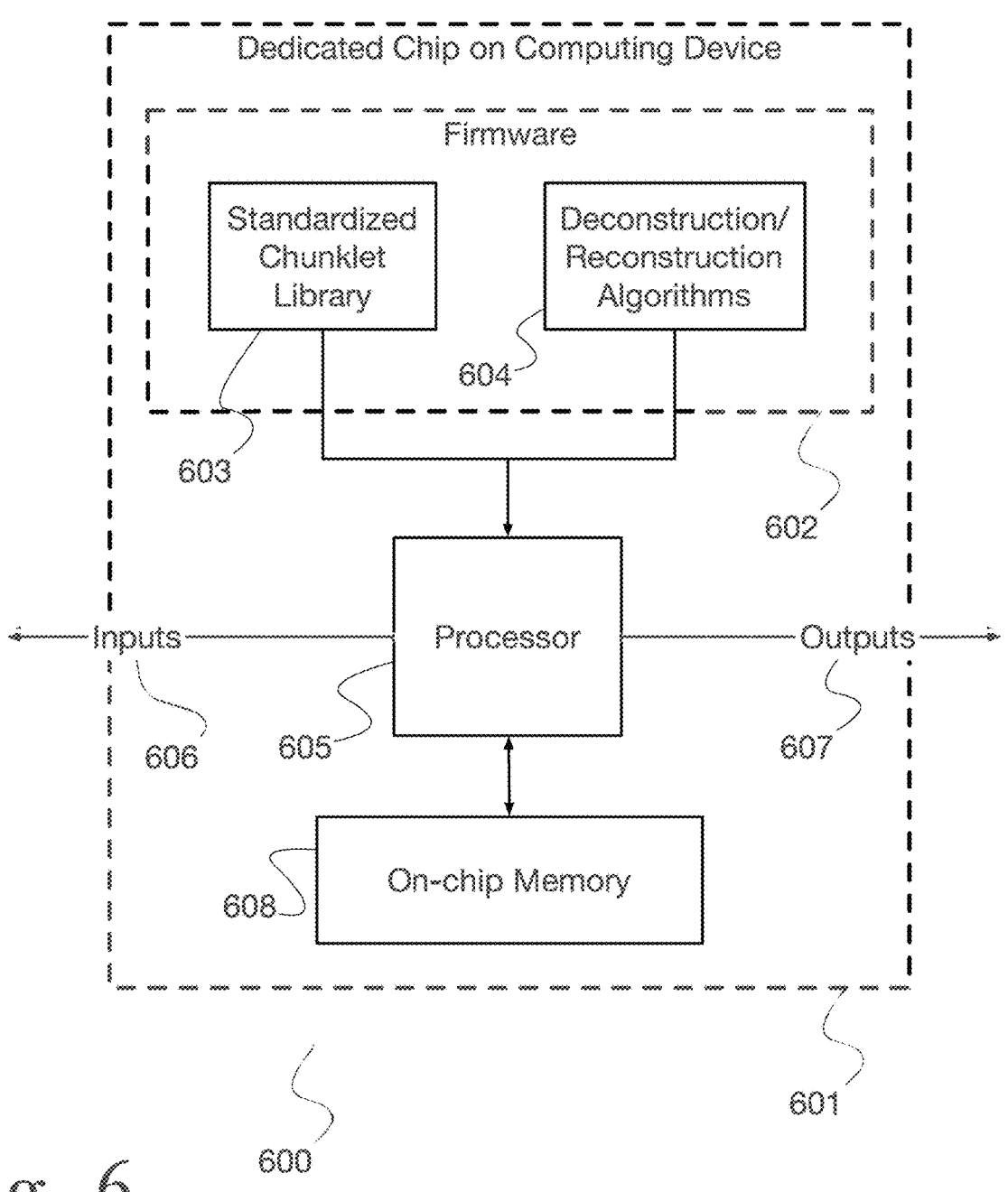
FIG. 6 is a diagram showing an embodiment in which a standardized version of the sourceblock library and associated algorithms would be encoded as firmware on a dedicated processing chip included as part of the hardware of a plurality of devices.

FIG. 6 is a diagram showing an embodiment 600 in which a standardized version of a sourceblock library 603 and associated algorithms 604 would be encoded as firmware 602 on a dedicated processing chip 601 included as part of the hardware of a plurality of devices 600. Contained on dedicated chip 601 would be a firmware area 602, on which would be stored a copy of a standardized sourceblock library 603 and deconstruction/reconstruction algorithms 604 for processing the data. Processor 605 would have both inputs 606 and outputs 607 to other hardware on the device 600. Processor 605 would store incoming data for processing on on-chip memory 608, process the data using standardized sourceblock library 603 and deconstruction/reconstruction algorithms 604, and send the processed data to other hardware on device 600. Using this embodiment, the encoding and decoding of data would be handled by dedicated chip 601, keeping the burden of data processing off device's 600 primary processors. Any device equipped with this embodiment would be able to store and transmit data in a highly optimized, bandwidth-efficient format with any other device equipped with this embodiment.

Figure 12:
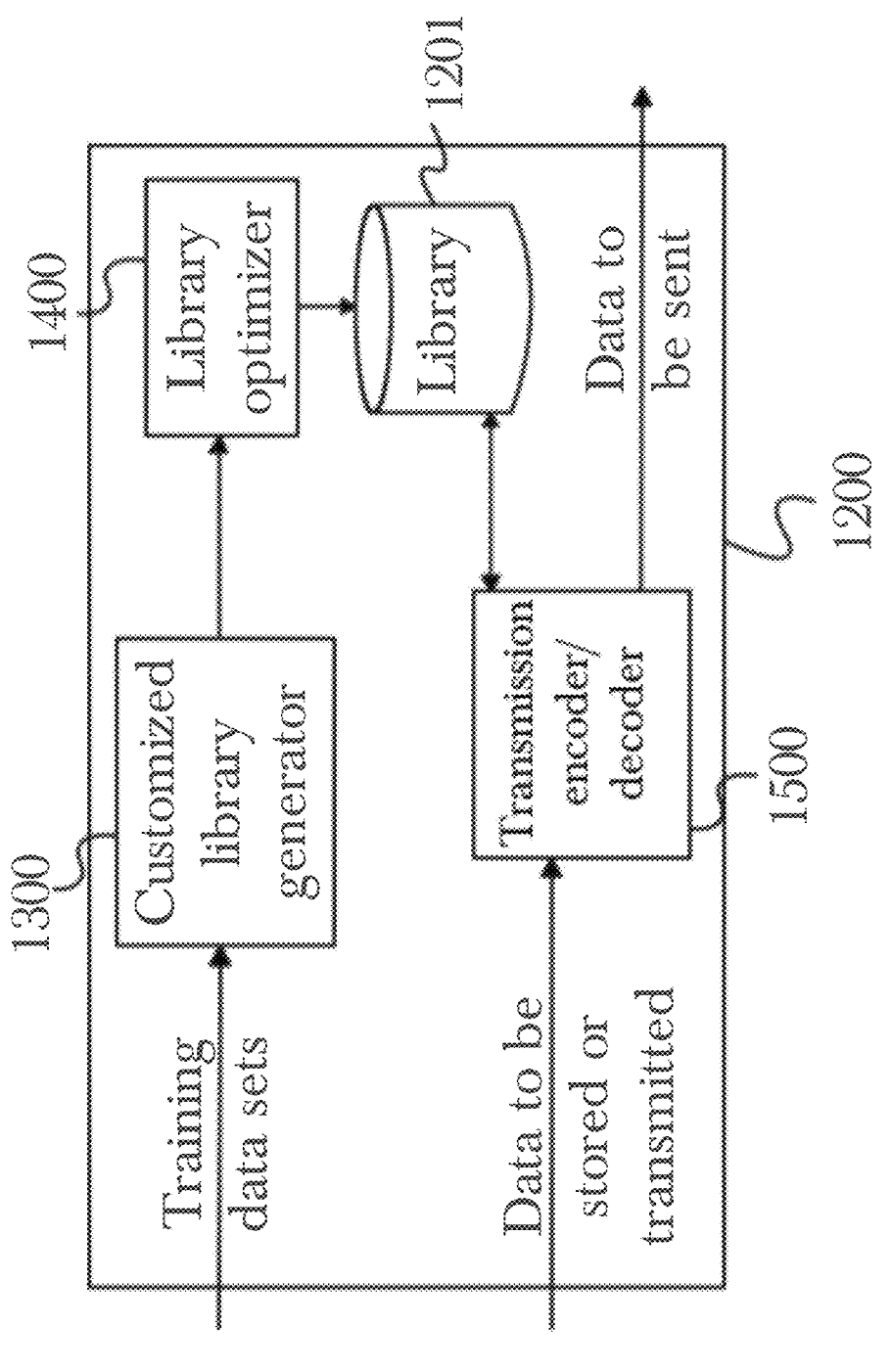
FIG. 12 is a diagram showing an exemplary system architecture, according to a preferred embodiment of the invention.

FIG. 12 is a diagram showing an exemplary system architecture 1200, according to a preferred embodiment of the invention. Incoming training data sets may be received at a customized library generator 1300 that processes training data to produce a customized word library 1201 comprising key-value pairs of data words (each comprising a string of bits) and their corresponding calculated binary Huffman codewords. The resultant word library 1201 may then be processed by a library optimizer 1400 to reduce size and improve efficiency, for example by pruning low-occurrence data entries or calculating approximate codewords that may be used to match more than one data word. A transmission encoder/decoder 1500 may be used to receive incoming data intended for storage or transmission, process the data using a word library 1201 to retrieve codewords for the words in the incoming data, and then append the codewords (rather than the original data) to an outbound data stream. Each of these components is described in greater detail below, illustrating the particulars of their respective processing and other functions, referring to FIGS. 2-4.

System 1200 provides near-instantaneous source coding that is dictionary-based and learned in advance from sample training data, so that encoding and decoding may happen concurrently with data transmission. This results in computational latency that is near zero but the data size reduction is comparable to classical compression. For example, if N bits are to be transmitted from sender to receiver, the compression ratio of classical compression is C, the ratio between the deflation factor of system 1200 and that of multi-pass source coding is p, the classical compression encoding rate is $R_C$ bit/s and the decoding rate is $R_D$ bit/s, and the transmission speed is S bit/s, the compress-send-decompress time will be $$T_{old} = \frac{N}{R_C} + \frac{N}{CS} + \frac{N}{CR_D}$$

while the transmit-while-coding time for system 1200 will be (assuming that encoding and decoding happen at least as quickly as network latency):

$$T_{new} = \frac{N_p}{CS} \text{ so}$$

that the total data transit time improvement factor is $$\frac{T_{old}}{T_{new}} = \frac{\frac{CS}{R_C} + 1 + \frac{S}{R_D}}{p}$$

which presents a savings whenever $$\frac{CS}{R_C} + \frac{S}{R_D} > p - 1.$$

This is a reasonable scenario given that typical values in real-world practice are C=0.32, $R_C$=1.1·10$^{12}$, $R_D$=4.2·10$^{12}$, S=10$^{11}$, giving $$\frac{CS}{R_C} + \frac{S}{R_D} = 0.053 \dots ,$$

such that system 1200 will outperform the total transit time of the best compression technology available as long as its deflation factor is no more than 5% worse than compression. Such customized dictionary-based encoding will also sometimes exceed the deflation ratio of classical compression, particularly when network speeds increase beyond 100 Gb/s.

The delay between data creation and its readiness for use at a receiving end will be equal to only the source word length t (typically 5-15 bytes), divided by the deflation factor C/p and the network speed S, i.e.

$$\text{delay}_{invention} = \frac{tp}{CS}$$

since the encoding and decoding occur concurrently with data transmission. On the other hand, the latency associated with classical compression is $$\text{delay}_{priorart} = \frac{N}{R_C} + \frac{N}{CS} + \frac{N}{CR_D}$$

where N is the packet/file size. Even with the generous values chosen above as well as N=512K, t=10, and p=1.05, this results in delay$_{invention}$≈3.3·10$^{-10}$ while delay$_{priorart}$≈ 1.3·10$^{-7}$, a more than 400-fold reduction in latency.

A key factor in the efficiency of Huffman coding used by system 1200 is that key-value pairs be chosen carefully to minimize expected coding length, so that the average deflation/compression ratio is minimized. It is possible to achieve the best possible expected code length among all instantaneous codes using Huffman codes if one has access to the exact probability distribution of source words of a given desired length from the random variable generating them. In practice this is impossible, as data is received in a wide variety of formats and the random processes underlying the source data are a mixture of human input, unpredictable (though in principle, deterministic) physical events, and noise. System 1200 addresses this by restriction of data types and density estimation; training data is provided that is representative of the type of data anticipated in "real-world" use of system 1200, which is then used to model the distribution of binary strings in the data in order to build a Huffman code word library 1200.

Figure 13:
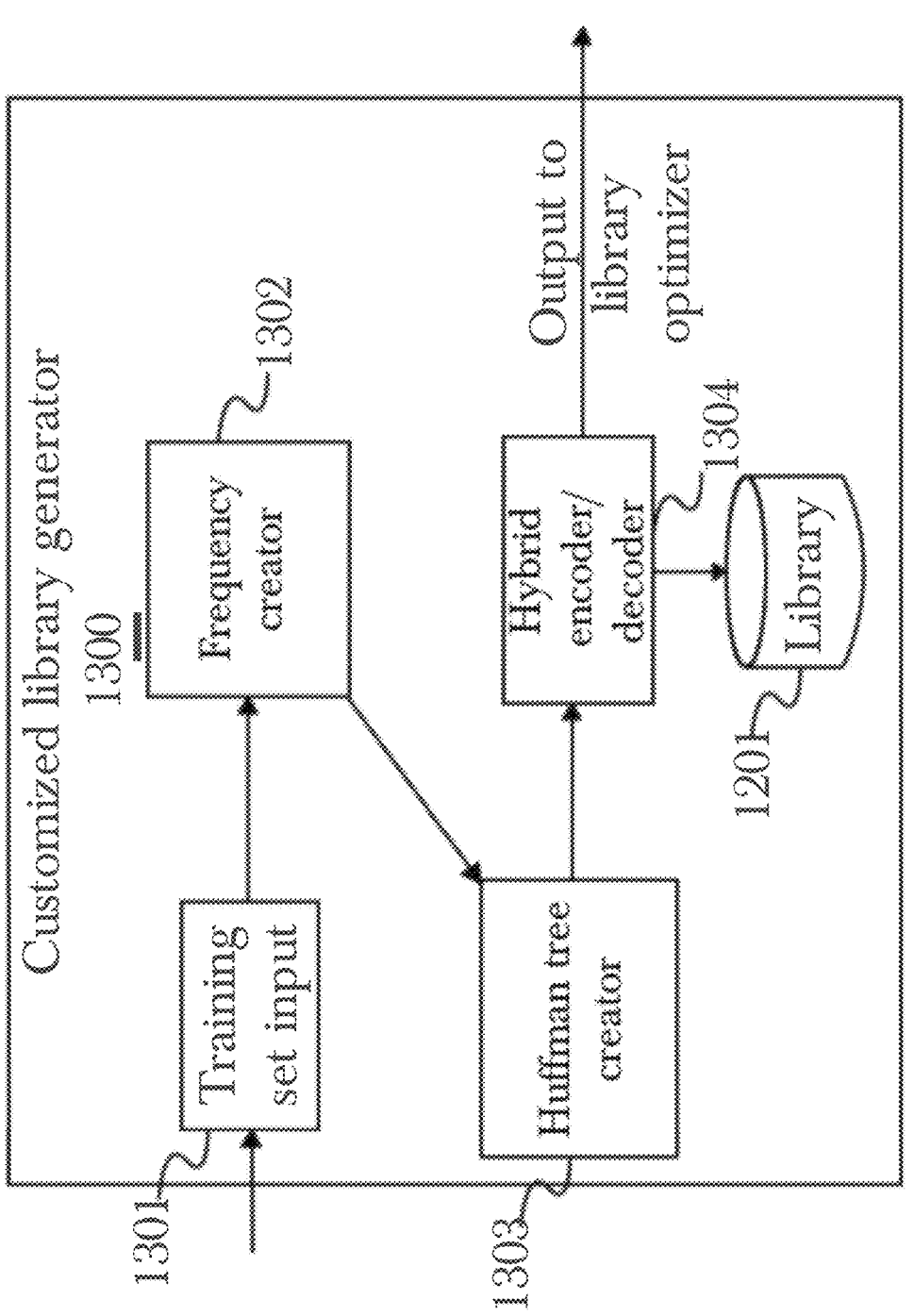
FIG. 13 is a diagram showing a more detailed architecture for a customized library generator.

FIG. 13 is a diagram showing a more detailed architecture for a customized library generator 1300. When an incoming training data set 1301 is received, it may be analyzed using a frequency creator 1302 to analyze for word frequency (that is, the frequency with which a given word occurs in the training data set). Word frequency may be analyzed by scanning all substrings of bits and directly calculating the frequency of each substring by iterating over the data set to produce an occurrence frequency, which may then be used to estimate the rate of word occurrence in non-training data. A first Huffman binary tree is created based on the frequency of occurrences of each word in the first dataset, and a Huffman codeword is assigned to each observed word in the first dataset according to the first Huffman binary tree. Machine learning may be utilized to improve results by processing a number of training data sets and using the results of each training set to refine the frequency estimations for non-training data, so that the estimation yield better results when used with real-world data (rather than, for example, being only based on a single training data set that may not be very similar to a received non-training data set). A second Huffman tree creator 1303 may be utilized to identify words that do not match any existing entries in a word library 1201 and pass them to a hybrid encoder/decoder 1304, that then calculates a binary Huffman codeword for the mismatched word and adds the codeword and original data to the word library 1201 as a new key-value pair. In this manner, customized library generator 1300 may be used both to establish an initial word library 1201 from a first training set, as well as expand the word library 1201 using additional training data to improve operation.

Figure 14:
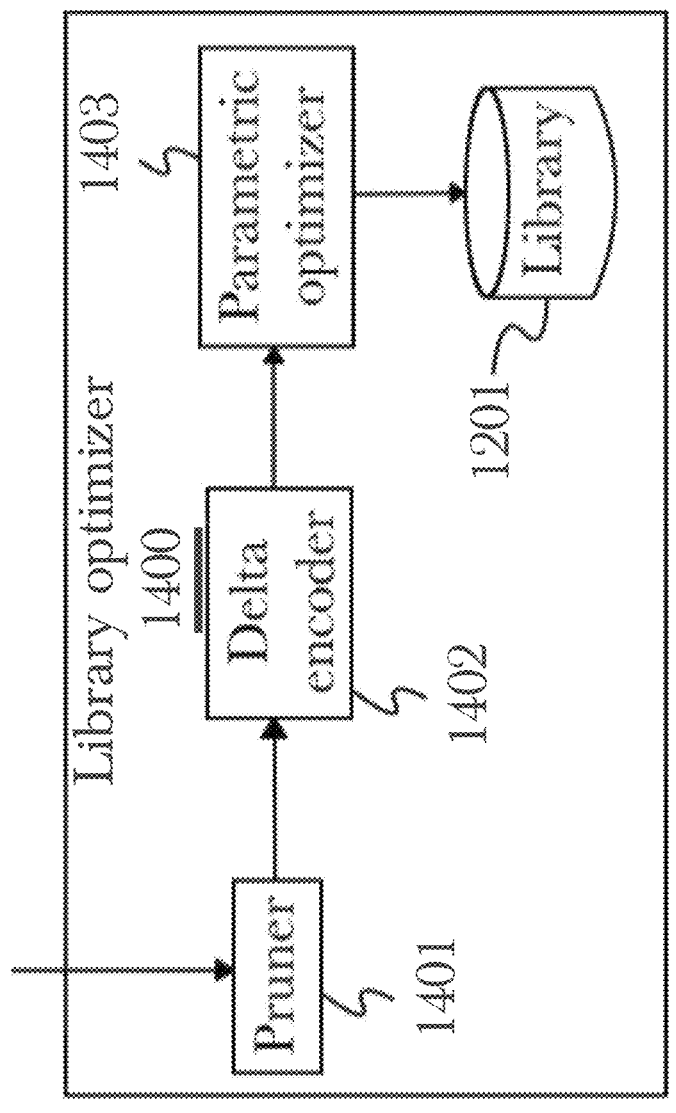
FIG. 14 is a diagram showing a more detailed architecture for a library optimizer.

FIG. 14 is a diagram showing a more detailed architecture for a library optimizer 1400. A pruner 1401 may be used to load a word library 1201 and reduce its size for efficient operation, for example by sorting the word library 1201 based on the known occurrence probability of each key-value pair and removing low-probability key-value pairs based on a loaded threshold parameter. This prunes low-value data from the word library to trim the size, eliminating large quantities of very-low-frequency key-value pairs such as single-occurrence words that are unlikely to be encountered again in a data set. Pruning eliminates the least-probable entries from word library 1201 up to a given threshold, which will have a negligible impact on the deflation factor since the removed entries are only the least-common ones, while the impact on word library size will be larger because samples drawn from asymptotically normal distributions (such as the log-probabilities of words generated by a probabilistic finite state machine, a model well-suited to a wide variety of real-world data) which occur in tails of the distribution are disproportionately large in counting measure. A delta encoder 1402 may be utilized to apply delta encoding to a plurality of words to store an approximate codeword as a value in the word library, for which each of the plurality of source words is a valid corresponding key. This may be used to reduce library size by replacing numerous key-value pairs with a single entry for the approximate codeword and then represent actual codewords using the approximate codeword plus a delta value representing the difference between the approximate codeword and the actual codeword. Approximate coding is optimized for low-weight sources such as Golomb coding, run-length coding, and similar techniques. The approximate source words may be chosen by locality-sensitive hashing, so as to approximate Hamming distance without incurring the intractability of nearest-neighbor-search in Hamming space. A parametric optimizer 1403 may load configuration parameters for operation to optimize the use of the word library 1201 during operation. Best-practice parameter/hyperparameter optimization strategies such as stochastic gradient descent, quasi-random grid search, and evolutionary search may be used to make optimal choices for all interdependent settings playing a role in the functionality of system 1200. In cases where lossless compression is not required, the delta value may be discarded at the expense of introducing some limited errors into any decoded (reconstructed) data.

Figure 15:
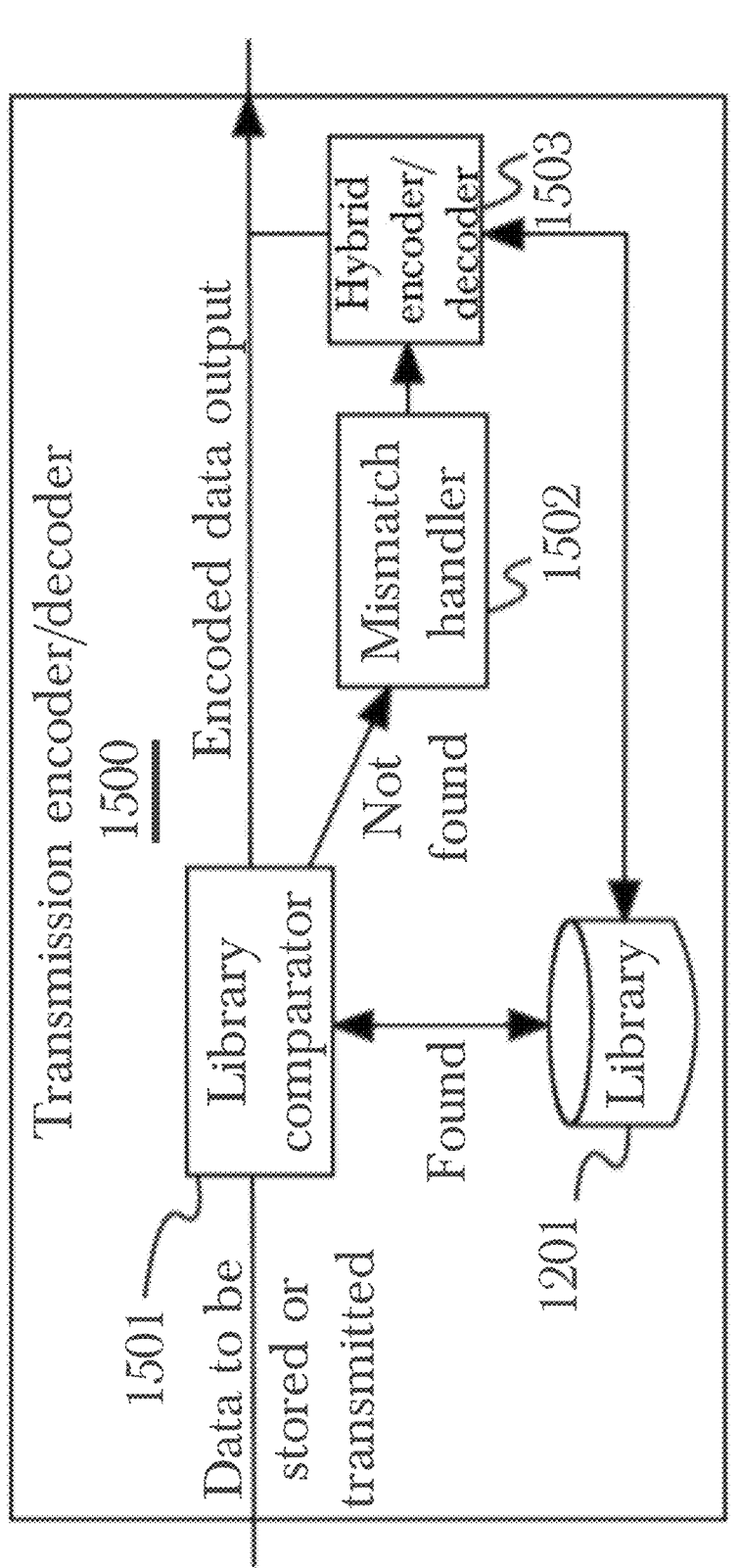
FIG. 15 is a diagram showing a more detailed architecture for a transmission and storage engine.

FIG. 15 is a diagram showing a more detailed architecture for a transmission encoder/decoder 1500. According to various arrangements, transmission encoder/decoder 1500 may be used to deconstruct data for storage or transmission, or to reconstruct data that has been received, using a word library 1201. A library comparator 1501 may be used to receive data comprising words or codewords, and compare against a word library 1201 by dividing the incoming stream into substrings of length/and using a fast hash to check word library 1201 for each substring. If a substring is found in word library 1201, the corresponding key/value (that is, the corresponding source word or codeword, according to whether the substring used in comparison was itself a word or codeword) is returned and appended to an output stream. If a given substring is not found in word library 1201, a mismatch handler 1502 and hybrid encoder/decoder 1503 may be used to handle the mismatch similarly to operation during the construction or expansion of word library 1201. A mismatch handler 1502 may be utilized to identify words that do not match any existing entries in a word library 1201 and pass them to a hybrid encoder/decoder 1503, that then calculates a binary Huffman codeword for the mismatched word and adds the codeword and original data to the word library 1201 as a new key-value pair. The newly-produced codeword may then be appended to the output stream. In arrangements where a mismatch indicator is included in a received data stream, this may be used to preemptively identify a substring that is not in word library 1201 (for example, if it was identified as a mismatch on the transmission end), and handled accordingly without the need for a library lookup.

Figure 19:
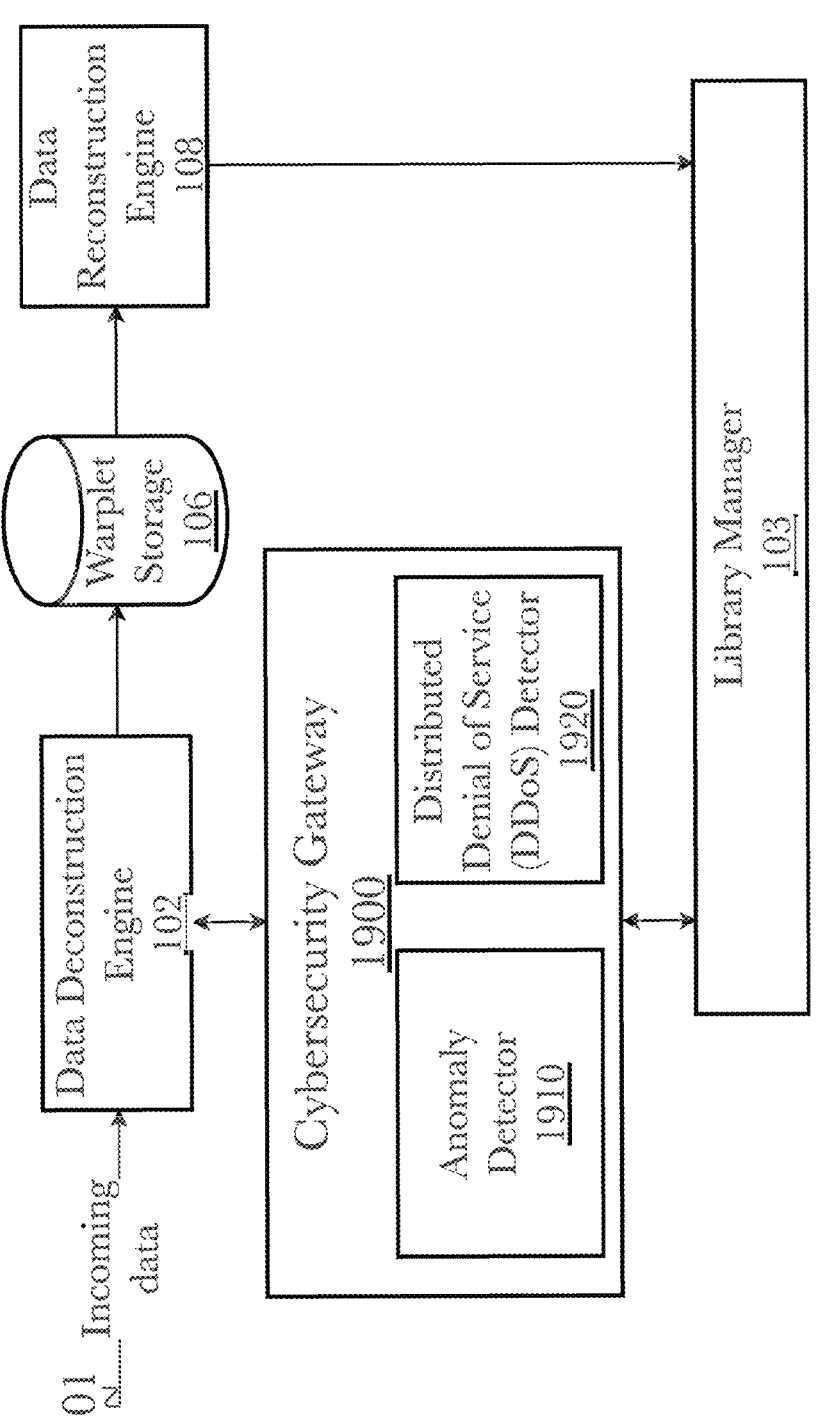
FIG. 19 is an exemplary system architecture of a data encoding system used for cyber security purposes.

FIG. 19 is an exemplary system architecture of a data encoding system used for cyber security purposes. Much like in FIG. 1, incoming data 101 to be deconstructed is sent to a data deconstruction engine 102, which may attempt to deconstruct the data and turn it into a collection of codewords using a library manager 103. Codeword storage 106 serves to store unique codewords from this process, and may be queried by a data reconstruction engine 108 which may reconstruct the original data from the codewords, using a library manager 103. However, a cybersecurity gateway 1900 is present, communicating in-between a library manager 103 and a deconstruction engine 102, and containing an anomaly detector 1910 and distributed denial of service (DDoS) detector 1920. The anomaly detector examines incoming data to determine whether there is a disproportionate number of incoming reference codes that do not match reference codes in the existing library. A disproportionate number of non-matching reference codes may indicate that data is being received from an unknown source, of an unknown type, or contains unexpected (possibly malicious) data. If the disproportionate number of non-matching reference codes exceeds an established threshold or persists for a certain length of time, the anomaly detector 1910 raises a warning to a system administrator. Likewise, the DDoS detector 1920 examines incoming data to determine whether there is a disproportionate amount of repetitive data. A disproportionate amount of repetitive data may indicate that a DDoS attack is in progress. If the disproportionate amount of repetitive data exceeds an established threshold or persists for a certain length of time, the DDoS detector 1910 raises a warning to a system administrator. In this way, a data encoding system may detect and warn users of, or help mitigate, common cyber-attacks that result from a flow of unexpected and potentially harmful data, or attacks that result from a flow of too much irrelevant data meant to slow down a network or system, as in the case of a DDoS attack.

Figure 22:
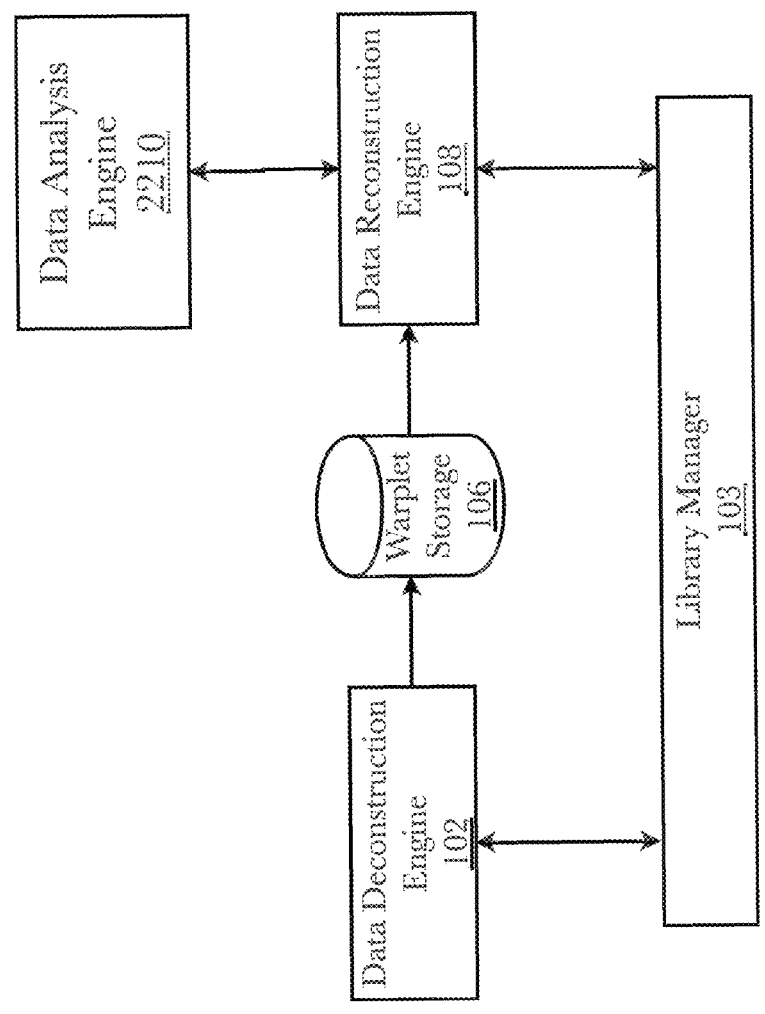
FIG. 22 is an exemplary system architecture of a data encoding system used for data mining and analysis purposes.

FIG. 22 is an exemplary system architecture of a data encoding system used for data mining and analysis purposes. Much like in FIG. 1, incoming data 101 to be deconstructed is sent to a data deconstruction engine 102, which may attempt to deconstruct the data and turn it into a collection of codewords using a library manager 103. Codeword storage 106 serves to store unique codewords from this process, and may be queried by a data reconstruction engine 108 which may reconstruct the original data from the codewords, using a library manager 103. A data analysis engine 2210, typically operating while the system is otherwise idle, sends requests for data to the data reconstruction engine 108, which retrieves the codewords representing the requested data from codeword storage 106, reconstructs them into the data represented by the codewords, and send the reconstructed data to the data analysis engine 2210 for analysis and extraction of useful data (i.e., data mining). Because the speed of reconstruction is significantly faster than decompression using traditional compression technologies (i.e., significantly less decompression latency), this approach makes data mining feasible. Very often, data stored using traditional compression is not mined precisely because decompression lag makes it unfeasible, especially during shorter periods of system idleness. Increasing the speed of data reconstruction broadens the circumstances under which data mining of stored data is feasible.

Figure 24:
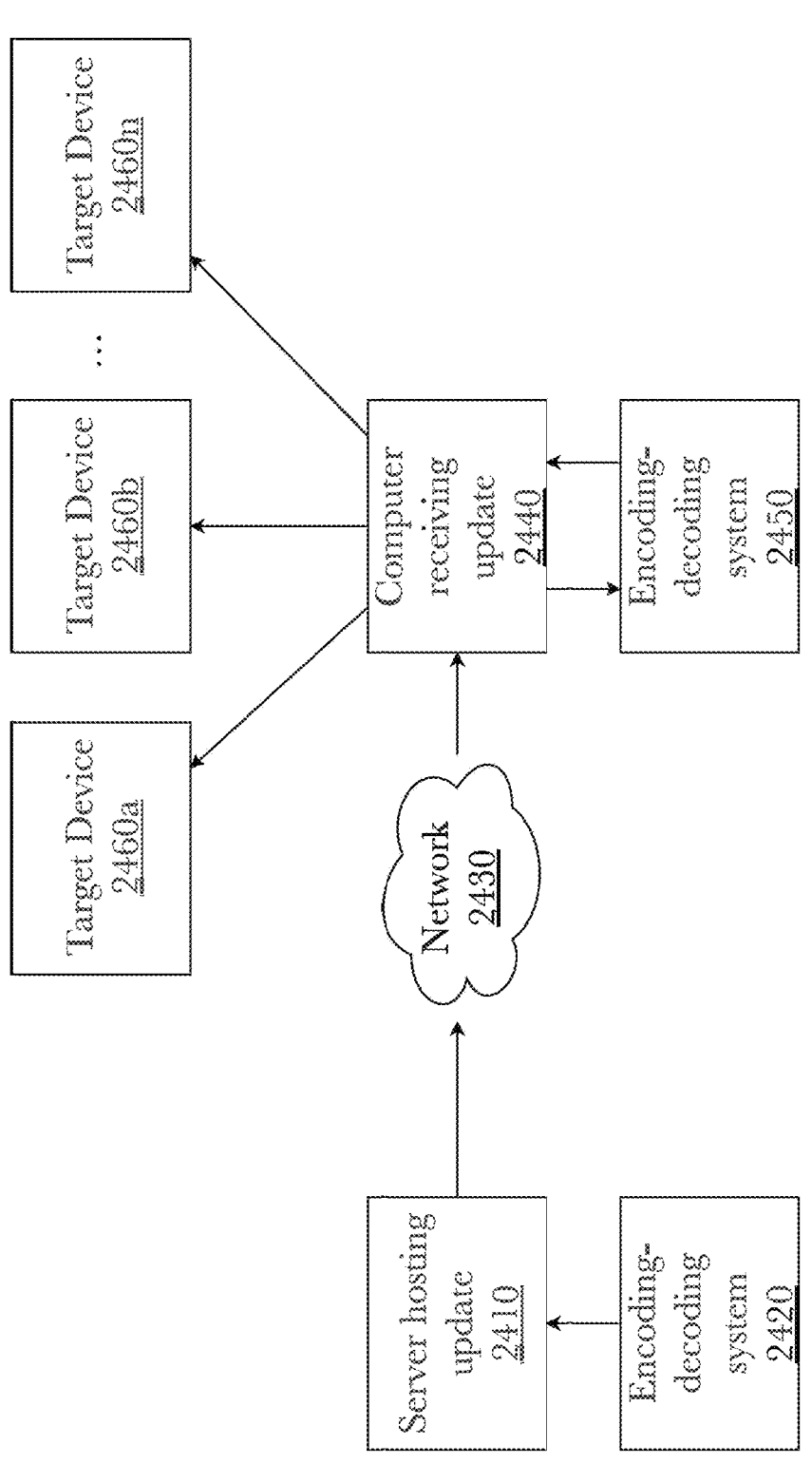
FIG. 24 is an exemplary system architecture of a data encoding system used for remote software and firmware updates.

FIG. 24 is an exemplary system architecture of a data encoding system used for remote software and firmware updates. Software and firmware updates typically require smaller, but more frequent, file transfers. A server which hosts a software or firmware update 2410 may host an encoding-decoding system 2420, allowing for data to be encoded into, and decoded from, sourceblocks or codewords, as disclosed in previous figures. Such a server may possess a software update, operating system update, firmware update, device driver update, or any other form of software update, which in some cases may be minor changes to a file, but nevertheless necessitate sending the new, completed file to the recipient. Such a server is connected over a network 2430, which is further connected to a recipient computer 2440, which may be connected to a server 2410 for receiving such an update to its system. In this instance, the recipient device 2440 also hosts the encoding and decoding system 2450, along with a codebook or library of reference codes that the hosting server 2410 also shares. The updates are retrieved from storage at the hosting server 2410 in the form of codewords, transferred over the network 2430 in the form of codewords, and reconstructed on the receiving computer 2440. In this way, a far smaller file size, and smaller total update size, may be sent over a network. The receiving computer 2440 may then install the updates on any number of target computing devices 2460a-n, using a local network or other high-bandwidth connection.

Figure 26:
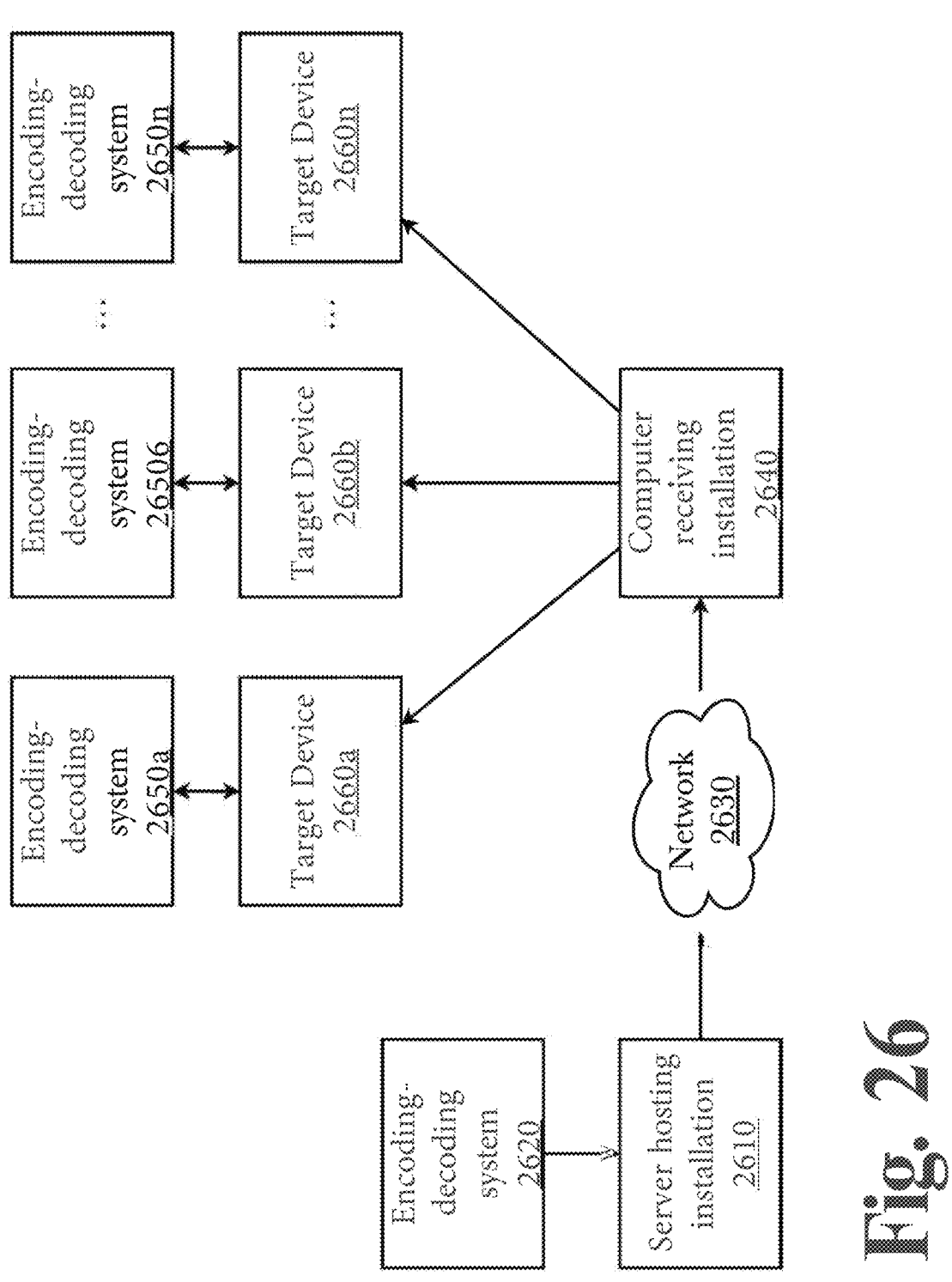
FIG. 26 is an exemplary system architecture of a data encoding system used for large-scale software installation such as operating systems.

FIG. 26 is an exemplary system architecture of a data encoding system used for large-scale software installation such as operating systems. Large-scale software installations typically require very large, but infrequent, file transfers. A server which hosts an installable software 2610 may host an encoding-decoding system 2620, allowing for data to be encoded into, and decoded from, sourceblocks or codewords, as disclosed in previous figures. The files for the large scale software installation are hosted on the server 2610, which is connected over a network 2630 to a recipient computer 2640. In this instance, the encoding and decoding system 2650a-n is stored on or connected to one or more target devices 2660a-n, along with a codebook or library of reference codes that the hosting server 2610 shares. The software is retrieved from storage at the hosting server 2610 in the form of codewords, and transferred over the network 2630 in the form of codewords to the receiving computer 2640. However, instead of being reconstructed at the receiving computer 2640, the codewords are transmitted to one or more target computing devices, and reconstructed and installed directly on the target devices 2660a-n. In this way, a far smaller file size, and smaller total update size, may be sent over a network or transferred between computing devices, even where the network 2630 between the receiving computer 2640 and target devices 2660a-n is low bandwidth, or where there are many target devices 2660a-n.

Figure 28:
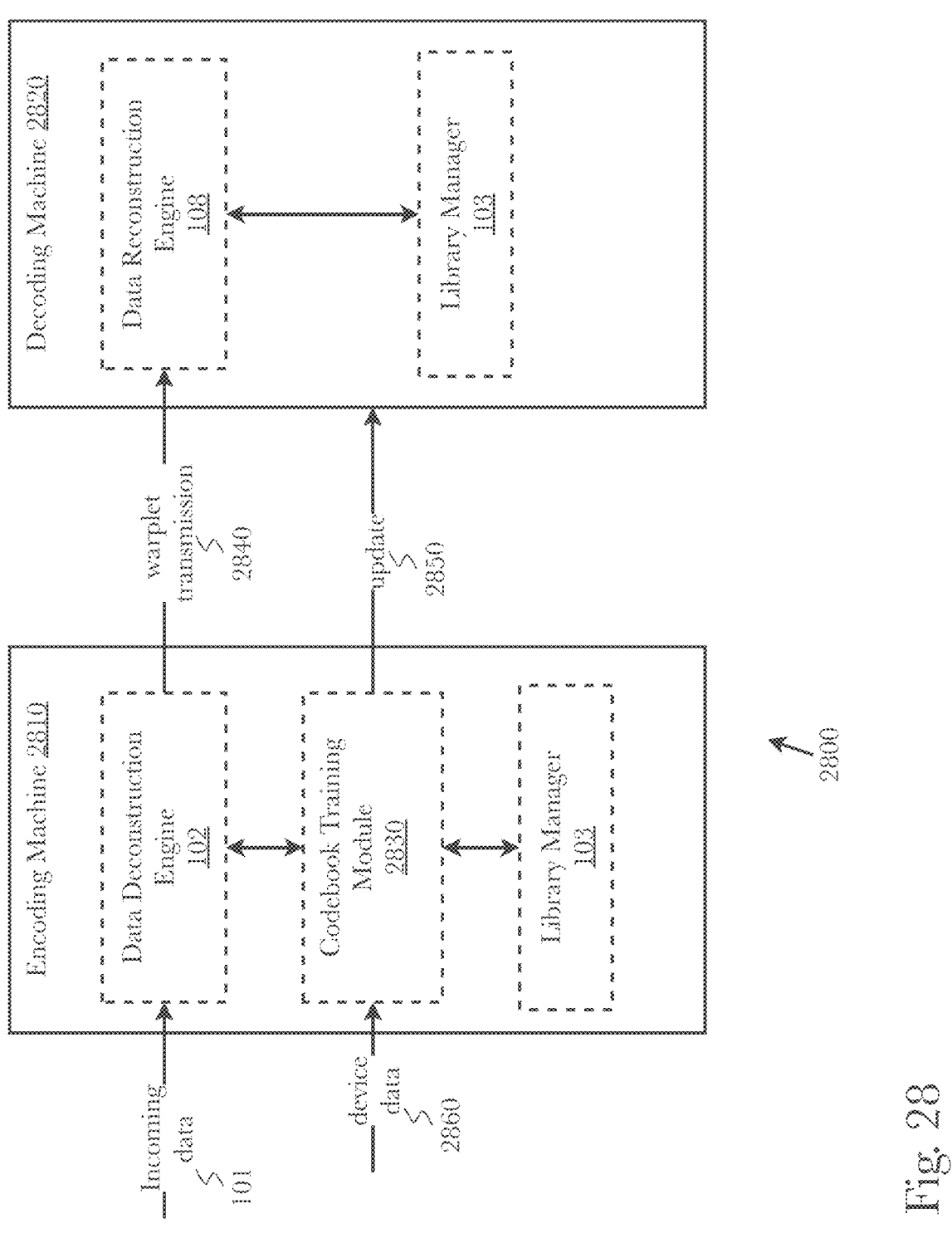
FIG. 28 is a block diagram of an exemplary system architecture of a codebook training system for a data encoding system, according to an embodiment.

FIG. 28 is a block diagram of an exemplary system architecture 2800 of a codebook training system for a data encoding system, according to an embodiment. According to this embodiment, two separate machines may be used for encoding 2810 and decoding 2820. Much like in FIG. 1, incoming data 101 to be deconstructed is sent to a data deconstruction engine 102 residing on encoding machine 2810, which may attempt to deconstruct the data and turn it into a collection of codewords using a library manager 103. Codewords may be transmitted 2840 to a data reconstruction engine 108 residing on decoding machine 2820, which may reconstruct the original data from the codewords, using a library manager 103. However, according to this embodiment, a codebook training module 2830 is present on the decoding machine 2810, communicating in-between a library manager 103 and a deconstruction engine 102. According to other embodiments, codebook training module 2830 may reside instead on decoding machine 2820 if the machine has enough computing resources available; which machine the module 2830 is located on may depend on the system user's architecture and network structure. Codebook training module 2830 may send requests for data to the data reconstruction engine 2810, which routes incoming data 101 to codebook training module 2830. Codebook training module 2830 may perform analyses on the requested data in order to gather information about the distribution of incoming data 101 as well as monitor the encoding/decoding model performance. Additionally, codebook training module 2830 may also request and receive device data 2860 to supervise network connected devices and their processes and, according to some embodiments, to allocate training resources when requested by devices running the encoding system. Devices may include, but are not limited to, encoding and decoding machines, training machines, sensors, mobile compute devices, and Internet-of-things ("IoT") devices. Based on the results of the analyses, the codebook training module 2830 may create a new training dataset from a subset of the requested data in order to counteract the effects of data drift on the encoding/decoding models, and then publish updated 2850 codebooks to both the encoding machine 2810 and decoding machine 2820.

Figure 29:
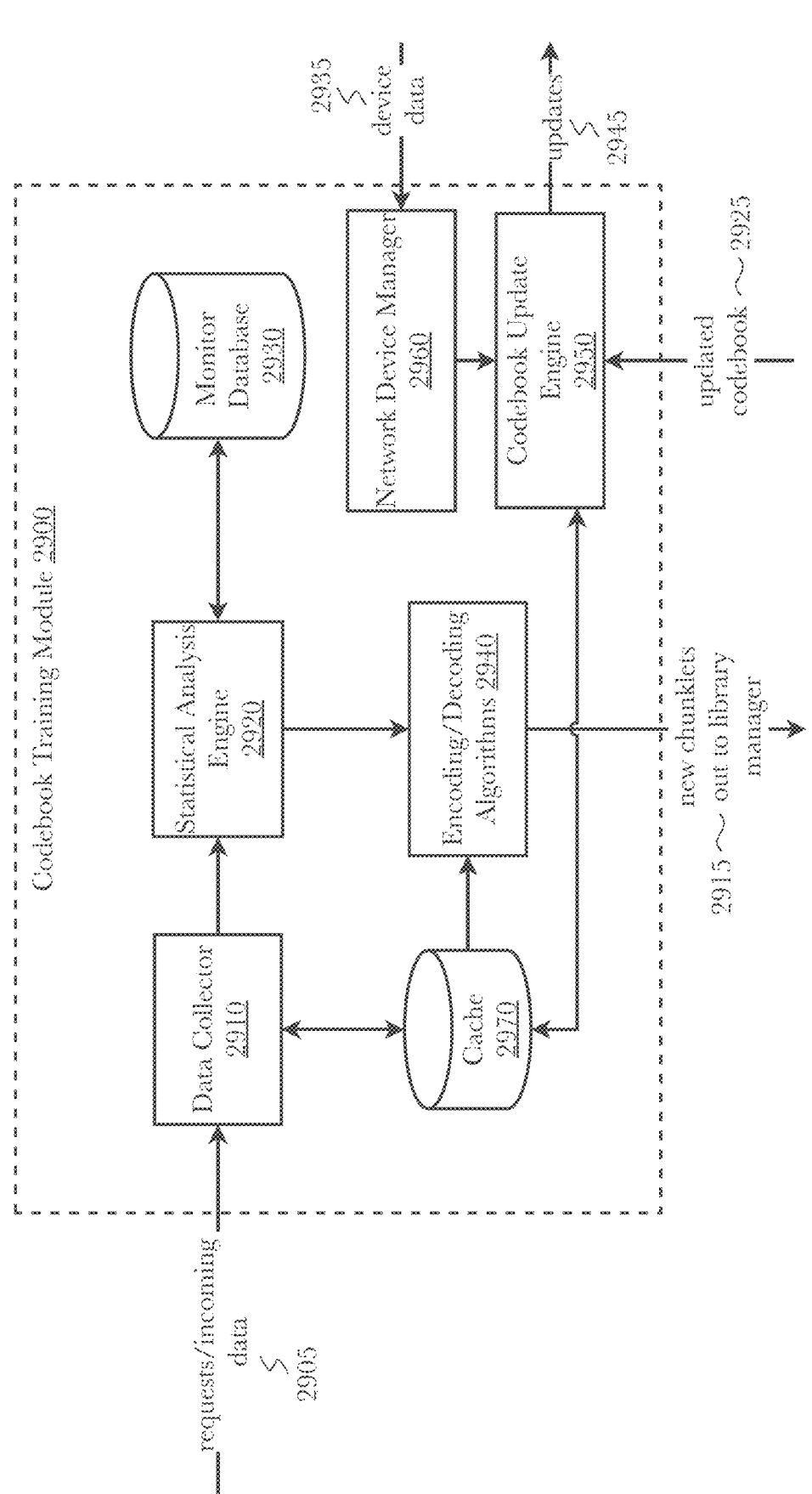
FIG. 29 is a block diagram of an exemplary architecture for a codebook training module, according to an embodiment.

FIG. 29 is a block diagram of an exemplary architecture for a codebook training module 2900, according to an embodiment. According to the embodiment, a data collector 2910 is present which may send requests for incoming data 2905 to a data deconstruction engine 102 which may receive the request and route incoming data to codebook training module 2900 where it may be received by data collector 2910. Data collector 2910 may be configured to request data periodically such as at schedule time intervals, or for example, it may be configured to request data after a certain amount of data has been processed through the encoding machine 2810 or decoding machine 2820. The received data may be a plurality of sourceblocks, which are a series of binary digits, originating from a source packet otherwise referred to as a datagram. The received data may compiled into a test dataset and temporarily stored in a cache 2970. Once stored, the test dataset may be forwarded to a statistical analysis engine 2920 which may utilize one or more algorithms to determine the probability distribution of the test dataset. Best-practice probability distribution algorithms such as Kullback-Leibler divergence, adaptive windowing, and Jensen-Shannon divergence may be used to compute the probability distribution of training and test datasets. A monitoring database 2930 may be used to store a variety of statistical data related to training datasets and model performance metrics in one place to facilitate quick and accurate system monitoring capabilities as well as assist in system debugging functions. For example, the original or current training dataset and the calculated probability distribution of this training dataset used to develop the current encoding and decoding algorithms may be stored in monitor database 2930.

Since data drifts involve statistical change in the data, the best approach to detect drift is by monitoring the incoming data's statistical properties, the model's predictions, and their correlation with other factors. After statistical analysis engine 2920 calculates the probability distribution of the test dataset it may retrieve from monitor database 2930 the calculated and stored probability distribution of the current training dataset. It may then compare the two probability distributions of the two different datasets in order to verify if the difference in calculated distributions exceeds a predetermined difference threshold. If the difference in distributions does not exceed the difference threshold, that indicates the test dataset, and therefore the incoming data, has not experienced enough data drift to cause the encoding/decoding system performance to degrade significantly, which indicates that no updates are necessary to the existing codebooks. However, if the difference threshold has been surpassed, then the data drift is significant enough to cause the encoding/decoding system performance to degrade to the point where the existing models and accompanying codebooks need to be updated. According to an embodiment, an alert may be generated by statistical analysis engine 2920 if the difference threshold is surpassed or if otherwise unexpected behavior arises.

In the event that an update is required, the test dataset stored in the cache 2970 and its associated calculated probability distribution may be sent to monitor database 2930 for long term storage. This test dataset may be used as a new training dataset to retrain the encoding and decoding algorithms 2940 used to create new sourceblocks based upon the changed probability distribution. The new sourceblocks may be sent out to a library manager 2915 where the sourceblocks can be assigned new codewords. Each new sourceblock and its associated codeword may then be added to a new codebook and stored in a storage device. The new and updated codebook may then be sent back 2925 to codebook training module 2900 and received by a codebook update engine 2950. Codebook update engine 2950 may temporarily store the received updated codebook in the cache 2970 until other network devices and machines are ready, at which point codebook update engine 2950 will publish the updated codebooks 2945 to the necessary network devices.

A network device manager 2960 may also be present which may request and receive network device data 2935 from a plurality of network connected devices and machines. When the disclosed encoding system and codebook training system 2800 are deployed in a production environment, upstream process changes may lead to data drift, or other unexpected behavior. For example, a sensor being replaced that changes the units of measurement from inches to centimeters, data quality issues such as a broken sensor always reading 0, and covariate shift which occurs when there is a change in the distribution of input variables from the training set. These sorts of behavior and issues may be determined from the received device data 2935 in order to identify potential causes of system error that is not related to data drift and therefore does not require an updated codebook. This can save network resources from being unnecessarily used on training new algorithms as well as alert system users to malfunctions and unexpected behavior devices connected to their networks. Network device manager 2960 may also utilize device data 2935 to determine available network resources and device downtime or periods of time when device usage is at its lowest. Codebook update engine 2950 may request network and device availability data from network device manager 2960 in order to determine the most optimal time to transmit updated codebooks (i.e., trained libraries) to encoder and decoder devices and machines.

Figure 30:
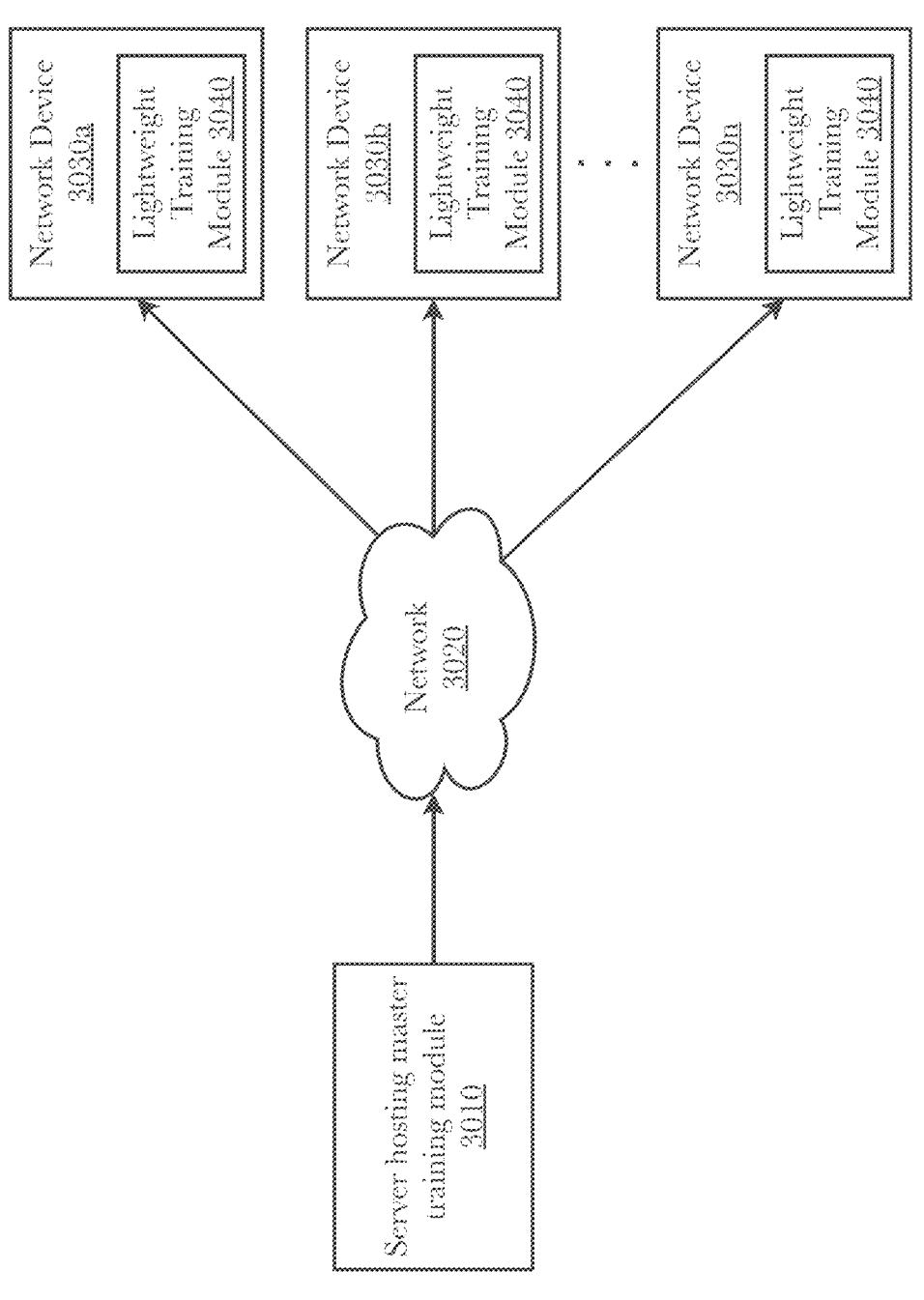
FIG. 30 is a block diagram of another embodiment of the codebook training system using a distributed architecture and a modified training module.

FIG. 30 is a block diagram of another embodiment of the codebook training system using a distributed architecture and a modified training module. According to an embodiment, there may be a server which maintains a master supervisory process over remote training devices hosting a master training module 3010 which communicates via a network 3020 to a plurality of connected network devices 3030*a-n*. The server may be located at the remote training end such as, but not limited to, cloud-based resources, a user-owned data center, etc. The master training module located on the server operates similarly to the codebook training module disclosed in FIG. 29 above, however, the server 3010 utilizes the master training module via the network device manager 2960 to farm out training resources to network devices 3030*a-n*. The server 3010 may allocate resources in a variety of ways, for example, round-robin, priority-based, or other manner, depending on the user needs, costs, and number of devices running the encoding/decoding system. Server 3010 may identify elastic resources which can be employed if available to scale up training when the load becomes to burdensome. On the network devices 3030*a-n* may be present a lightweight version of the training module 3040 that trades a little suboptimality in the codebook for training on limited machinery and/or makes training happen in low-priority threads to take advantage of idle time. In this way the training of new encoding/decoding algorithms may take place in a distributed manner which allows data gathering or generating devices to process and train on data gathered locally, which may improve system latency and optimize available network resources.

Description of Method Aspects

Since the library consists of re-usable building sourceblocks, and the actual data is represented by reference codes to the library, the total storage space of a single set of data would be much smaller than conventional methods, wherein the data is stored in its entirety. The more data sets that are stored, the larger the library becomes, and the more data can be stored in reference code form.

As an analogy, imagine each data set as a collection of printed books that are only occasionally accessed. The amount of physical shelf space required to store many collections would be quite large, and is analogous to conventional methods of storing every single bit of data in every data set. Consider, however, storing all common elements within and across books in a single library, and storing the books as references codes to those common elements in that library. As a single book is added to the library, it will contain many repetitions of words and phrases. Instead of storing the whole words and phrases, they are added to a library, and given a reference code, and stored as reference codes. At this scale, some space savings may be achieved, but the reference codes will be on the order of the same size as the words themselves. As more books are added to the library, larger phrases, quotations, and other words patterns will become common among the books. The larger the word patterns, the smaller the reference codes will be in relation to them as not all possible word patterns will be used. As entire collections of books are added to the library, sentences, paragraphs, pages, or even whole books will become repetitive. There may be many duplicates of books within a collection and across multiple collections, many references and quotations from one book to another, and much common phraseology within books on particular subjects. If each unique page of a book is stored only once in a common library and given a reference code, then a book of 1,000 pages or more could be stored on a few printed pages as a string of codes referencing the proper full-sized pages in the common library. The physical space taken up by the books would be dramatically reduced. The more collections that are added, the greater the likelihood that phrases, paragraphs, pages, or entire books will already be in the library, and the more information in each collection of books can be stored in reference form. Accessing entire collections of books is then limited not by physical shelf space, but by the ability to reprint and recycle the books as needed for use.

The projected increase in storage capacity using the method herein described is primarily dependent on two factors: 1) the ratio of the number of bits in a block to the number of bits in the reference code, and 2) the amount of repetition in data being stored by the system.

With respect to the first factor, the number of bits used in the reference codes to the sourceblocks must be smaller than the number of bits in the sourceblocks themselves in order for any additional data storage capacity to be obtained. As a simple example, 16-bit sourceblocks would require $2^{16}$, or 65536, unique reference codes to represent all possible patterns of bits. If all possible 65536 blocks patterns are utilized, then the reference code itself would also need to contain sixteen bits in order to refer to all possible 65,536 blocks patterns. In such case, there would be no storage savings. However, if only 16 of those block patterns are utilized, the reference code can be reduced to 4 bits in size, representing an effective compression of 4 times (16 bits/4 bits=4) versus conventional storage. Using a typical block size of 512 bytes, or 4,096 bits, the number of possible block patterns is $2^{4,096}$, which for all practical purposes is unlimited. A typical hard drive contains one terabyte (TB) of physical storage capacity, which represents 1,953,125,000, or roughly $2^{31}$, 512 byte blocks. Assuming that 1 TB of unique 512-byte sourceblocks were contained in the library, and that the reference code would thus need to be 31 bits long, the effective compression ratio for stored data would be on the order of 132 times (4,096/31≈132) that of conventional storage.

With respect to the second factor, in most cases it could be assumed that there would be sufficient repetition within a data set such that, when the data set is broken down into sourceblocks, its size within the library would be smaller than the original data. However, it is conceivable that the initial copy of a data set could require somewhat more storage space than the data stored in a conventional manner, if all or nearly all sourceblocks in that set were unique. For example, assuming that the reference codes are $1/10^{th}$ the size of a full-sized copy, the first copy stored as sourceblocks in the library would need to be 1.1 megabytes (MB), (1 MB for the complete set of full-sized sourceblocks in the library and 0.1 MB for the reference codes). However, since the sourceblocks stored in the library are universal, the more duplicate copies of something you save, the greater efficiency versus conventional storage methods. Conventionally, storing 10 copies of the same data requires 10 times the storage space of a single copy. For example, ten copies of a 1 MB file would take up 10 MB of storage space. However, using the method described herein, only a single full-sized copy is stored, and subsequent copies are stored as reference codes. Each additional copy takes up only a fraction of the space of the full-sized copy. For example, again assuming that the reference codes are $\frac{1}{10}^{th}$ the size of the full-size copy, ten copies of a 1 MB file would take up only 2 MB of space (1 MB for the full-sized copy, and 0.1 MB each for ten sets of reference codes). The larger the library, the more likely that part or all of incoming data will duplicate sourceblocks already existing in the library.

The size of the library could be reduced in a manner similar to storage of data. Where sourceblocks differ from each other only by a certain number of bits, instead of storing a new sourceblock that is very similar to one already existing in the library, the new sourceblock could be represented as a reference code to the existing sourceblock, plus information about which bits in the new block differ from the existing block. For example, in the case where 512 byte sourceblocks are being used, if the system receives a new sourceblock that differs by only one bit from a sourceblock already existing in the library, instead of storing a new 512 byte sourceblock, the new sourceblock could be stored as a reference code to the existing sourceblock, plus a reference to the bit that differs. Storing the new sourceblock as a reference code plus changes would require only a few bytes of physical storage space versus the 512 bytes that a full sourceblock would require. The algorithm could be optimized to store new sourceblocks in this reference code plus changes form unless the changes portion is large enough that it is more efficient to store a new, full sourceblock.

It will be understood by one skilled in the art that transfer and synchronization of data would be increased to the same extent as for storage. By transferring or synchronizing reference codes instead of full-sized data, the bandwidth requirements for both types of operations are dramatically reduced.

In addition, the method described herein is inherently a form of encryption. When the data is converted from its full form to reference codes, none of the original data is contained in the reference codes. Without access to the library of sourceblocks, it would be impossible to reconstruct any portion of the data from the reference codes. This inherent property of the method described herein could obviate the need for traditional encryption algorithms, thereby offsetting most or all of the computational cost of conversion of data back and forth to reference codes. In theory, the method described herein should not utilize any additional computing power beyond traditional storage using encryption algorithms. Alternatively, the method described herein could be in addition to other encryption algorithms to increase data security even further.

In other embodiments, additional security features could be added, such as: creating a proprietary library of sourceblocks for proprietary networks, physical separation of the reference codes from the library of sourceblocks, storage of the library of sourceblocks on a removable device to enable easy physical separation of the library and reference codes from any network, and incorporation of proprietary sequences of how sourceblocks are read and the data reassembled.

FIG. 42 is a flow diagram illustrating an exemplary method for analyzing caching patterns using a system for data storage, transfer, synchronization, and security using automated model monitoring and training with a load-adaptive cache, a load-adaptive cache. In a first step 4200, the system establishes baseline performance metrics by monitoring and collecting data access patterns over a defined time period. This may include tracking which data elements are accessed, how frequently they are accessed, and the timing of these accesses. For example, the system might track matrix transformation operations over a 24-hour period to understand typical usage patterns.

In a step 4210, the system performs temporal locality analysis by examining how frequently and when specific data elements are repeatedly accessed. This analysis reveals patterns such as data elements that are frequently reused within short time windows or periodic access patterns that occur at regular intervals. For instance, certain transformation matrices might be heavily accessed during peak processing periods but rarely used during other times.

In a step 4220, the system processes the collected data to identify correlations between different data elements that are frequently accessed together or in sequence. This might reveal that certain data transformations commonly occur in specific sequences, or that particular data elements are typically accessed together as part of larger operations. For example, specific encoding operations might consistently require access to certain reference tables in a predictable sequence.

In a step 4230, the system generates statistical models to predict future access patterns based on the analyzed historical data and identified correlations. These models take into account factors such as time-of-day variations, workload patterns, and sequential dependencies to forecast which data elements are likely to be needed. For instance, the model might predict increased demand for certain cached elements during known peak processing periods.

In a step 4240, the system creates or modifies caching rules based on the identified patterns and predictions to optimize cache utilization and hit rates. These rules determine which elements should be cached, how long they should be retained, and when they should be preemptively loaded. For example, rules might be created to ensure commonly used transformation matrices are always cached during peak processing periods.

In a step 4250, the system measures and verifies the effectiveness of the new caching rules by comparing current performance metrics against the baseline measurements established in the first step. This verification might include comparing cache hit rates, access latencies, and resource utilization before and after implementing the new rules to ensure the changes have produced the desired improvements in system performance.

FIG. 43 is a flow diagram illustrating an exemplary method for dynamic cache management using a system for data storage, transfer, synchronization, and security using automated model monitoring and training with a load-adaptive cache, a load-adaptive cache. In a first step 4300, the system maintains continuous monitoring of key system load metrics to establish current operating conditions. This includes tracking processor utilization to understand computational load, memory usage patterns to identify resource constraints, and network traffic volumes to assess data movement demands. For example, the system might detect that processor utilization has reached 80% during a period of high-volume data transformation operations.

In a step 4310, the system performs detailed analysis of cache performance by calculating and evaluating hit rates and miss penalties across different cache levels and data types. This evaluation might reveal, for instance, that transformation matrix cache hits are consistently high at 95%, while encoded data block cache hits have dropped to 60% during peak processing periods, indicating a potential area for optimization.

In a step 4320, the system dynamically adjusts various cache parameters in response to the observed performance metrics. These adjustments might include increasing cache size allocations for frequently accessed data types, modifying retention policies to keep high-value data cached longer, or adjusting priority levels to optimize cache utilization. For example, if matrix transformations are showing high reuse rates, the system might increase the allocation of cache space for transformation matrices while reducing space for less frequently accessed data types.

In a step 4330, the system updates its data prefetch rules by modifying both the aggressiveness of prefetching operations and their timing based on current conditions. During periods of low system load, the prefetch rules might be adjusted to be more aggressive, proactively loading data that may be needed soon. Conversely, during high-load periods, prefetch operations might be made more selective to avoid consuming resources.

In a step 4340, the system performs a comparative analysis of system performance before and after the parameter adjustments to verify their positive impact on overall efficiency. This comparison might involve measuring metrics such as average response time, cache hit rates, resource utilization, and processing throughput to ensure that the adjustments have produced the intended improvements without creating new bottlenecks or inefficiencies.

FIG. 44 is a flow diagram illustrating an exemplary method for predictive prefetching using a system for data storage, transfer, synchronization, and security using automated model monitoring and training with a load-adaptive cache, a load-adaptive cache. In a first step 4400, the system examines incoming data access requests and current workload patterns to identify potential prefetch opportunities. For example, when processing a sequence of data transformations, the system might detect that certain types of matrix operations frequently follow one another in a predictable sequence, creating an opportunity for preemptive data loading.

In a step 4410, the system performs comparative analysis between current access patterns and historical access data to identify recurring sequences and relationships. This might reveal, for instance, that certain encryption operations consistently require access to specific lookup tables immediately after processing transformation matrices, establishing a predictable access pattern that can be optimized.

In a step 4420, the system calculates likelihood scores for different potential prefetch operations based on both historical accuracy and current system conditions. For example, if a particular sequence of data accesses has historically occurred with 90% probability during peak processing periods, but only 40% probability during low-load periods, the system would factor these probabilities along with current system load to determine prefetch priorities.

In a step 4430, the system executes prefetch operations for data elements whose likelihood scores exceed configured thresholds, while carefully considering available system resources. For instance, if system resources are abundant, the system might prefetch data elements with likelihood scores above 70%, but during high-load periods, this threshold might be raised to 85% to ensure resources are used only for highly probable prefetch operations.

In a step 4440, the system maintains detailed records of prefetch prediction accuracy and uses this information to continuously refine its prediction models. This might involve tracking metrics such as the percentage of prefetched data actually used, the timing accuracy of prefetch operations, and the resource overhead incurred. For example, if certain prefetch predictions consistently result in unused cached data, the system would adjust its prediction models to be more selective for those particular patterns.

Figure 7:
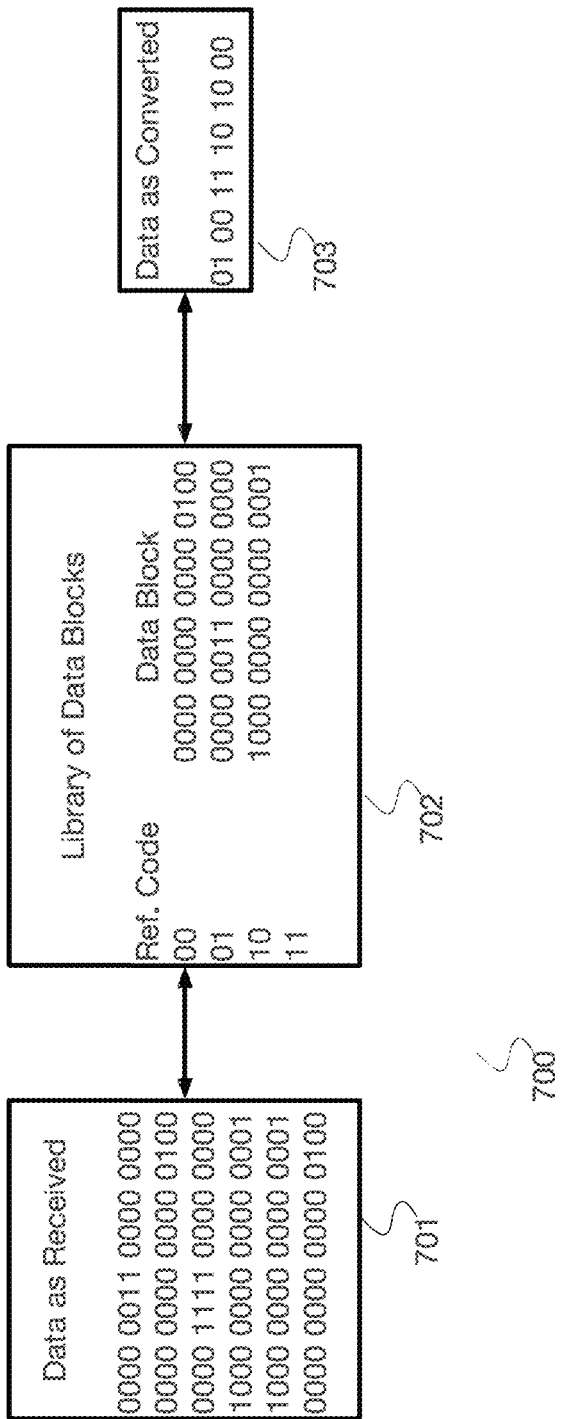
FIG. 7 is a diagram showing an example of how data might be converted into reference codes using an aspect of an embodiment.

FIG. 7 is a diagram showing an example of how data might be converted into reference codes using an aspect of an embodiment 700. As data is received 701, it is read by the processor in sourceblocks of a size dynamically determined by the previously disclosed sourceblock size optimizer 410. In this example, each sourceblock is 16 bits in length, and the library 702 initially contains three sourceblocks with reference codes 00, 01, and 10. The entry for reference code 11 is initially empty. As each 16 bit sourceblock is received, it is compared with the library. If that sourceblock is already contained in the library, it is assigned the corresponding reference code. So, for example, as the first line of data (0000 0011 0000 0000) is received, it is assigned the reference code (01) associated with that sourceblock in the library. If that sourceblock is not already contained in the library, as is the case with the third line of data (0000 1111 0000 0000) received in the example, that sourceblock is added to the library and assigned a reference code, in this case 11. The data is thus converted 703 to a series of reference codes to sourceblocks in the library. The data is stored as a collection of codewords, each of which contains the reference code to a sourceblock and information about the location of the sourceblocks in the data set. Reconstructing the data is performed by reversing the process. Each stored reference code in a data collection is compared with the reference codes in the library, the corresponding sourceblock is read from the library, and the data is reconstructed into its original form.

FIG. 8 is a method diagram showing the steps involved in using an embodiment 800 to store data. As data is received 801, it would be deconstructed into sourceblocks 802, and passed 803 to the library management module for processing. Reference codes would be received back 804 from the library management module, and could be combined with location information to create codewords 805, which would then be stored 806 as representations of the original data.

Figure 9:
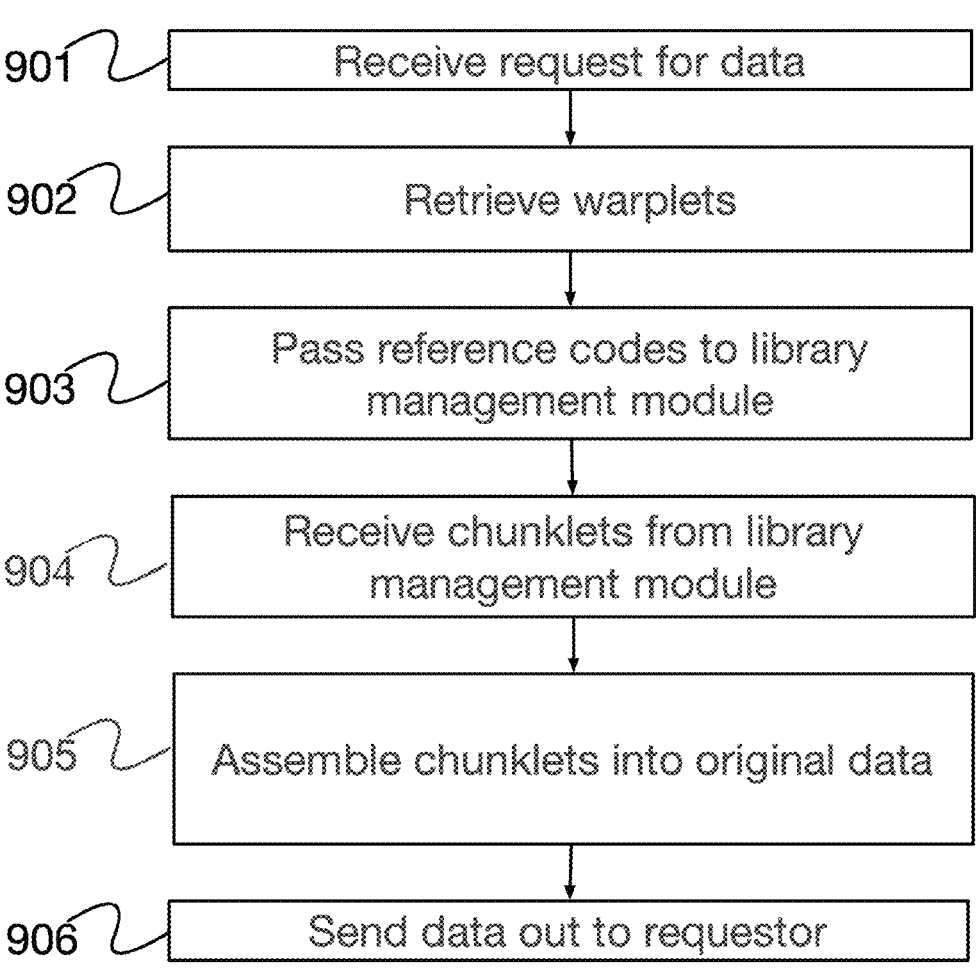
FIG. 9 is a method diagram showing the steps involved in using an embodiment to retrieve data.

FIG. 9 is a method diagram showing the steps involved in using an embodiment 900 to retrieve data. When a request for data is received 901, the associated codewords would be retrieved 902 from the library. The codewords would be passed 903 to the library management module, and the associated sourceblocks would be received back 904. Upon receipt, the sourceblocks would be assembled 905 into the original data using the location data contained in the codewords, and the reconstructed data would be sent out 906 to the requestor.

Figure 10:
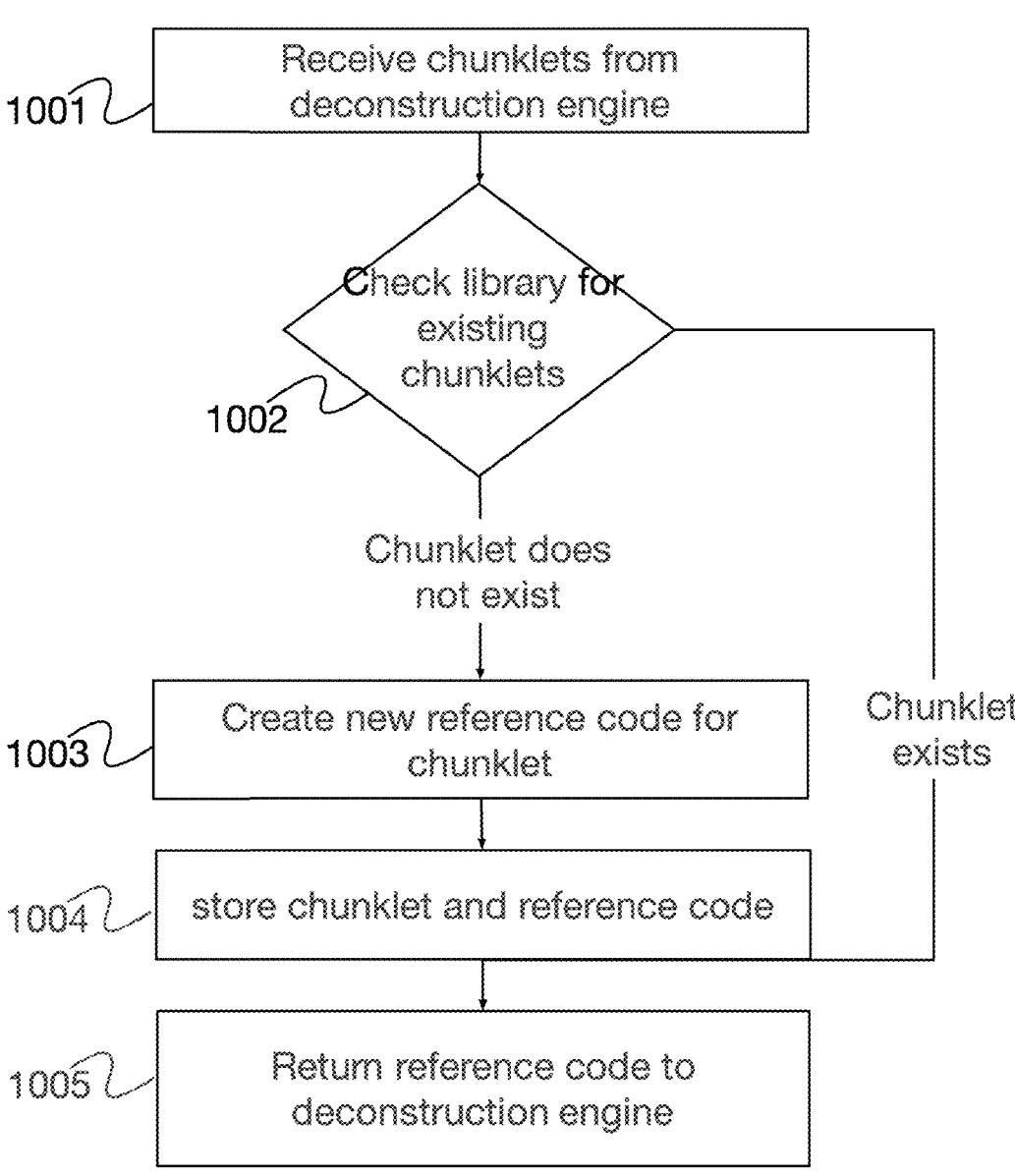
FIG. 10 is a method diagram showing the steps involved in using an embodiment to encode data.

FIG. 10 is a method diagram showing the steps involved in using an embodiment 1000 to encode data. As sourceblocks are received 1001 from the deconstruction engine, they would be compared 1002 with the sourceblocks already contained in the library. If that sourceblock already exists in the library, the associated reference code would be returned 1005 to the deconstruction engine. If the sourceblock does not already exist in the library, a new reference code would be created 1003 for the sourceblock. The new reference code and its associated sourceblock would be stored 1004 in the library, and the reference code would be returned to the deconstruction engine.

Figure 11:
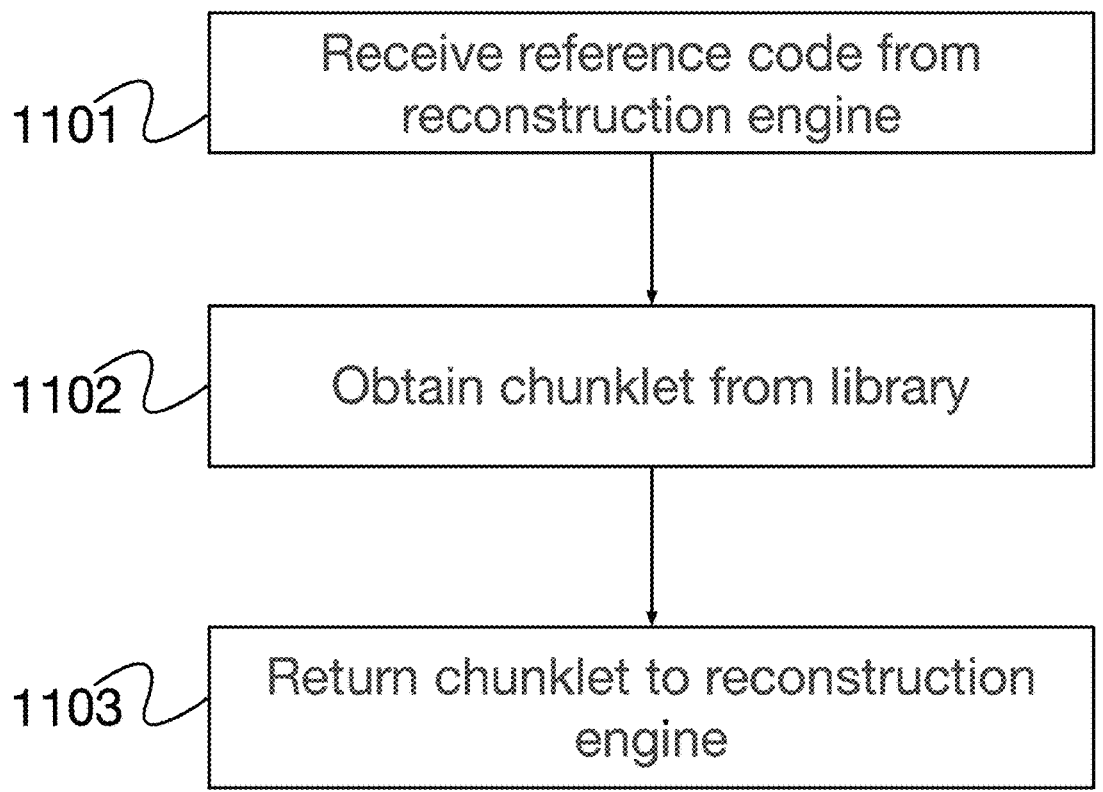
FIG. 11 is a method diagram showing the steps involved in using an embodiment to decode data.

FIG. 11 is a method diagram showing the steps involved in using an embodiment 1100 to decode data. As reference codes are received 1101 from the reconstruction engine, the associated sourceblocks are retrieved 1102 from the library, and returned 1103 to the reconstruction engine.

Figure 16:
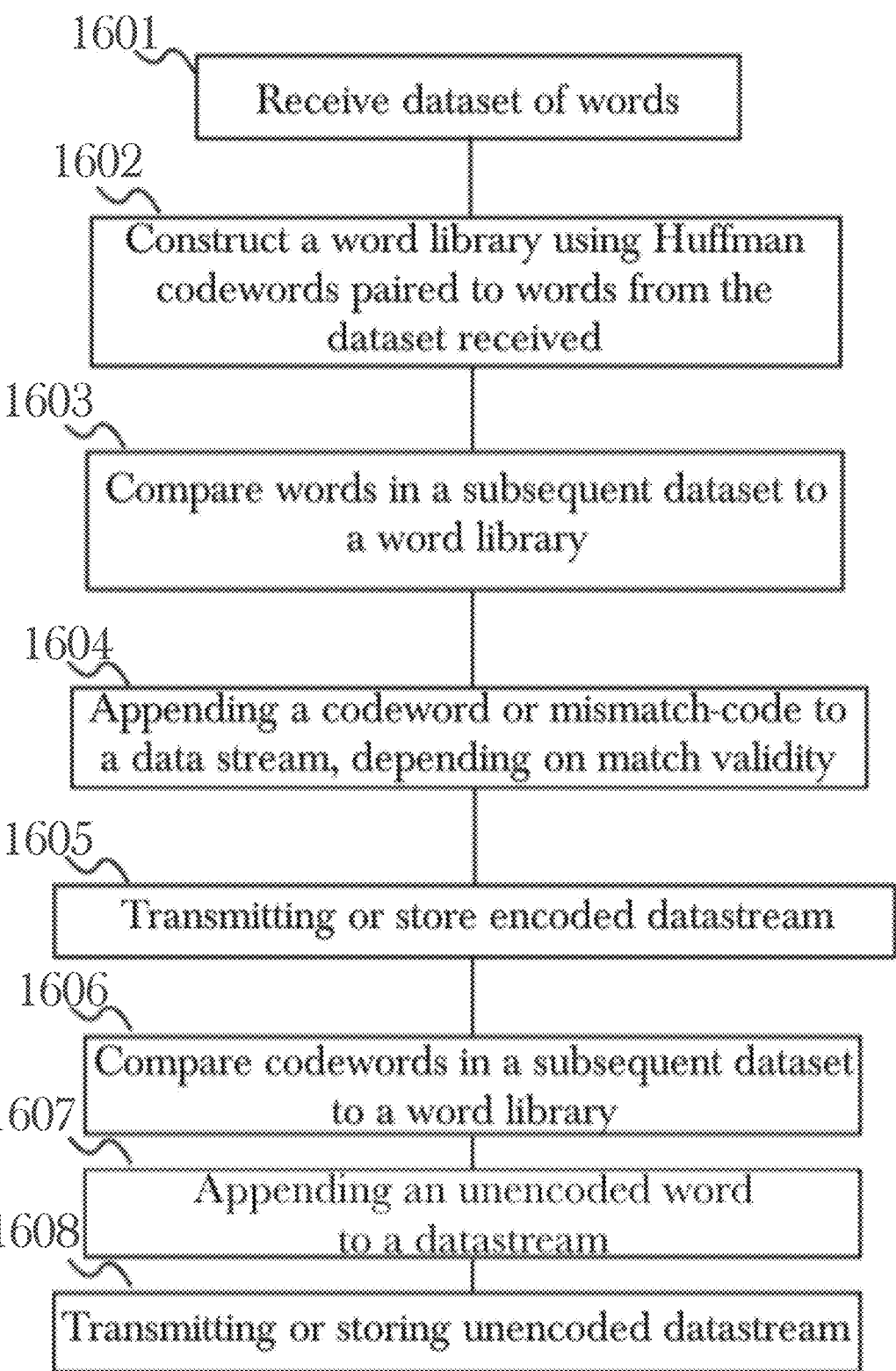
FIG. 16 is a method diagram illustrating key system functionality utilizing an encoder and decoder pair.

FIG. 16 is a method diagram illustrating key system functionality utilizing an encoder and decoder pair, according to a preferred embodiment. In a first step 1601, at least one incoming data set may be received at a customized library generator 1300 that then 1602 processes data to produce a customized word library 1201 comprising key-value pairs of data words (each comprising a string of bits) and their corresponding calculated binary Huffman codewords. A subsequent dataset may be received, and compared to the word library 1603 to determine the proper codewords to use in order to encode the dataset. Words in the dataset are checked against the word library and appropriate encodings are appended to a data stream 1604. If a word is mismatched within the word library and the dataset, meaning that it is present in the dataset but not the word library, then a mismatched code is appended, followed by the unencoded original word. If a word has a match within the word library, then the appropriate codeword is appended to the data stream. Such a data stream may then be stored or transmitted 1605 to a destination as desired. For the purposes of decoding, an already-encoded data stream may be received and compared 1606, and un-encoded words may be appended to a new data stream 1607 depending on word matches found between the encoded data stream and the word library that is present. A matching codeword that is found in a word library is replaced with the matching word and appended to a data stream, and a mismatch code found in a data stream is deleted and the following unencoded word is re-appended to a new data stream, the inverse of the process of encoding described earlier. Such a data stream may then be stored or transmitted 1608 as desired.

FIG. 17 is a method diagram illustrating possible use of a hybrid encoder/decoder to improve the compression ratio, according to a preferred aspect. A second Huffman binary tree may be created 1701, having a shorter maximum length of codewords than a first Huffman binary tree 1602, allowing a word library to be filled with every combination of codeword possible in this shorter Huffman binary tree 1702. A word library may be filled with these Huffman codewords and words from a dataset 1702, such that a hybrid encoder/decoder 1304, 1503 may receive any mismatched words from a dataset for which encoding has been attempted with a first Huffman binary tree 1703, 1604 and parse previously mismatched words into new partial codewords (that is, codewords that are each a substring of an original mismatched codeword) using the second Huffman binary tree 1704. In this way, an incomplete word library may be supplemented by a second word library. New codewords attained in this way may then be returned to a transmission encoder 1705, 1500. In the event that an encoded dataset is received for decoding, and there is a mismatch code indicating that additional coding is needed, a mismatch code may be removed and the unencoded word used to generate a new codeword as before 1706, so that a transmission encoder 1500 may have the word and newly generated codeword added to its word library 1707, to prevent further mismatching and errors in encoding and decoding.

It will be recognized by a person skilled in the art that the methods described herein can be applied to data in any form. For example, the method described herein could be used to store genetic data, which has four data units: C, G, A, and T.

Those four data units can be represented as 2 bit sequences: 00, 01, 10, and 11, which can be processed and stored using the method described herein.

It will be recognized by a person skilled in the art that certain embodiments of the methods described herein may have uses other than data storage. For example, because the data is stored in reference code form, it cannot be reconstructed without the availability of the library of sourceblocks. This is effectively a form of encryption, which could be used for cyber security purposes. As another example, an embodiment of the method described herein could be used to store backup copies of data, provide for redundancy in the event of server failure, or provide additional security against cyberattacks by distributing multiple partial copies of the library among computers are various locations, ensuring that at least two copies of each sourceblock exist in different locations within the network.

Figure 18:
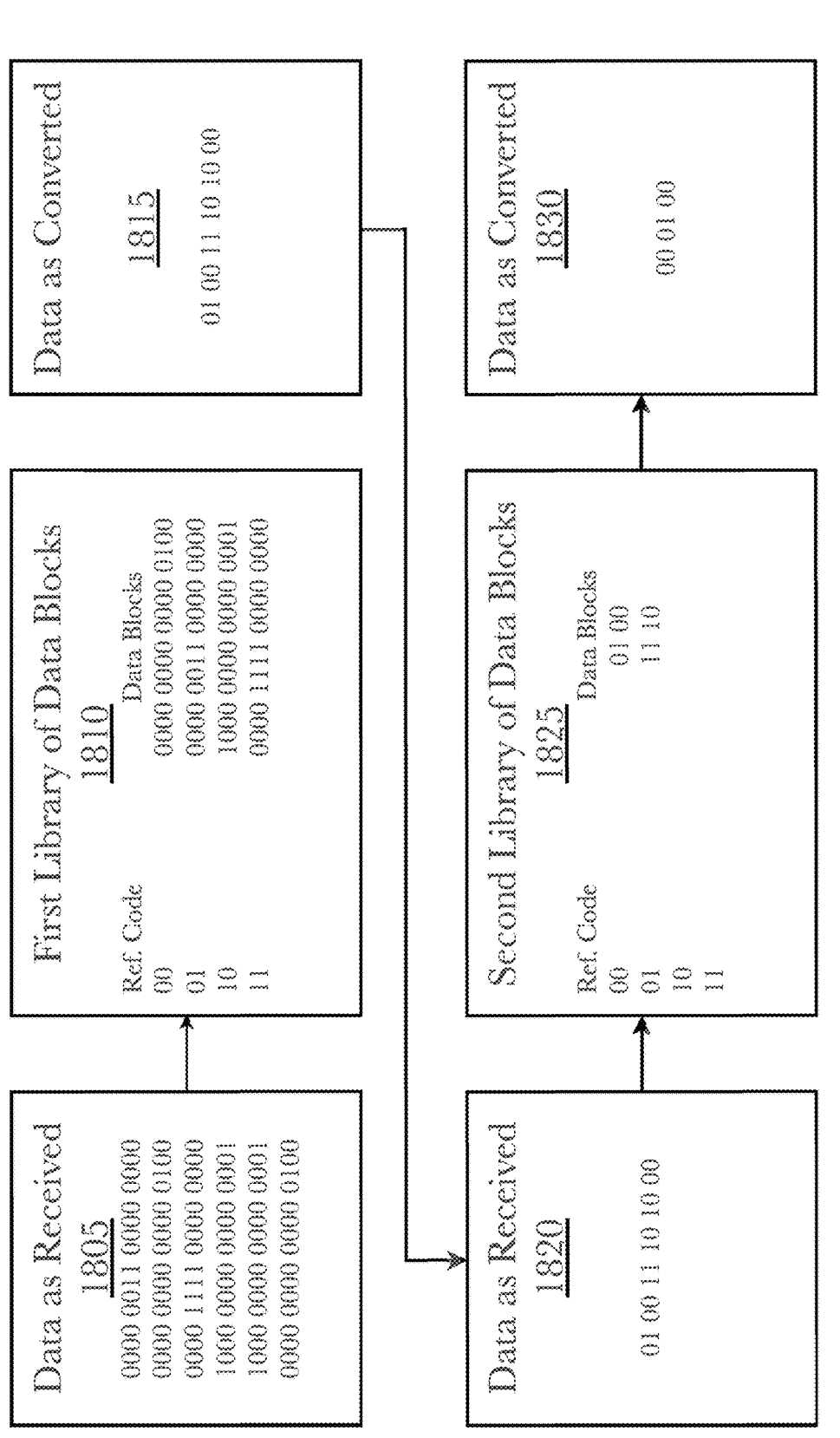
FIG. 18 is a flow diagram illustrating the use of a data encoding system used to recursively encode data to further reduce data size.

FIG. 18 is a flow diagram illustrating the use of a data encoding system used to recursively encode data to further reduce data size. Data may be input 1805 into a data deconstruction engine 102 to be deconstructed into code references, using a library of code references based on the input 1810. Such example data is shown in a converted, encoded format 1815, highly compressed, reducing the example data from 96 bits of data, to 12 bits of data, before sending this newly encoded data through the process again 1820, to be encoded by a second library 1825, reducing it even further. The newly converted data 1830 is shown as only 6 bits in this example, thus a size of 6.25% of the original data packet. With recursive encoding, then, it is possible and implemented in the system to achieve increasing compression ratios, using multi-layered encoding, through recursively encoding data. Both initial encoding libraries 1810 and subsequent libraries 1825 may be achieved through machine learning techniques to find optimal encoding patterns to reduce size, with the libraries being distributed to recipients prior to transfer of the actual encoded data, such that only the compressed data 1830 must be transferred or stored, allowing for smaller data footprints and bandwidth requirements. This process can be reversed to reconstruct the data. While this example shows only two levels of encoding, recursive encoding may be repeated any number of times. The number of levels of recursive encoding will depend on many factors, a non-exhaustive list of which includes the type of data being encoded, the size of the original data, the intended usage of the data, the number of instances of data being stored, and available storage space for codebooks and libraries. Additionally, recursive encoding can be applied not only to data to be stored or transmitted, but also to the codebooks and/or libraries, themselves. For example, many installations of different libraries could take up a substantial amount of storage space. Recursively encoding those different libraries to a single, universal library would dramatically reduce the amount of storage space required, and each different library could be reconstructed as necessary to reconstruct incoming streams of data.

Figure 20:
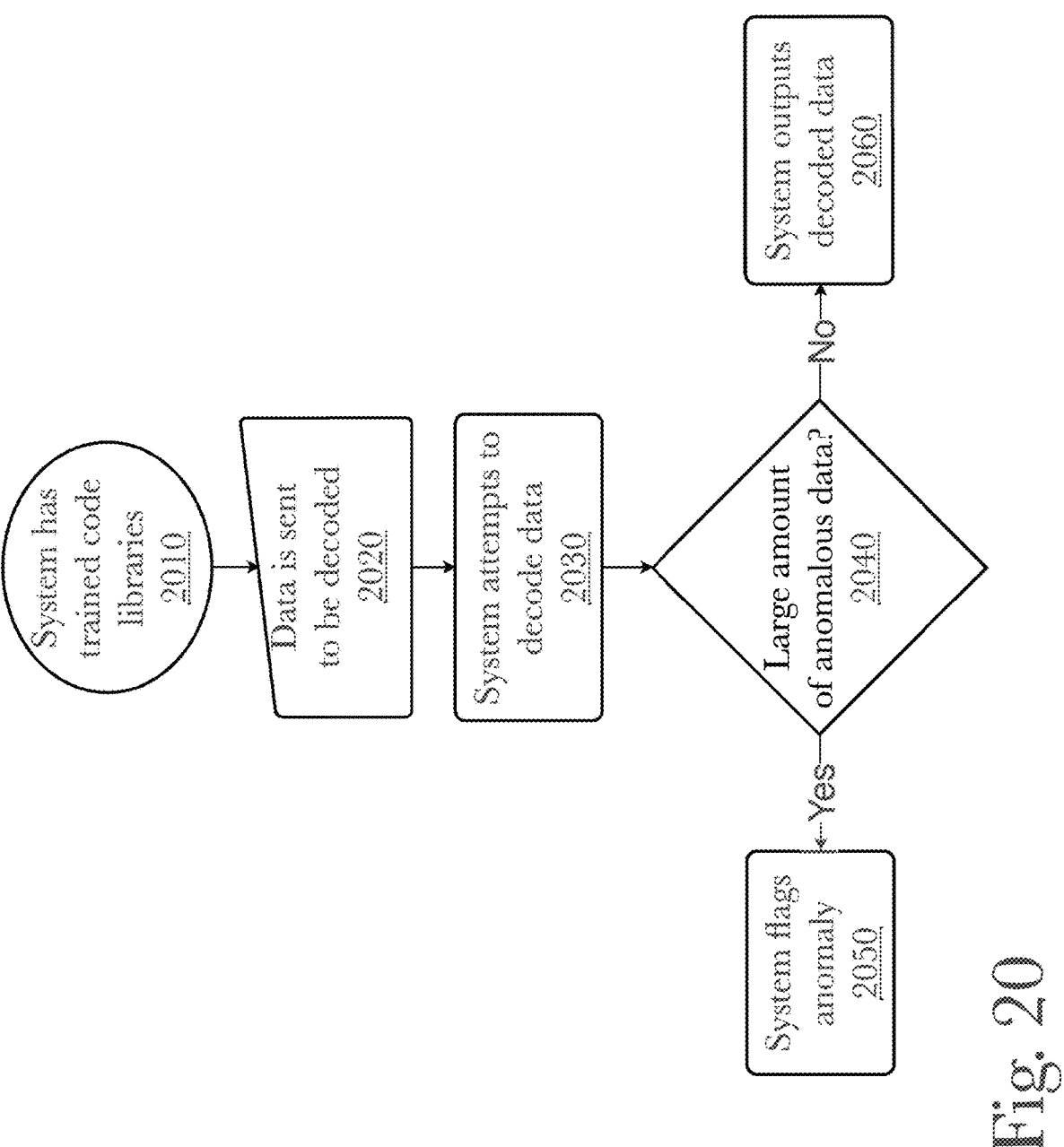
FIG. 20 is a flow diagram of an exemplary method used to detect anomalies in received encoded data and producing a warning.

FIG. 20 is a flow diagram of an exemplary method used to detect anomalies in received encoded data and producing a warning. A system may have trained encoding libraries 2010, before data is received from some source such as a network connected device or a locally connected device including USB connected devices, to be decoded 2020. Decoding in this context refers to the process of using the encoding libraries to take the received data and attempt to use encoded references to decode the data into its original source 2030, potentially more than once if recursive encoding was used, but not necessarily more than once. An anomaly detector 1910 may be configured to detect a large amount of un-encoded data 2040 in the midst of encoded data, by locating data or references that do not appear in the encoding libraries, indicating at least an anomaly, and potentially data tampering or faulty encoding libraries. A flag or warning is set by the system 2050, allowing a user to be warned at least of the presence of the anomaly and the characteristics of the anomaly. However, if a large amount of invalid references or unencoded data are not present in the encoded data that is attempting to be decoded, the data may be decoded and output as normal 2060, indicating no anomaly has been detected.

Figure 21:
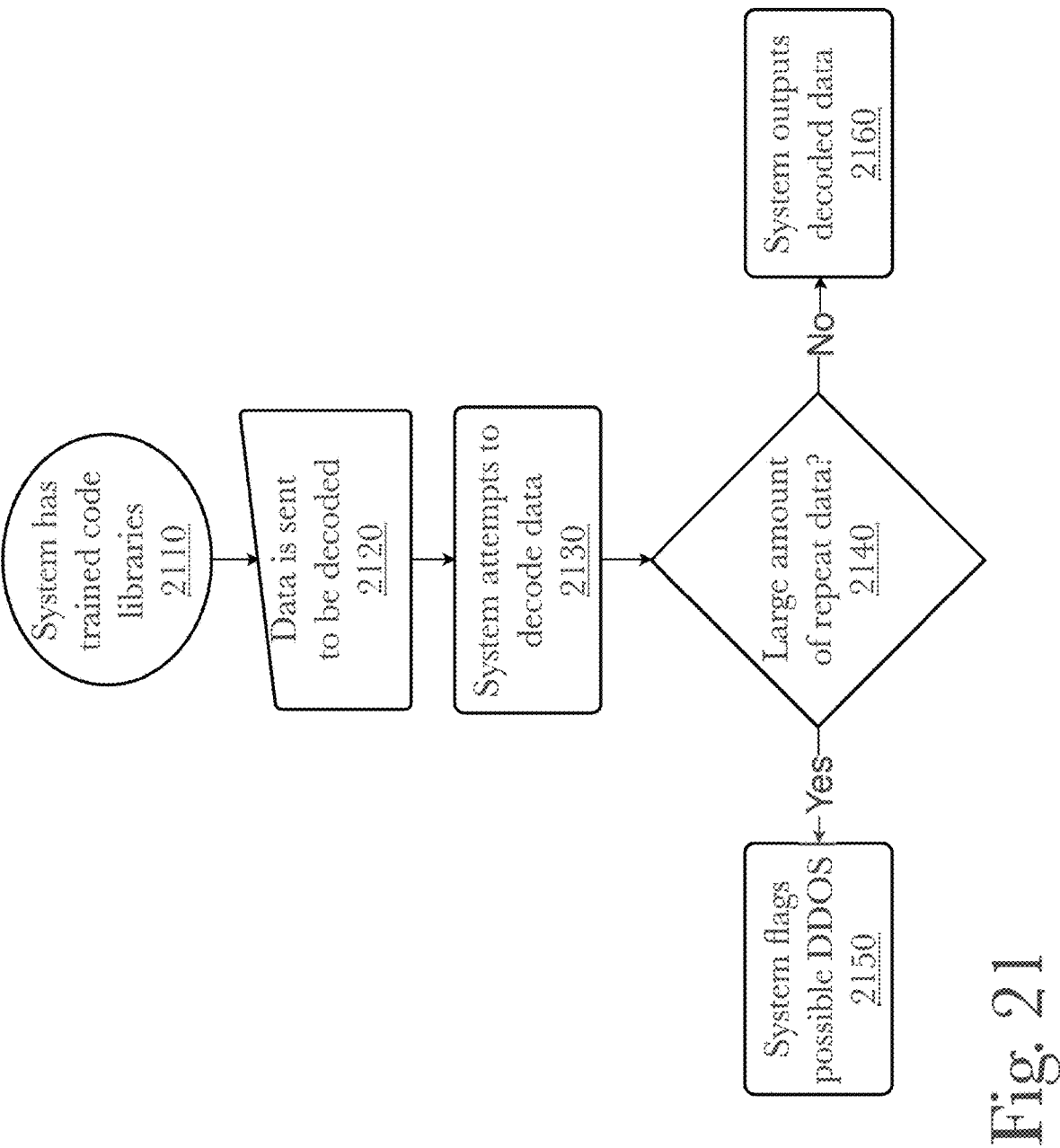
FIG. 21 is a flow diagram of a data encoding system used for Distributed Denial of Service (DDoS) attack denial.

FIG. 21 is a flow diagram of a method used for Distributed Denial of Service (DDoS) attack denial. A system may have trained encoding libraries 2110, before data is received from some source such as a network connected device or a locally connected device including USB connected devices, to be decoded 2120. Decoding in this context refers to the process of using the encoding libraries to take the received data and attempt to use encoded references to decode the data into its original source 2130, potentially more than once if recursive encoding was used, but not necessarily more than once. A DDoS detector 1920 may be configured to detect a large amount of repeating data 2140 in the encoded data, by locating data or references that repeat many times over (the number of which can be configured by a user or administrator as need be), indicating a possible DDoS attack. A flag or warning is set by the system 2150, allowing a user to be warned at least of the presence of a possible DDoS attack, including characteristics about the data and source that initiated the flag, allowing a user to then block incoming data from that source. However, if a large amount of repeat data in a short span of time is not detected, the data may be decoded and output as normal 2160, indicating no DDoS attack has been detected.

Figure 23:
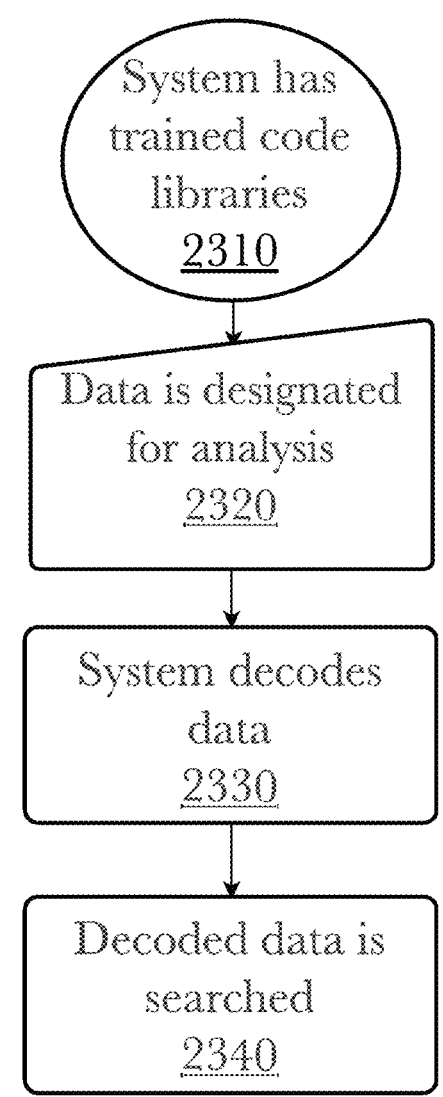
FIG. 23 is a flow diagram of an exemplary method used to enable high-speed data mining of repetitive data.

FIG. 23 is a flow diagram of an exemplary method used to enable high-speed data mining of repetitive data. A system may have trained encoding libraries 2310, before data is received from some source such as a network connected device or a locally connected device including USB connected devices, to be analyzed 2320 and decoded 2330. When determining data for analysis, users may select specific data to designate for decoding 2330, before running any data mining or analytics functions or software on the decoded data 2340. Rather than having traditional decryption and decompression operate over distributed drives, data can be regenerated immediately using the encoding libraries disclosed herein, as it is being searched. Using methods described in FIG. 9 and FIG. 11, data can be stored, retrieved, and decoded swiftly for searching, even across multiple devices, because the encoding library may be on each device. For example, if a group of servers host codewords relevant for data mining purposes, a single computer can request these codewords, and the codewords can be sent to the recipient swiftly over the bandwidth of their connection, allowing the recipient to locally decode the data for immediate evaluation and searching, rather than running slow, traditional decompression algorithms on data stored across multiple devices or transfer larger sums of data across limited bandwidth.

Figure 25:
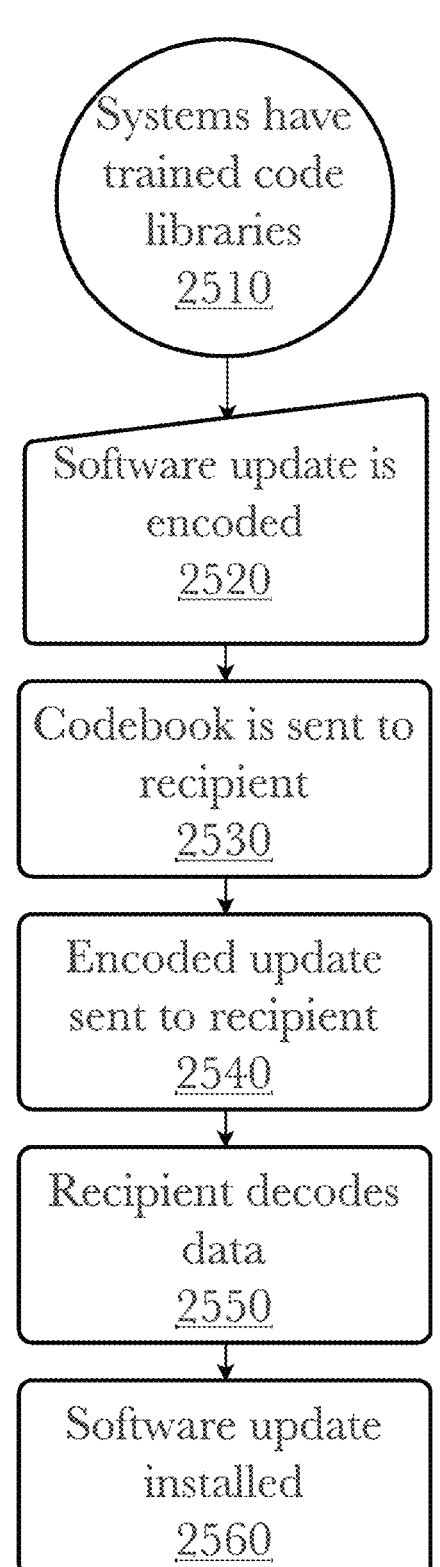
FIG. 25 is a flow diagram of an exemplary method used to encode and transfer software and firmware updates to a device for installation, for the purposes of reduced bandwidth consumption.

FIG. 25 is a flow diagram of an exemplary method used to encode and transfer software and firmware updates to a device for installation, for the purposes of reduced bandwidth consumption. A first system may have trained code libraries or "codebooks" present 2510, allowing for a software update of some manner to be encoded 2520. Such a software update may be a firmware update, operating system update, security patch, application patch or upgrade, or any other type of software update, patch, modification, or upgrade, affecting any computer system. A codebook for the patch must be distributed to a recipient 2530, which may be done beforehand and either over a network or through a local or physical connection, but must be accomplished at some point in the process before the update may be installed on the recipient device 2560. An update may then be distributed to a recipient device 2540, allowing a recipient with a codebook distributed to them 2530 to decode the update 2550 before installation 2560. In this way, an encoded and thus heavily compressed update may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 27:
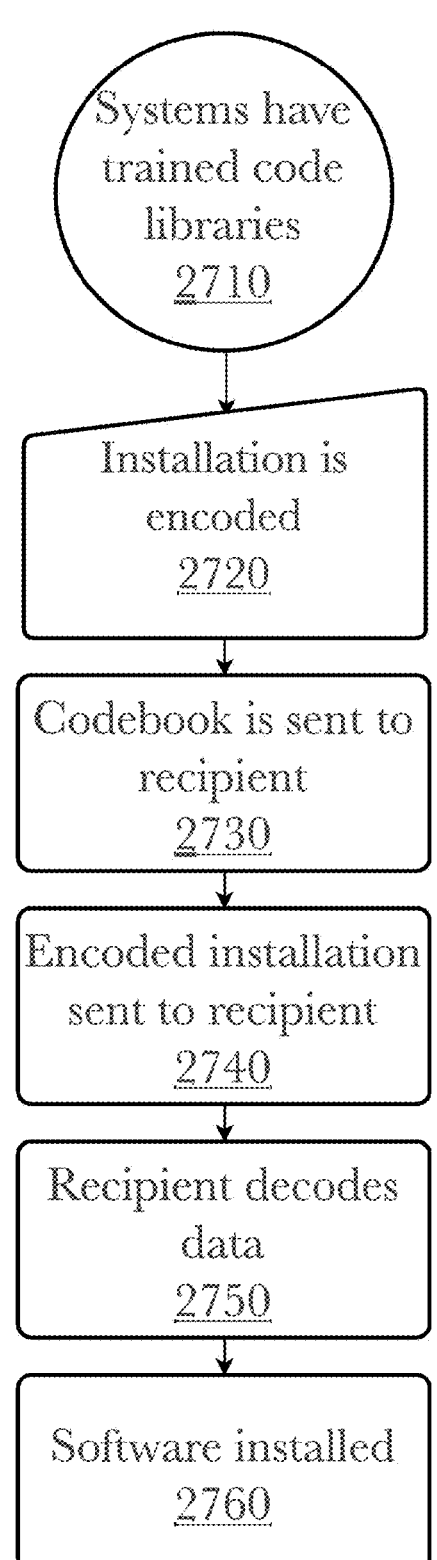
FIG. 27 is a flow diagram of an exemplary method used to encode new software and operating system installations for reduced bandwidth required for transference.

FIG. 27 is a flow diagram of an exemplary method used to encode new software and operating system installations for reduced bandwidth required for transference. A first system may have trained code libraries or "codebooks" present 2710, allowing for a software installation of some manner to be encoded 2720. Such a software installation may be a software update, operating system, security system, application, or any other type of software installation, execution, or acquisition, affecting a computer system. An encoding library or "codebook" for the installation must be distributed to a recipient 2730, which may be done beforehand and either over a network or through a local or physical connection, but must be accomplished at some point in the process before the installation can begin on the recipient device 2760. An installation may then be distributed to a recipient device 2740, allowing a recipient with a codebook distributed to them 2730 to decode the installation 2750 before executing the installation 2760. In this way, an encoded and thus heavily compressed software installation may be sent to a recipient far quicker and with less bandwidth usage than traditional lossless compression methods for data, or when sending data in uncompressed formats. This especially may benefit large distributions of software and software updates, as with enterprises updating large numbers of devices at once.

FIG. 31 is a method diagram illustrating the steps 3100 involved in using an embodiment of the codebook training system to update a codebook. The process begins when requested data is received 3101 by a codebook training module. The requested data may comprise a plurality of sourceblocks. Next, the received data may be stored in a cache and formatted into a test dataset 3102. The next step is to retrieve the previously computed probability distribution associated with the previous (most recent) training dataset from a storage device 3103. Using one or more algorithms, measure and record the probability distribution of the test dataset 3104. The step after that is to compare the measured probability distributions of the test dataset and the previous training dataset to compute the difference in distribution statistics between the two datasets 3105. If the test dataset probability distribution exceeds a pre-determined difference threshold, then the test dataset will be used to retrain the encoding/decoding algorithms 3106 to reflect the new distribution of the incoming data to the encoder/decoder system. The retrained algorithms may then be used to create new data sourceblocks 3107 that better capture the nature of the data being received. These newly created data sourceblocks may then be used to create new codewords and update a codebook 3108 with each new data sourceblock and its associated new codeword. Last, the updated code-books may be sent to encoding and decoding machines 3109 in order to ensure the encoding/decoding system function properly.

Dyadic Distribution-Based Simultaneous Compression and Encryption

Figure 32:
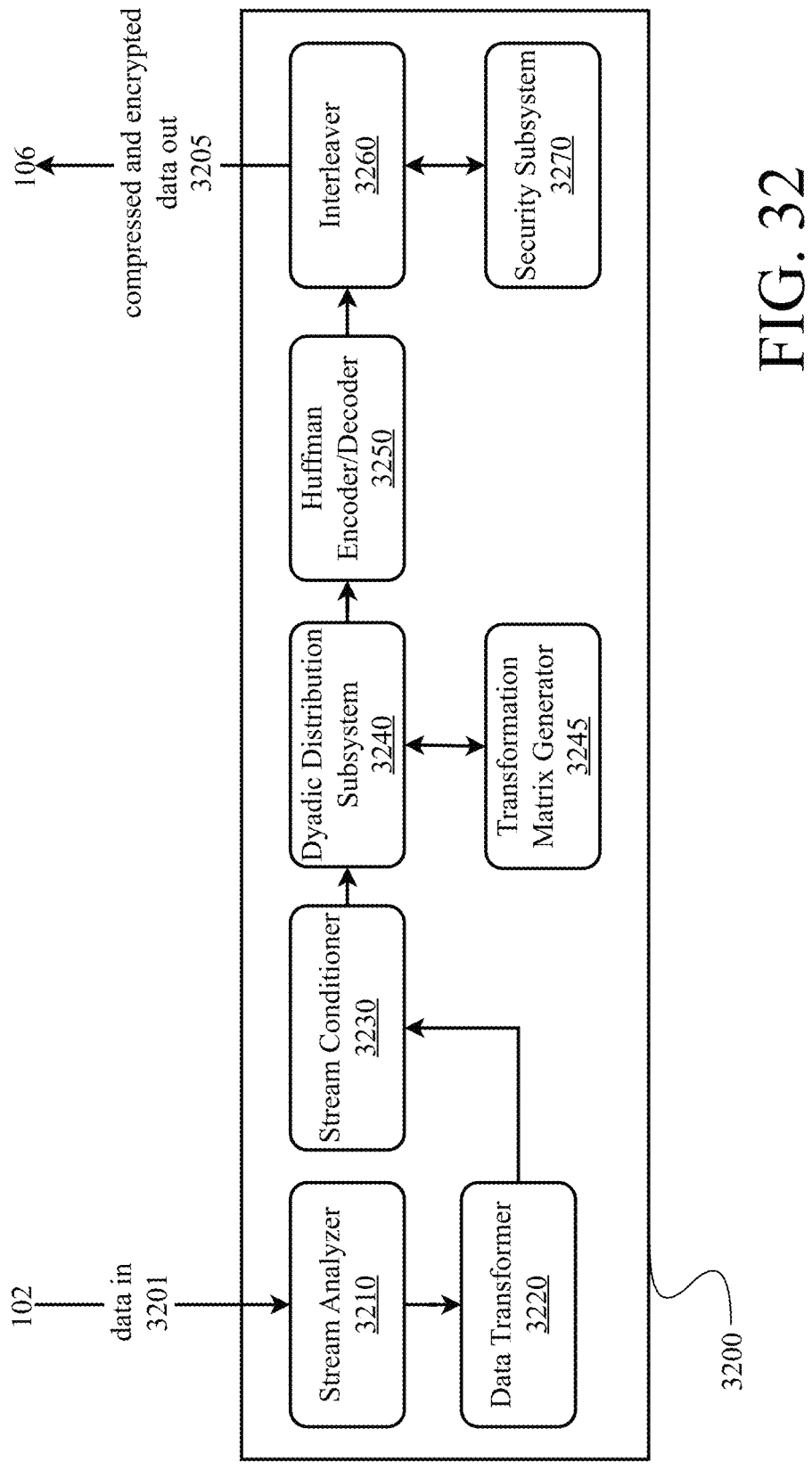
FIG. 32 is a block diagram illustrating an exemplary system architecture for a dyadic distribution-based compression and encryption platform.

FIG. 32 is a block diagram illustrating an exemplary system architecture for a dyadic distribution-based compression and encryption platform 3200, according to an embodiment. According to the embodiment, the platform 3200 comprises a stream analyzer subsystem 3210 which receives, retrieves, or otherwise obtains an input data stream 3201 from the data deconstruction engine 102, a data transformer subsystem 3220, a stream conditioner subsystem 3230, a dyadic distribution algorithm subsystem 3240 which integrates with a transformation matrix generator 3245, one or more Huffman encoder/decoders 3250, an interleaver subsystem 3260 which interfaces with a security subsystem 3270 and which outputs a compressed and encrypted data stream 3205 to the codeword storage 106. In this exemplary architecture, data flows as illustrated. Stream analyzer subsystem 3210 first processes the input data 3201, passing its analysis to data transformer subsystem 3220. The stream conditioner subsystem 3230 then further processes the data before it's passed to dyadic distribution subsystem 3240. The dyadic distribution subsystem 3240 works in conjunction with transformation matrix generator 3245 to apply the necessary transformations and generate a second-ary transformation data stream. The Huffman encoder/de-coder 3250 compresses the data into a compressed input data stream, which is then interleaved with the secondary trans-formation data stream by interleaver subsystem 3260. The security subsystem 3270 interacts with interleaver subsys-tem 3260 to ensure the cryptographic properties of the output stream are maintained. This architecture allows for a modular implementation where each component can be optimized or replaced independently, while still maintaining the overall flow and functionality of the system.

In some implementations, platform 3200 may be imple-mented as a cloud-based service or system which hosts and/or supports various microservices or subsystems (e.g., components 3210-3270 implemented as microservices/sub-systems). In some implementations, platform 3200 may be implemented as computing device comprising a memory and a processor, with computer readable programming instructions (or other computer-readable storage media) stored within the memory and operable/executable by/on the processor which cause the computing device to perform various operations associated with the execution of one or more platform tasks described herein.

According to the embodiment, stream analyzer subsystem 3210 is present and configured to analyze an input data stream to determine its statistical properties. This may comprise performing frequency analysis on data blocks within the input stream. It can determine the most frequent bytes or strings of bytes that occur at the beginning of each data block and designates these as prefixes. It may compile a prefix table based on the frequency distribution.

According to the embodiment, data transformer subsys-tem 3220 is present and configured to apply one or more transformations to the data to make it more compressible and secure. In an implementation, the platform applies the Burrows-Wheeler Transform (BWT) to the prefixes in the prefix table. This transformation makes the data more com-pressible while also providing a layer of encryption.

According to the embodiment, stream conditioner sub-system 3230 is present and configured to produce a conditioned data stream and an error stream. For example, for each data block, it compares the block's real frequency against an ideal frequency. If the difference exceeds a threshold, it applies a conditioning rule. It then applies a logical XOR operation and append the output to an error stream.

The dyadic distribution subsystem 3240 receives the data stream and implements the core algorithm. This may com-prise transforming the input data into a dyadic distribution whose Huffman encoding is close to uniform. It stores the transformations in a compressed secondary stream which may be (selectively) interwoven with the first, currently processing input stream.

Dyadic distribution subsystem 3240 may integrate with transformation matrix generator 3245. The transformation matrix generator creates and manages the transformation matrix B. According to an aspect, the generator constructs a nonnegative, row-stochastic matrix where each entry repre-sents the probability of transforming one state to another as an instance of matrix B. The matrix is configured to ensure that the transformation reshapes the data distribution while introducing controlled randomness.

According to an implementation, transformation matrix generator 3245 creates the transformation matrix B based on the initial analysis of the input data distribution provided by the stream analyzer. This matrix B is a component that dyadic distribution subsystem 3240 will use throughout the process. As the dyadic distribution subsystem receives each data block, it consults the transformation matrix B to deter-mine how to transform the data. For each state (or symbol) in the input data, the data transformer uses the corresponding row in matrix B to determine the probability distribution for transforming that state to other states. The dyadic distribu-tion subsystem may use a random number generator (such as provided by security subsystem 3270) to select a transfor-mation based on the probabilities in matrix B. This intro-duces controlled randomness into the process.

Through these transformations, the dyadic distribution subsystem reshapes the data distribution to approach the dyadic distribution implied by the Huffman coding (as determined by the Huffman encoder/decoder). As transfor-mations are applied, dyadic distribution subsystem 3240 provides feedback to transformation matrix generator 3245 about the actual transformations performed. This allows the transformation matrix generator to refine matrix B if nec-essary. According to an embodiment, if the input data distribution changes over time, the transformation matrix generator can adapt matrix B based on new information from the stream analyzer. The dyadic distribution subsystem will then use this updated matrix for subsequent transfor-mations. The dyadic distribution subsystem keeps track of the transformations it applies and generates a secondary data stream containing this information. This "transformation data" is important for the decoding process and may be interleaved with the main data stream by interleaver sub-system 3260. The transformation matrix generator continu-ally works to optimize matrix B to minimize the amount of transformation data needed while maintaining the desired dyadic distribution.

Both transformation components (dyadic distribution sub-system and matrix generator) work together to ensure that the transformations contribute to the cryptographic security of the system. The transformation matrix generator designs matrix B to make prediction of future states difficult, while the dyadic distribution subsystem applies these transforma-tions in a way that passes the modified next-bit test. In essence, the dyadic distribution subsystem and transformation matrix generator form a tight feedback loop. The transformation matrix generator provides the rules for transformation (in the form of matrix B), while the dyadic distribution subsystem applies these rules to the actual data. The results of these transformations then inform potential updates to the transformation rules, allowing the system to maintain optimal compression and security as it processes the data stream. This close interaction allows the system to dynamically balance compression efficiency and cryptographic security, adapting to changes in the input data characteristics while maintaining the core properties that make the dyadic distribution algorithm effective.

The input data then flows into a Huffman encoder/decoder 3250 which is configured to perform Huffman coding for compression and decoding for decompression. This may comprise constructing a Huffman tree based on the probability distribution of the input data, and assigning shorter codewords to more frequent symbols for compression. For decompression, it reverses the process.

According to the embodiment, interleaver subsystem 3260 is present and configured to interleave the compressed and encrypted data streams. This may comprise combining the main data stream (e.g., the input data stream that has been processed by one or more platform components) with the secondary "transformation data" stream according to a specific partitioning scheme to create the final output. This scheme is designed to maximize security while maintaining efficient compression. Interleaver subsystem 3260 may integrate with security subsystem 3270 during data processing. In an embodiment, security subsystem implements security features such as the modified next-bit test. For example, the interleaver works with the security subsystem to determine how many bits from each stream should be included in each block of the output. This allocation may be dynamic and based on security requirements and the current state of the data. In some implementations, before interleaving, the security subsystem encrypts the transformation data using a cryptographic algorithm. This adds an extra layer of security to the sensitive information about how the data was transformed. In some implementations, the security subsystem provides cryptographically secure random numbers to the interleaver (or other platform components such as dyadic distribution subsystem). These may be used to introduce controlled randomness into the interleaving process, making it harder for an adversary to separate the two streams.

As the interleaver combines the streams, the security subsystem performs ongoing checks to ensure the resulting stream maintains the required cryptographic properties, such as passing the modified next-bit test. According to an aspect, security subsystem 3270 monitors the entropy of the interleaved stream. If the entropy drops below a certain threshold, it signals the interleaver to adjust its strategy, possibly by including more bits from the transformation data stream. In embodiments where the system uses cryptographic keys (e.g., for encrypting the transformation data), the security subsystem manages these keys and provides them to the interleaver as needed. According to an aspect, based on feedback from the security subsystem about the cryptographic strength of recent output, interleaver subsystem 3260 may adaptively change its interleaving strategy.

In an implementation, the security subsystem advises the interleaver on how to maintain consistent timing in its operations to prevent timing-based attacks. This might involve adding deliberate delays or dummy operations. The interleaver may consult the security subsystem on how to securely include any necessary headers or metadata in the output stream. This ensures that even auxiliary data doesn't compromise the system's security. According to an aspect, security subsystem 3270 provides integrity check values (e.g., hash values or MAC codes) to interleaver subsystem 3260, which are then incorporated into the output stream. These allow the receiver to verify the integrity of the received data. According to another aspect, security subsystem 3270 guides the interleaver in implementing techniques to resist side-channel attacks, such as ensuring that the power consumption or electromagnetic emissions during interleaving don't leak information about the data being processed.

In an implementation, if the interleaver encounters any issues during the interleaving process, it may consult the security subsystem on how to handle these errors securely without leaking information about the underlying data or transformation process. In an implementation, the interleaver, guided by the security subsystem, can include secure hints or markers in the output stream that will assist in the decoding process without compromising security. The interleaver and security subsystem work in tandem to produce an output stream that is both compressed and securely encrypted. The interleaver focuses on efficiently combining the data streams, while the security subsystem ensures that every step of this process maintains the cryptographic properties of the system. This close cooperation allows the platform to achieve its dual goals of data compression and encryption in a single, efficient process.

Figure 33:
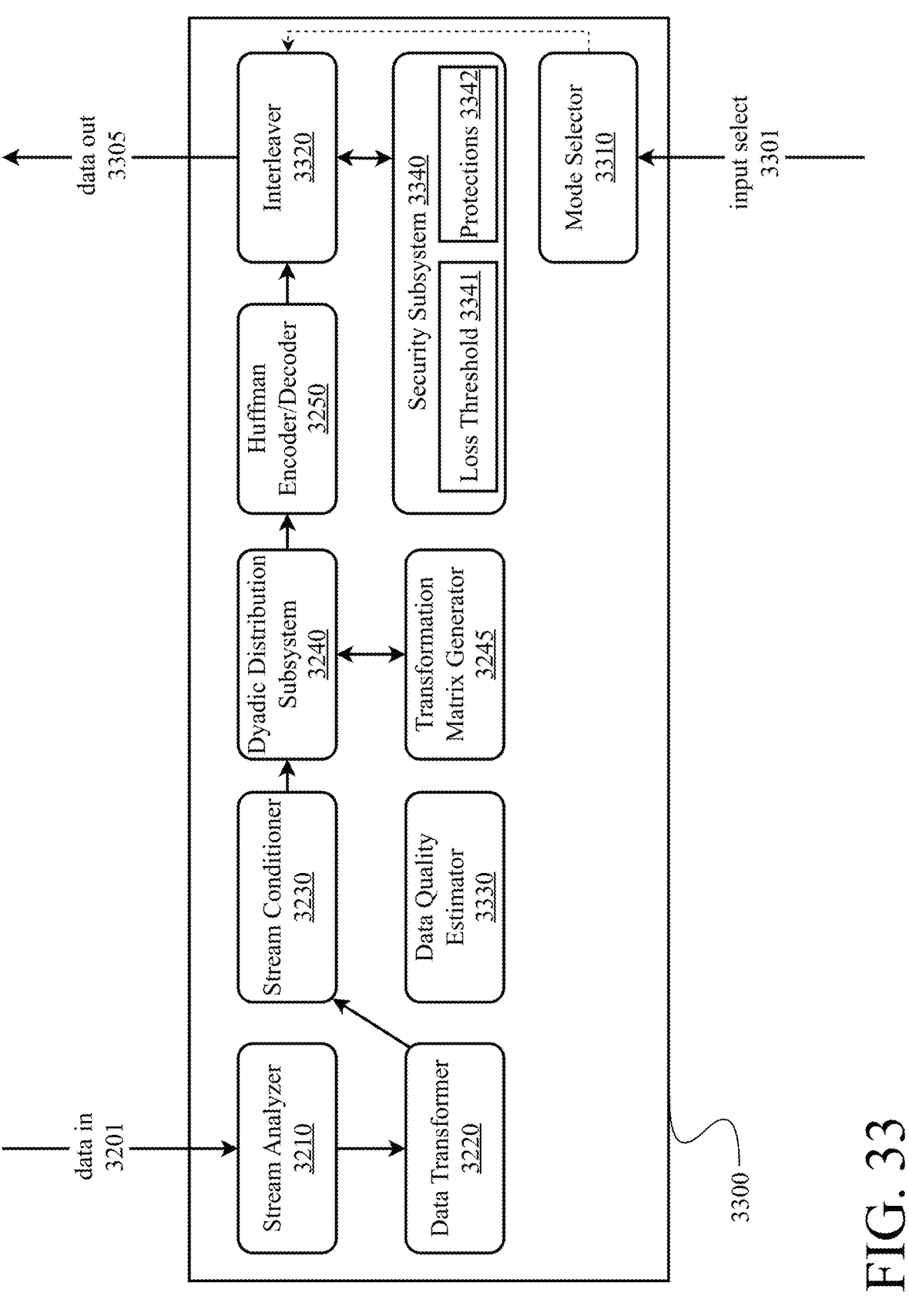
FIG. 33 is a block diagram illustrating another exemplary system architecture for a dyadic distribution-based compression and encryption platform.

FIG. 33 is a block diagram illustrating another exemplary system architecture for a dyadic distribution-based compression and encryption platform 3300, according to an embodiment. According to an embodiment, a modification to the compression and encryption platform 3300 could be implemented as an optional mode within the existing platform architecture, allowing for flexibility in its application. For example, this may require the addition of a mode selector component 3310, which can determine whether to operate in the original lossless mode, the new lossy, high-security mode, or in a modified lossless mode. Mode selector 3310 may receive input data 3301 which selects or otherwise sets the mode of operation of platform 3300. Input select data may be received from various sources such as, for example, a platform user (human or computer implemented agent), or an external application, service, or computing resource.

According to an embodiment, the platform may be modified to only send the modified stream without the secondary stream containing the modification information. This alteration fundamentally changes the nature of the compression from lossless to lossy, while simultaneously strengthening the encryption aspect of the system. The dyadic distribution subsystem, guided by transformation matrix generator 3245, would still modify the input data to achieve a dyadic distribution. However, without the accompanying transformation data stream, perfect reconstruction of the original data becomes impossible, even with possession of the codebook used by Huffman encoder/decoder 3250.

Interleaver 3320 may receive from mode selector 3310 a signal and/or instruction (illustrated as the dotted line) on what process to apply to the one or more input data streams. If the platform is configured to perform the original lossless mode, interleaver 3320 interleaves the compressed input data stream and the secondary transformation data stream. If the platform is configured to perform lossy compression, interleaver 3320 does not interleave the two data streams, but instead transmits only the compressed input data stream. If the platform is configured to perform a modified lossless compression, interleaver 3320 can transmit the compressed input data stream by itself in a first transmission session, and then it may transmit the secondary transformation data stream by itself in a second transmission session. In some embodiments, the secondary transformation data stream may be encrypted according to a suitable data encryption technique prior to transmission. Encryption techniques that may be implemented can include, but are not limited to, advance encryption standard (AES), asymmetric encryption (e.g., RSA), symmetric encryption (e.g., Twofish), and/or the like.

Security subsystem's 3340 role becomes even more critical in the implementation of lossy modified system. It ensures that the encrypted data stream maintains its cryptographic strength, potentially approaching perfect encryption. The absence of the secondary stream eliminates a potential attack vector, as the transformation information is never transmitted. Interleaver's 3320 function would be simplified, focusing solely on managing the primary data stream, but it would still work closely with the security subsystem to maintain the stream's cryptographic properties.

This approach presents a compelling trade-off between data integrity and transmission efficiency coupled with enhanced security. The stream analyzer's role remains the same in analyzing the input data characteristics, allowing the platform to optimize the compression and transformation processes. The loss of data introduced by this method is directly related to the transformations applied by the data transformer, guided by the transformation matrix generator.

Potential applications for this modified system include scenarios where perfect data reconstruction is not critical, but high compression ratios and stringent security requirements are paramount. Examples may include certain types of media streaming, sensor data transmission in IoT environments, or secure transmission of non-critical telemetry data.

According to an embodiment, to address concerns about data integrity, platform 3300 may incorporate a configurable loss threshold 3341 managed by security subsystem 3340. This threshold can allow users to set a maximum acceptable level of data loss. If the estimated loss exceeds this threshold, the platform could automatically revert to the lossless mode or alert the user.

Additionally, the platform may be extended to include a data quality estimator component 3330. This component may work in conjunction with various components (e.g., stream analyzer, data transformer, dyadic distribution subsystem) to provide real-time estimates of the quality of the compressed and encrypted data compared to the original. This could be particularly useful in applications like media streaming, where maintaining a certain level of perceptual quality is crucial.

Finally, it's worth noting that the lossy, high-security mode could potentially offer resistance to certain types of side-channel attacks, as the lack of perfect reconstruction could mask some of the subtle correlations that these attacks often exploit. In an embodiment, security subsystem 3340 can be expanded to include specific protections 3342 against such attacks, further enhancing the overall security profile of the system. These protections would aim to mitigate various types of side-channel vulnerabilities that could potentially leak information about the encryption process or the data being processed. For example, some specific protections that may be implemented can include, but are not limited to, timing attack mitigation, power analysis countermeasures, electromagnetic emission protection, cache attack prevention, branch prediction attack mitigation, fault injection resistance, memory access pattern obfuscation, randomization techniques, microarchitectural attack mitigations, side-channel resistant algorithms, runtime monitoring, and adaptive countermeasures.

The system's components interact in a seamless, integrated manner to process, compress, and encrypt data efficiently. When data is received, the data deconstruction engine 102 first breaks it into sourceblocks. These sourceblocks are then passed to the codebook training module 2830, which analyzes them for data drift. If significant drift is detected, the module retrains the encoding algorithms and updates the codebook. The processed sourceblocks are then fed into the dyadic distribution subsystem 3240, which works in conjunction with the transformation matrix generator 3245 to transform the data into a dyadic distribution. This subsystem produces two streams: a main data stream and a secondary stream of transformation information. The main stream is further compressed by the Huffman encoder/decoder 3250. The interleaver subsystem 3260 then combines these streams, consulting with the security subsystem 3270 to ensure cryptographic strength. Throughout this process, the network device manager monitors resource usage and coordinates with the codebook update engine to distribute updated codebooks to connected devices at optimal times. When decoding is required, these components work in reverse order, with the data reconstruction engine 108 reassembling the original data from the processed sourceblocks. This interconnected system allows for adaptive, efficient, and secure data handling across various network configurations and data types.

FIG. 34 is a method diagram illustrating an exemplary method 3400 for implementing a dyadic distribution algorithm, according to an aspect. The method may be performed, in whole or in part, by one or more dyadic distribution-based compression and encryption platforms. According to the aspect, the process begins at step 3401 when dyadic distribution subsystem 3240 receives input data. The input data may have been previously analyzed and processed by other platform components (e.g., stream analyzer subsystem, data transformer subsystem). At step 3402, the platform creates a transformation matrix using a transformation matrix generator 3245. The transformation matrix may be referred to herein as matrix B. At step 3403, for each state in the input data, subsystem 3240 consults matrix B to determine the probability distribution for transforming that state to other states. According to the aspect, at step 3404 the platform uses a secure random number generator to select a transformation based on the probabilities in the transformation matrix. At step 3405, the platform reshapes the data distribution to approach the dyadic distribution of Huffman encoding based on the selected transformations. At step 3406, the platform keeps track of the applied transformations and generates a secondary data stream.

FIG. 35 is a method diagram illustrating an exemplary method 3500 for providing lossless, dyadic distribution-based compression and encryption, according to an aspect. According to the aspect, the process begins at step 3501 when platform 3200, 3300, receives, retrieves, or otherwise obtains an input data stream. At step 3502, the platform analyzes and processes the input data stream. This may comprise frequency analysis as performed by a stream analyzer subsystem 3210 and processing performed by a data transformer subsystem 3220 and/or a stream conditioner subsystem 3230. At step 3503, the platform applies the dyadic distribution algorithm to the input data stream (which may have been processed at step 3502), generating a transformed main data stream and a secondary data stream comprising the transformations applied to the input data stream. The secondary data stream may be sent to an interleaver subsystem 3260 for transmission. At step 3504, the platform applies Huffman compression to the transformed main data stream, generating a compressed main data stream. The interleaver subsystem 3260 can obtain both data streams and combine them into an interleaved data stream at step 3505. At step 3506, the platform transmits the combined data stream as a compressed and encrypted data stream. The transmitted data may be received on the receiving end with a platform configured with a Huffman decoder which can decompress the received main data stream using the attached secondary stream and the proper codebook.

FIG. 36 is a flow diagram illustrating an exemplary method 3600 for providing lossy, dyadic distribution-based compression and encryption, according to an aspect. According to the aspect, the process begins at step 3601 when platform 3200, 3300, receives, retrieves, or otherwise obtains an input data stream. At step 3602, the platform analyzes and processes the input data stream. This may comprise frequency analysis as performed by a stream analyzer subsystem 3210 and processing performed by a data transformer subsystem 3220 and/or a stream conditioner subsystem 3230. At step 3603, the platform applies the dyadic distribution algorithm to the input data stream (which may have been processed at step 3602), generating a transformed main data stream and a secondary data stream comprising the transformations applied to the input data stream. At step 3604, the platform applies Huffman compression to the transformed main data stream, generating a compressed main data stream. In this embodiment, the platform may have obtained a mode of operation command from the mode selector 3310 which indicates the platform is to perform lossy compression. In such an embodiment, the interleaver subsystem 3320 does not obtain both data streams and combine them into an interleaved data stream. At step 3605, the platform transmits only the compressed main data stream as a compressed and encrypted data stream. The transmitted data may be received on the receiving end with a platform configured with a Huffman decoder which can decompress the received main data stream, however because there is no accompanying secondary data stream, the decompressed main data stream would be considered lossy because it cannot be reconstructed due to the dyadic transformations applied at step 3603.

FIG. 37 is a flow diagram illustrating an exemplary method 3700 for providing modified lossless, dyadic distribution-based compression and encryption, according to an aspect. According to the aspect, the process begins at step 3701 when platform 3200, 3300, receives, retrieves, or otherwise obtains an input data stream. At step 3702, the platform analyzes and processes the input data stream. This may comprise frequency analysis as performed by a stream analyzer subsystem 3210 and processing performed by a data transformer subsystem 3220 and/or a stream conditioner subsystem 3230. At step 3703, the platform applies the dyadic distribution algorithm to the input data stream (which may have been processed at step 3702), generating a transformed main data stream and a secondary data stream comprising the transformations applied to the input data stream. The secondary data stream may be sent to an interleaver subsystem 3320 for transmission. At step 3704, the platform applies Huffman compression to the transformed main data stream, generating a compressed main data stream. In this embodiment, the platform may have obtained a mode of operation command from the mode selector 3310 which indicates the platform is to perform modified lossless compression. In such an embodiment, the interleaver subsystem 3320 does not combine both data streams into an interleaved data stream. At step 3705, the platform transmits only the compressed main data stream as a compressed and encrypted data stream. At step 3706, the platform transmits only the secondary data stream in a second transmission. The transmitted data may be received on the receiving end with a platform configured with a Huffman decoder which can decompress the received main data stream using the secondary data stream and the codebook.

FIG. 38 is a method diagram illustrating integrated data processing with dyadic distribution-based compression and encryption. Data is received by the data deconstruction engine 102 3801. The received data is then deconstructed into sourceblocks by the data deconstruction engine 102, breaking it down into manageable, discrete units for processing 3802. These sourceblocks are analyzed by the codebook training module 2830 to detect any data drift, which could indicate changes in the underlying data distribution. If significant drift is detected, the encoding algorithms are retrained to maintain optimal performance 3803. The process then moves to the dyadic distribution subsystem 3240, which analyzes the input data stream to determine its statistical properties and characteristics 3804. Based on these properties, a transformation matrix is created by the transformation matrix generator 3245, which will be used to reshape the data distribution 3805. The dyadic distribution subsystem 3240 then applies this transformation matrix to transform the input data into a dyadic distribution, optimizing it for both compression and encryption 3806. As a result of this transformation, the dyadic distribution subsystem 3240 generates two streams: a main data stream of transformed data and a secondary data stream containing the transformation information 3807. The main data stream undergoes further compression using Huffman coding, performed by the Huffman encoder/decoder 3250, to maximize data reduction 3808. Finally, the compressed main data stream and the secondary data stream are combined into a single output stream by the interleaver subsystem 3260, resulting in a compressed and encrypted data package ready for storage or transmission 3809.

FIG. 39 is a method diagram illustrating integrated data processing with dyadic distribution-based decryption and decompression. The process begins when the combined output stream, containing both the compressed main data and the secondary transformation information, is received by the interleaver subsystem 3260 3901. This subsystem then separates the combined stream into its constituent parts: the compressed main data stream and the secondary data stream containing the transformation information 3902. The compressed main data stream undergoes Huffman decoding, performed by the Huffman encoder/decoder 3250, reversing the compression applied during the encoding process 3903. Simultaneously, the transformation matrix generator 3245 uses the information from the secondary data stream to reconstruct the original transformation matrix 3904. This reconstructed matrix is crucial for the next step, where the dyadic distribution subsystem 3240 transforms the decompressed main data stream back from its dyadic distribution to its original form, effectively reversing the encryption process 3905. The resulting transformed data is then analyzed by the codebook training module 2830, which ensures that the decoded data matches the expected probability distribution, verifying the integrity of the decryption process 3906. Following this verification, the data reconstruction engine 108 takes over, reconstructing the decoded data into its original form by reassembling the sourceblocks into the complete data set 3907. As a final quality assurance measure, the data reconstruction engine 108 performs a comprehensive check of the reconstructed data for integrity and completeness, ensuring no information was lost or corrupted during the decryption and decompression process 3908. Upon passing these checks, the fully decrypted and decompressed data, now restored to its original form, is output by the system, ready for use or further processing 3909.

In a non-limiting use case example, the system is deployed to a large-scale cloud storage service that handles diverse types of data from millions of users. The service aims to maximize storage efficiency while ensuring data security and quick access for users.

When a user uploads a file, the data deconstruction engine 102 receives the input and breaks it down into sourceblocks. These sourceblocks are then analyzed by the codebook training module 2830, which compares their statistical properties to the existing codebook. If significant data drift is detected, perhaps due to a new type of file becoming popular among users, the module retrains the encoding algorithms to optimize for this new data distribution.

The dyadic distribution subsystem 3240 then processes the data. It analyzes the input stream's properties and creates a transformation matrix using the matrix generator 3245. This matrix is used to transform the data into a dyadic distribution, which is optimal for both compression and encryption. The system generates two streams: a main data stream of transformed data and a secondary stream containing transformation information.

The Huffman encoder/decoder 3250 further compresses the main data stream, and the interleaver subsystem 3260 combines this with the secondary stream. The result is a highly compressed and encrypted version of the user's file, which is then stored in the cloud.

When the user requests to download their file, the process is reversed. The interleaver subsystem 3260 separates the combined stream. The Huffman encoder/decoder 3250 decompresses the main stream, while the transformation matrix is reconstructed from the secondary stream. The dyadic distribution subsystem 3240 then uses this to transform the data back to its original distribution.

Finally, the data reconstruction engine 108 reassembles the file from the decoded data, verifying its integrity before providing it to the user.

This system allows the cloud service to store significantly more data in the same physical space, reduce bandwidth usage during file transfers, and provide an additional layer of security for user data. The adaptive nature of the codebook training module ensures that the system remains efficient even as the types of files being stored evolve over time.

In another non-limiting use case example, the system is implemented in a global Internet of Things (IoT) network for smart cities. This network collects vast amounts of data from various sensors and devices across multiple urban areas, processing and transmitting this information to central hubs for analysis and decision-making.

When a sensor, such as a traffic monitoring camera or an air quality detector, captures data, it's received by the data deconstruction engine 102. This engine breaks down the incoming data stream into sourceblocks, preparing it for efficient processing. The codebook training module 2830 then analyzes these sourceblocks, comparing their statistical properties to the existing codebook. In this dynamic urban environment, the module might detect data drift caused by factors like changing traffic patterns or seasonal variations in air quality. When such drift is detected, the module retrains the encoding algorithms to maintain optimal performance.

The dyadic distribution subsystem 3240 then takes over, analyzing the properties of the input data stream. Using the transformation matrix generator 3245, it creates a transformation matrix tailored to the specific characteristics of the urban sensor data. This matrix is used to transform the data into a dyadic distribution, simultaneously optimizing it for compression and encryption—crucial for efficient transmission and security in smart city applications.

The system generates two streams: a main data stream of transformed sensor data and a secondary stream containing the transformation information. The Huffman encoder/decoder 3250 further compresses the main data stream, and the interleaver subsystem 3260 combines this with the secondary stream. The result is a highly compressed and encrypted package of urban sensor data, ready for secure transmission to central processing hubs.

At the receiving end, the process is reversed. The interleaver subsystem 3260 separates the combined stream, the Huffman encoder/decoder 3250 decompresses the main stream, and the dyadic distribution subsystem 3240 transforms the data back to its original distribution using the reconstructed transformation matrix.

Finally, the data reconstruction engine 108 reassembles the original sensor data, verifying its integrity before passing it on for analysis and decision-making processes.

This implementation allows the smart city network to handle massive amounts of real-time data from countless sensors, significantly reducing bandwidth usage and storage requirements while maintaining data security. The adaptive nature of the system ensures it remains efficient even as urban conditions and data patterns evolve over time, making it ideal for the dynamic and complex environment of smart cities.

In a non-limiting use case example, the system is implemented in a global, distributed scientific research network focused on genomic sequencing and analysis. This network processes enormous amounts of genetic data from research centers worldwide, requiring efficient storage, secure transmission, and rapid access for collaborative analysis.

When a research center uploads new genomic sequencing data, it's received by the data deconstruction engine 102. This engine breaks down the complex genetic information into sourceblocks, preparing it for processing. The codebook training module 2830 then analyzes these sourceblocks, comparing their statistical properties to the existing codebook. In this field, the module might detect data drift caused by factors like new sequencing techniques or the discovery of previously unknown genetic variations. When such drift is detected, the module retrains the encoding algorithms to maintain optimal performance for the evolving genetic data landscape.

The dyadic distribution subsystem 3240 then processes the data, analyzing the properties of the input genomic stream. Using the transformation matrix generator 3245, it creates a transformation matrix tailored to the specific characteristics of genetic sequence data. This matrix is used to transform the data into a dyadic distribution, simultaneously optimizing it for compression and encryption-crucial for efficient storage and maintaining the confidentiality of sensitive genetic information.

The system generates two streams: a main data stream of transformed genetic data and a secondary stream containing the transformation information. The Huffman encoder/decoder 3250 further compresses the main data stream, and the interleaver subsystem 3260 combines this with the secondary stream. The result is a highly compressed and encrypted package of genomic data, ready for secure storage and transmission across the global research network.

When a researcher at another institution needs to access this data, the process is reversed. The interleaver subsystem 3260 separates the combined stream, the Huffman encoder/decoder 3250 decompresses the main stream, and the dyadic distribution subsystem 3240 transforms the data back to its original distribution using the reconstructed transformation matrix.

Finally, the data reconstruction engine 108 reassembles the original genomic sequence data, verifying its integrity before presenting it to the researcher for analysis.

This implementation allows the global genomic research network to handle massive amounts of complex genetic data, significantly reducing storage requirements and transmission times while maintaining the highest levels of data security and integrity. The adaptive nature of the system ensures it remains efficient even as sequencing technologies and genetic knowledge evolve, making it ideal for the rapidly advancing field of genomic research. Furthermore, the system's efficiency enables faster sharing and analysis of genetic data across different research institutions, potentially accelerating breakthroughs in fields like personalized medicine and genetic disease research.

Hardware Architecture

Figure 45:
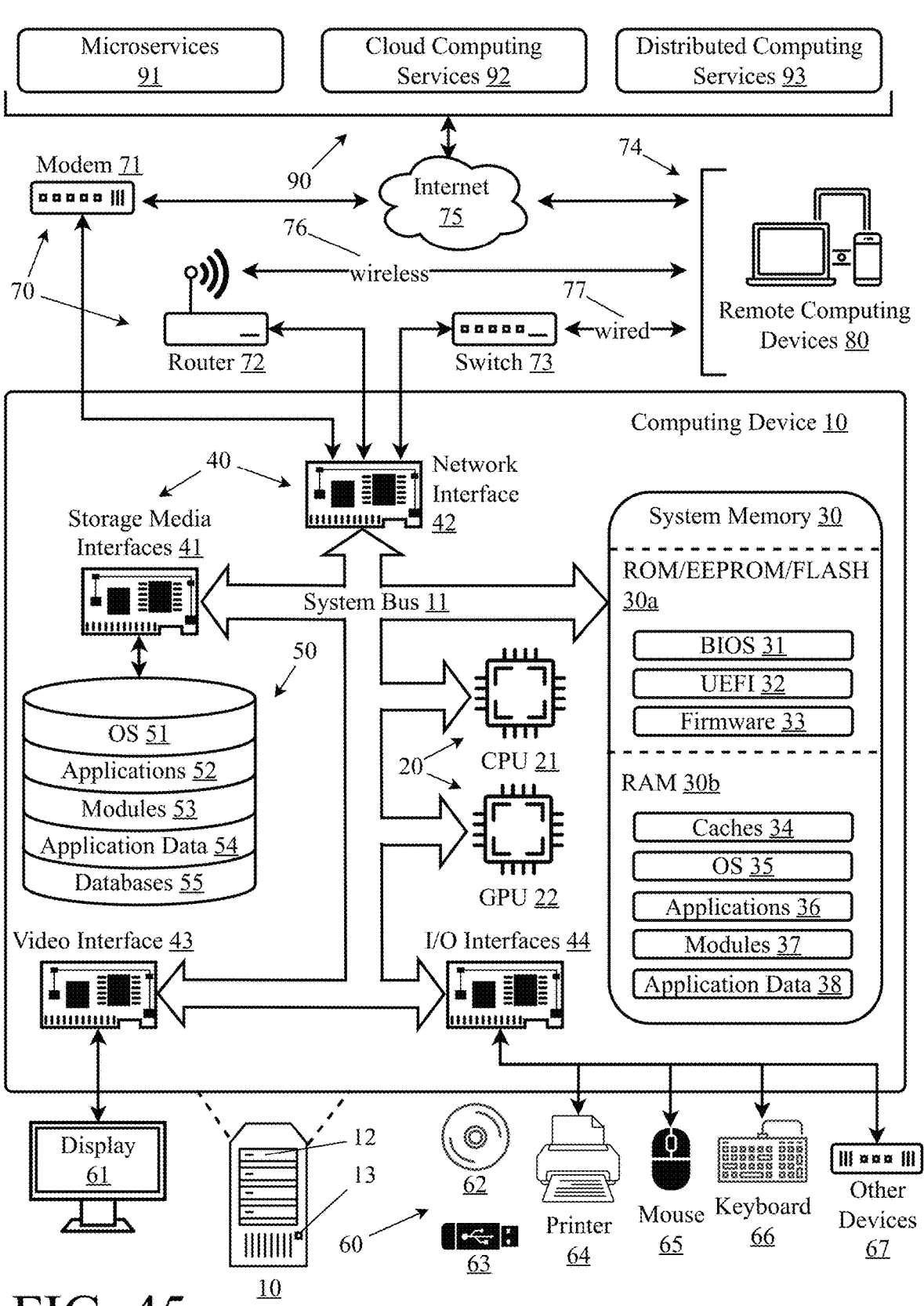
FIG. 45 illustrates an exemplary computing environment on which an embodiment described herein may be implemented.

FIG. 45 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently per- form matrix multiplication and convolution operations used heavily in neural networks and deep learning applications; application-specific integrated circuits (ASICs) implement- ing custom logic for domain-specific tasks; application- specific instruction set processors (ASIPs) with instruction sets tailored for particular applications; field-programmable gate arrays (FPGAs) providing reconfigurable logic fabric that can be customized for specific processing tasks; pro- cessors operating on emerging computing paradigms such as quantum computing, optical computing, mechanical com- puting (e.g., using nanotechnology entities to transfer data), and so forth. Depending on configuration, computing device 10 may comprise one or more of any of the above types of processors in order to efficiently handle a variety of general purpose and specialized computing tasks. The specific pro- cessor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between com- ponents within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating com- puter-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which oper- ate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on- substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) com- pared to traditional DRAM and may be used in high- performance graphics cards, AI accelerators, and edge com- puting devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to tra- ditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display inter- faces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display require- ments. Typically, a graphics card includes a graphics pro- cessing unit (GPU) and video RAM (VRAM) to accelerate display of graphics. In some high-performance computing systems, multiple GPUs may be connected using NVLink bridges, which provide high-bandwidth, low-latency inter- connects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form- Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effective- ness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

54

What is claimed is:

1. A computer system comprising:
a hardware memory, wherein the computer system is configured to execute software instructions stored on nontransitory machine-readable storage media that:
processes received data to generate a test dataset;
analyzes the test dataset to determine a probability distribution;
retrains encoding and decoding algorithms using the test dataset and the probability distribution;
applies the retrained algorithms to generate one or more data units from the test dataset;
associates each of the one or more data units with a corresponding identifier; and
stores the one or more data units and their corresponding identifiers in an updated data structure;
monitors system performance metrics and resource utilization across system components;
analyzes temporal and spatial relationships in data access patterns;
calculates likelihood scores for potential prefetch operations based on tracked percentages of previously prefetched data units that were actually used, wherein each likelihood score represents a probability that a corresponding data unit will be accessed;
dynamically adjusts cache parameters based on current performance metrics;
maintains multiple cache levels with different performance characteristics for different data types; and
executes prefetch operations for data units whose likelihood scores exceed a threshold, wherein the prefetch operations are selected from the potential prefetch operations based on prediction models that incorporate the calculated likelihood scores and available system resources.

2. The computer system of claim 1, wherein the computing device is a cloud-based computing device.

3. The computer system of claim 1, wherein the computer system is further configured to:
receive device data from at least one of a plurality of network connected devices;
store received device data in a storage device operating on the memory;
analyze device data to monitor network connected device resource consumption and time periods of device downtime; and
forward device data to a codebook update engine.

4. The computer system of claim 3, wherein the computer system is further configured to:
receive updated codebooks;
store updated codebooks in a cache;
receive device data from the network device manager; and
publish updated codebooks to network connected devices associated with the received device data.

5. The computer system of claim 1, wherein the computer system is further configured to:
analyze an input data stream to determine its properties;
create a transformation matrix based on the properties of the input data;
transform the input data into a dyadic distribution;
generate a main data stream of transformed data and a secondary data stream of transformation information;
compress the main data stream; and
combine the compressed main data stream and the secondary data stream into an output stream.

6. A computer-implemented method comprising the steps of:

processing received input data to generate a test dataset;

analyzing the test dataset to determine a probability distribution;

retraining encoding and decoding algorithms using the test dataset and the probability distribution;

applying the retrained algorithms to generate one or more data units from the test dataset;

associating each of the one or more data units with a corresponding identifier; and storing the one or more data units and their corresponding identifiers in an updated data structure;

monitoring system performance metrics and resource utilization across system components;

analyzing temporal and spatial relationships in data access patterns;

calculating likelihood scores for potential prefetch operations based on historical accuracy tracked percentages of previously prefetched data units that were actually used, wherein each likelihood score represents a probability that a corresponding data unit will be accessed data element will be accessed within a predetermined time window;

dynamically adjusting cache parameters based on current performance metrics;

maintaining multiple cache levels with different performance characteristics for different data types; and executing prefetch operations for data units whose likelihood scores exceed a threshold based on prediction models while considering available resources, wherein the prefetch operations are selected from the potential prefetch operations based on prediction models that incorporate the calculated likelihood scores and adjust the threshold value based on and available system resources.

7. The method of claim 6, wherein the method is performed on a cloud-based computing device.

8. The method of claim 6, further comprising the steps of:

receiving device data from at least one of a plurality of network connected devices;

storing received device data in a storage device;

analyzing device data to monitor network connected device resource consumption and time periods of device downtime; and forwarding device data to a codebook update engine.

9. The method of claim 8, further comprising the steps of:

receiving updated codebooks;

storing updated codebooks in a cache;

receiving device data from a network device manager; and publishing updated codebooks to network connected devices associated with the received device data.

10. The method of claim 6, further comprising the steps of:

analyzing an input data stream to determine its properties;

creating a transformation matrix based on the properties of the input data;

transforming the input data into a dyadic distribution;

generating a main data stream of transformed data and a secondary data stream of transformation information;

compressing the main data stream; and combining the compressed main data stream and the secondary data stream into an output stream.

* * * * *